(12) United States Patent
Clair

(10) Patent No.: US 11,845,601 B2
(45) Date of Patent: Dec. 19, 2023

(54) METHOD AND APPARATUS FOR STORING FOOD

(71) Applicant: Lara Clair, Stouffville (CA)

(72) Inventor: Lara Clair, Stouffville (CA)

( * ) Notice: Subject to any disclaimer, the term of this patent is extended or adjusted under 35 U.S.C. 154(b) by 0 days.

(21) Appl. No.: 17/489,963

(22) Filed: Sep. 30, 2021

(65) Prior Publication Data

US 2022/0106100 A1 Apr. 7, 2022

Related U.S. Application Data

(60) Provisional application No. 63/086,849, filed on Oct. 2, 2020.

(51) Int. Cl.
*B65D 81/20* (2006.01)
*A23L 3/36* (2006.01)
*B65D 77/04* (2006.01)

(52) U.S. Cl.
CPC .......... *B65D 81/2038* (2013.01); *A23L 3/363* (2013.01); *B65D 77/0453* (2013.01); *B65D 81/2015* (2013.01)

(58) Field of Classification Search
CPC .... B65D 25/16; B65D 81/20; B65D 81/2007; B65D 81/2038; B65D 77/0453; A23L 3/363
USPC ......... 206/524.8; 220/367.1, 495.01, 495.04, 220/495.05, 913, 203.28, 203.29
See application file for complete search history.

(56) References Cited

U.S. PATENT DOCUMENTS

| | | | | |
|---|---|---|---|---|
| 4,098,404 A | * | 7/1978 | Markert | B65D 15/14 220/624 |
| 5,628,404 A | * | 5/1997 | Hendrix | B65D 25/16 206/524.8 |
| 6,510,674 B1 | * | 1/2003 | Case | B65D 3/22 53/449 |
| 6,994,227 B2 | * | 2/2006 | Kwon | B65D 81/2038 220/203.11 |
| 7,607,642 B2 | * | 10/2009 | Kim | B65D 81/2038 251/366 |
| 8,662,334 B2 | * | 3/2014 | Turvey | B65D 81/2038 220/360 |
| 11,292,652 B1 | * | 4/2022 | Rojas | B65D 25/16 |
| 2010/0000995 A1 | * | 1/2010 | Yarbrough | A47L 9/182 220/212 |
| 2011/0091138 A1 | * | 4/2011 | Wakabayashi | B65D 33/2541 383/100 |
| 2016/0257475 A1 | * | 9/2016 | Gervais | B65D 43/0214 |

* cited by examiner

*Primary Examiner* — Luan K Bui
(74) *Attorney, Agent, or Firm* — SAND, SEBOLT & WERNOW CO., LPA

(57) ABSTRACT

A system, apparatus, and method of storing food including a storage container having a base; a resilient liner nesting in the base, and a lid that interlockingly engages with the liner and/or base to close off access to foodstuffs retained in a compartment defined by the liner. A valve assembly in the lid is actuated by a pump to evacuate air from the liner's compartment and create a vacuum or near-vacuum condition therein. Apertures defined in the wall of the base allow air to flow into a compartment of the base as the resilient liner shrinks around the food. The closed storage container may be placed in a freezer to freeze the food therein. For defrosting, the base of the closed storage container is placed in a volume of water, some of which flows through the apertures in the base's wall and comes into direct contact with the liner.

20 Claims, 46 Drawing Sheets

METHOD AND APPARATUS FOR STORING FOOD

CROSS-REFERENCE TO RELATED APPLICATIONS

This application claims the benefit of U.S. Patent Application Ser. No. 63/086,849, filed Oct. 2, 2020, the entire disclosure of which is incorporated herein by reference.

TECHNICAL FIELD

This disclosure is directed to kitchenware. In particular, the present disclosure relates to a storage container for food. Specifically, the storage container of the present disclosure includes a base, a pliable and resilient liner that nests inside a compartment defined by the base, and a lid that interlockingly engages with the liner and/or base. The liner defines a compartment within which food may be placed. A valve is provided in the lid and a hand-pump is utilized to evacuate air from inside the liner's compartment. The liner is drawn upwardly towards the lid and reduces in overall size as it is placed under vacuum condition. The base and lid maintain their shape and so the storage container is easily stack in a fridge, freezer, or on a shelf of a cupboard.

BACKGROUND

Background Information

People have been freezing food for many years. In some instances, the food is placed inside a rigid container or a plastic bag which is then placed into the freezer. The problem with this process is that air surrounding the food is trapped inside the container or bag. This air tends to contain moisture that will crystallize around the food and can lead to spoilage of the food over time. In order to address this issue, vacuum sealing bags and vacuum sealing containers have been offered to the consumer.

Vacuum sealing bags are typically sold to the consumer on a roll and comprises a tube of plastic that is heat sealed along its left and right side edges. The consumer will unroll a length of plastic tube that is suitable for the quantity of food they wish to vacuum seal into the bag and will slice a length of the plastic tubing from the roll. The consumer will then insert one end of the section of plastic tube they have cut off the roll into a heat-sealing aperture provided on a powered vacuum sealing machine. The machine will apply heat and pressure to the inserted end and will form a seam. The length of plastic tube is then sealed along a bottom edge and the side edges to form a bag with one open end. The consumer will place the food into the compartment defined by the upper and lower walls of the bag and will then insert the open end into a vacuum and sealing slot provided on the machine. The machine will evacuate the air from the compartment of the bag and will then heat seal the open end to form an enclosed pouch that surrounds the food. The pouch with the food therein is then able to be placed inside the freezer. Since there is little to no air left inside the pouch, the frozen food will tend to last longer in the freezer and will be less prone to becoming freezer burned. Because there is little to no air in the pouch, the pouch will tend to take up less freezer space.

While this manner of freezing foods causes less space to be taken up inside the freezer, evacuating of the air from the pouch tends to cause physical distortion of the pouch and its contents. This distortion tends to make the frozen pouches of food pieces very difficult to stack one on top of another inside the freezer. Additionally, when the consumer later decides to use the food, the pouch has to be cut open in order to access the food therein. The pouch is therefore a single use plastic that must be discarded after accessing the contents thereof.

Another solution offered to consumers is vacuum containers that are comprised of a substantially rigid base and lid. The lid includes a valve that enables air to be evacuated from the base. The food to be frozen or stored is placed within a compartment defined by the base, the lid is engaged with the base, and, using a hand pump or a powered vacuum pump, at least some of the air is evacuated from the base through the valve. Evacuating the air from the compartment of the base will help keep the lid securely engaged with the base. One of the problems with these containers is that because the base and lid are fabricated from substantially rigid materials, it is not possible to evacuate all of the air from the compartment defined by of the base. As a consequence, some of the air and some of the moisture in that air is still in direct contact with the food. Over time this contact between the air and the food can lead to possible food spoilage and/or reduce the amount of time the food may remain frozen in the container.

SUMMARY

The present disclosure is directed to a storage container that is capable of being reused multiple times and is therefore a more environmentally-friendly choice for consumers. Additionally, the storage container is able to be readily stacked in a fridge, a freezer, or on a shelf, and has the advantage of the food being able to be vacuum sealed into a reusable liner. The configuration of the storage container also makes it possible to defrost frozen food easily because the container is able to be placed directly into water without removing the liner therefrom. These and other advantages of the storage container will be described herein.

A system, apparatus, and method of storing food is disclosed herein. The apparatus and system includes a storage container having a base; a resilient liner that nests with the base, and a lid that interlockingly engages with the liner and/or base to close off access to foodstuffs retained in a compartment defined by the liner. A valve assembly in the lid is actuated by a pump to evacuate air from the liner's compartment and create a vacuum or near-vacuum condition therein. Apertures defined in the wall of the base allow air to flow into a compartment of the base as the resilient liner shrinks around the food. The closed storage container is placed in a freezer to freeze the food therein. For defrosting, the base of the closed storage container is placed in a volume of water, some of which flows through the apertures in the base's wall and comes into direct contact with the liner.

In one aspect, an exemplary embodiment of the present disclosure may provide a storage container for objects, said storage container comprising a base defining a compartment; a liner received within the compartment of the base; wherein the liner is pliable; a compartment defined by the liner and adapted to receive one or more objects therein; a lid configured to interlockingly engage with one or both of the liner and the base; and a valve assembly provided in the lid; said valve assembly being configured to be utilized to evacuate air from the compartment of the liner.

In one embodiment, the liner may be complementary is shape and dimensions to the base and is configured to be nestingly engaged with the base. In one embodiment, at least a portion of the liner may overlap a rim of the base, and the overlapping portion of the liner forms a seal between the base and the lid when the lid is engaged with the base. In one embodiment, the base may define one or more apertures therein that extend from an interior surface of the base to an exterior surface thereof, and wherein the one or more apertures may place the compartment of the base in fluid communication with air surrounding the exterior surface of the base. In one embodiment, one or both of the base and lid may be fabricated from a rigid material or a semi-rigid material. In one embodiment, the liner may be fabricated from a resilient material. In one embodiment, the resilient material may be silicone. In one embodiment, the storage container may further comprise a locking mechanism for securing the lid to the base and the liner.

In another aspect, an exemplary embodiment of the present disclosure may provide a storage system for extending a life of foodstuffs, the storage system comprising a storage container comprising a base defining a compartment; a liner nestingly received within the compartment of the base; wherein the liner is flexible and resilient; a compartment defined by the liner and adapted to receive foodstuffs therein; a lid configured to interlockingly engage with the liner and the base and seal off access to the compartment; a valve assembly provided in the lid; and a pump operably engageable with the valve assembly to evacuate air from the compartment of the liner.

In one embodiment, the pump may be operable to create a vacuum condition in the compartment of the liner. In one embodiment the pump may be a hand pump while in other embodiments, an electrical or powered pump may be utilized. In one embodiment the storage system may further comprise one or more apertures that extend from an interior surface of the base to an exterior surface thereof, and wherein the one or more apertures place the compartment of the base in fluid communication with air surrounding the exterior surface of the base. In one embodiment the storage system may further comprise one or more ridges extending downwardly from a lower surface of the lid and into the compartment of the liner. In one embodiment, the storage system may further comprise one or more additional liners that are each selectively engageable with the base and lid instead of the liner, and wherein each of the one or more additional liners is made from a differently colored material, and wherein the color of each differently colored material is selected to indicate a different foodstuff to be received within the one or more additional liners.

In another aspect, and exemplary embodiment of the present disclosure may provide a method of freezing food comprising placing a pliable liner inside a compartment defined by a base of a storage container; placing food inside a compartment of the pliable liner; engaging a lid with the base to form a closed storage container and thereby closing off access to the compartment of the pliable liner; positioning a pump adjacent a valve assembly defined in the lid; evacuating air from the compartment of the pliable liner; removing the pump; and placing the closed storage container in a freezer; and freezing the food inside the closed storage container.

In one embodiment, the method may further comprise clampingly retaining a rim of the liner between a rim of the base and the lid. In one embodiment the method may further comprise shrinking the pliable liner about the food as air is removed from the compartment by the pump. In one embodiment the method may further comprise drawing air from outside the base through apertures defined between an interior surface and an exterior surface of the base as the pliable liner shrinks. In one embodiment, the method may further comprise creating a vacuum condition or a near-vacuum condition within the compartment of the pliable liner as air is removed from the compartment by the pump. In one embodiment, the method may further comprise placing the base of the closed food storage container with frozen food therein into a volume of water; allowing some of the water to flow into the compartment of the base through apertures defined between an interior surface and an exterior surface of the base; directly contacting the liner with the some of the water; and defrosting the frozen foodstuffs. In one embodiment the method may further comprise opening the valve assembly; and allowing air to flow into the compartment of the pliable liner either before the defrosting of the frozen food or after the defrosting of the frozen food.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Referring to FIGS. 1 through 13, there is shown a first embodiment of a storage container in accordance with the present disclosure, generally indicated at 10. In particular, storage container 10 is utilized to store food but the container 10 may be utilized for any of a number of other applications. More specifically, storage container 10 is particularly useful for freezing food and for subsequently defrosting food that has been previously frozen therein.

FIGS. 1-13 show storage container 10 comprises a base 12, a liner 14, and a lid 16.

Base 12 and lid 16 may be fabricated from any suitable semi-rigid material or rigid material. If the storage container is to be used around foodstuffs, then the suitable material will be a material that is food grade. The term "food grade" is used to denote any material that has chemical resistance of a type that ensures the material is safe to use with foodstuffs for human or animal consumption. The material selected for base 12 and lid 16 preferably is dishwasher safe. Suitable material for fabrication of base 12 and/or lid 16 are, for example, a thermoplastic polymer such as propylene or high density polyethylene. Another suitable material for fabrication of the base and/or lid is a metal such as stainless steel. A further suitable material for the base or lid is any type of composite material.

Figure 1:
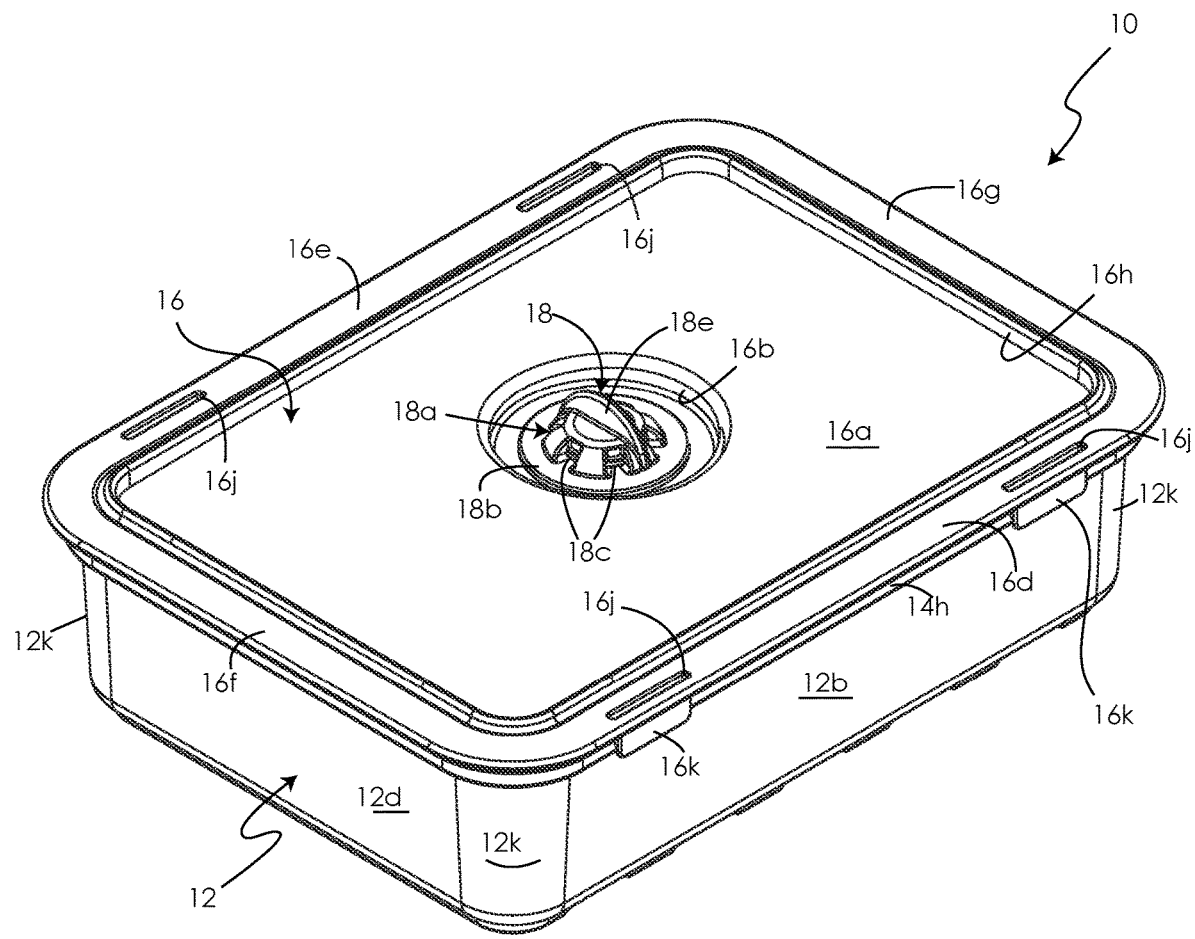
FIG. 1 is a top, front, left side perspective view of a first embodiment of a storage container in accordance with the present disclosure.
Figure 2:
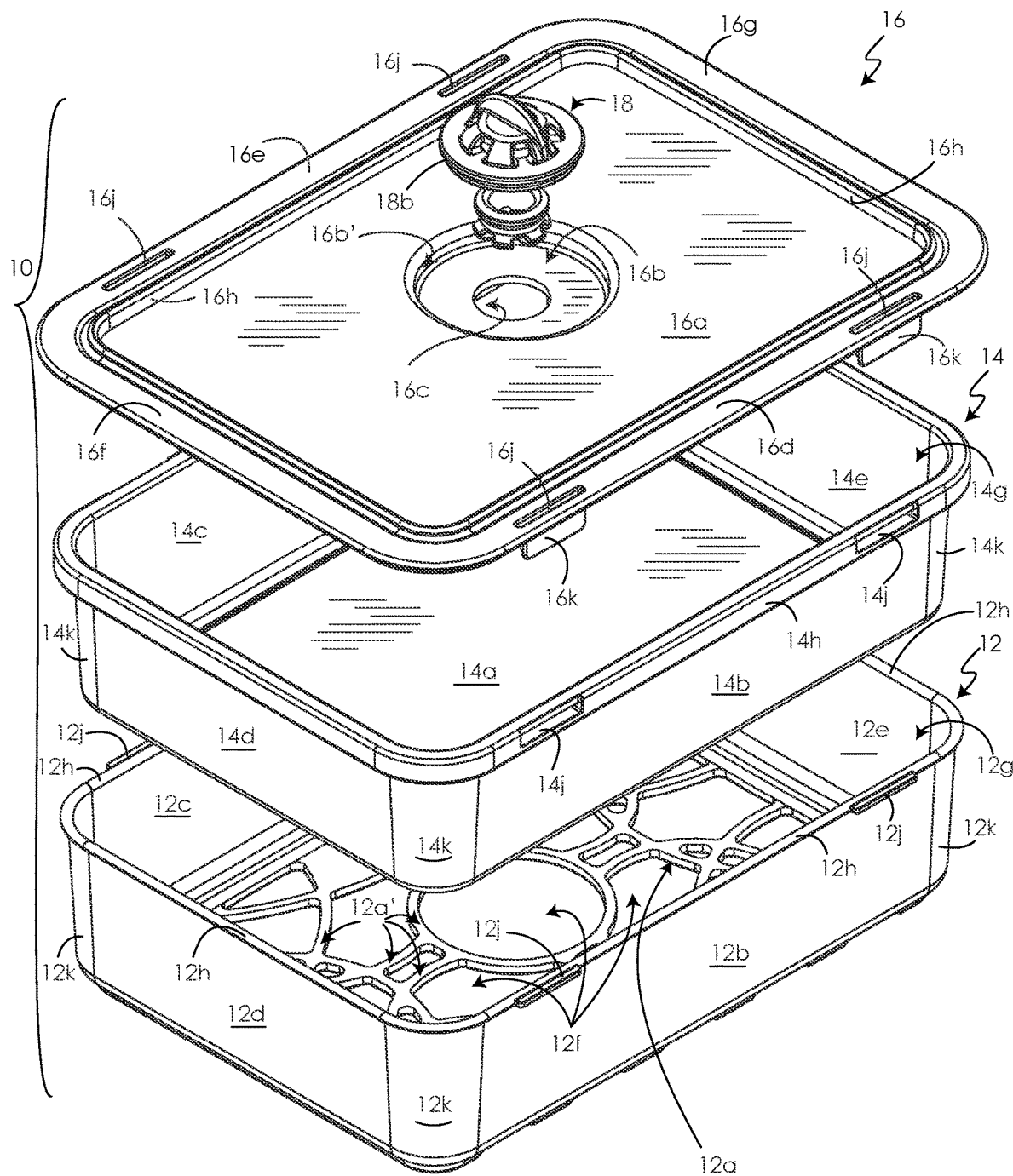
FIG. 2 is an exploded top, front, left side, perspective view of the storage container shown in FIG. 1.
Figure 3:
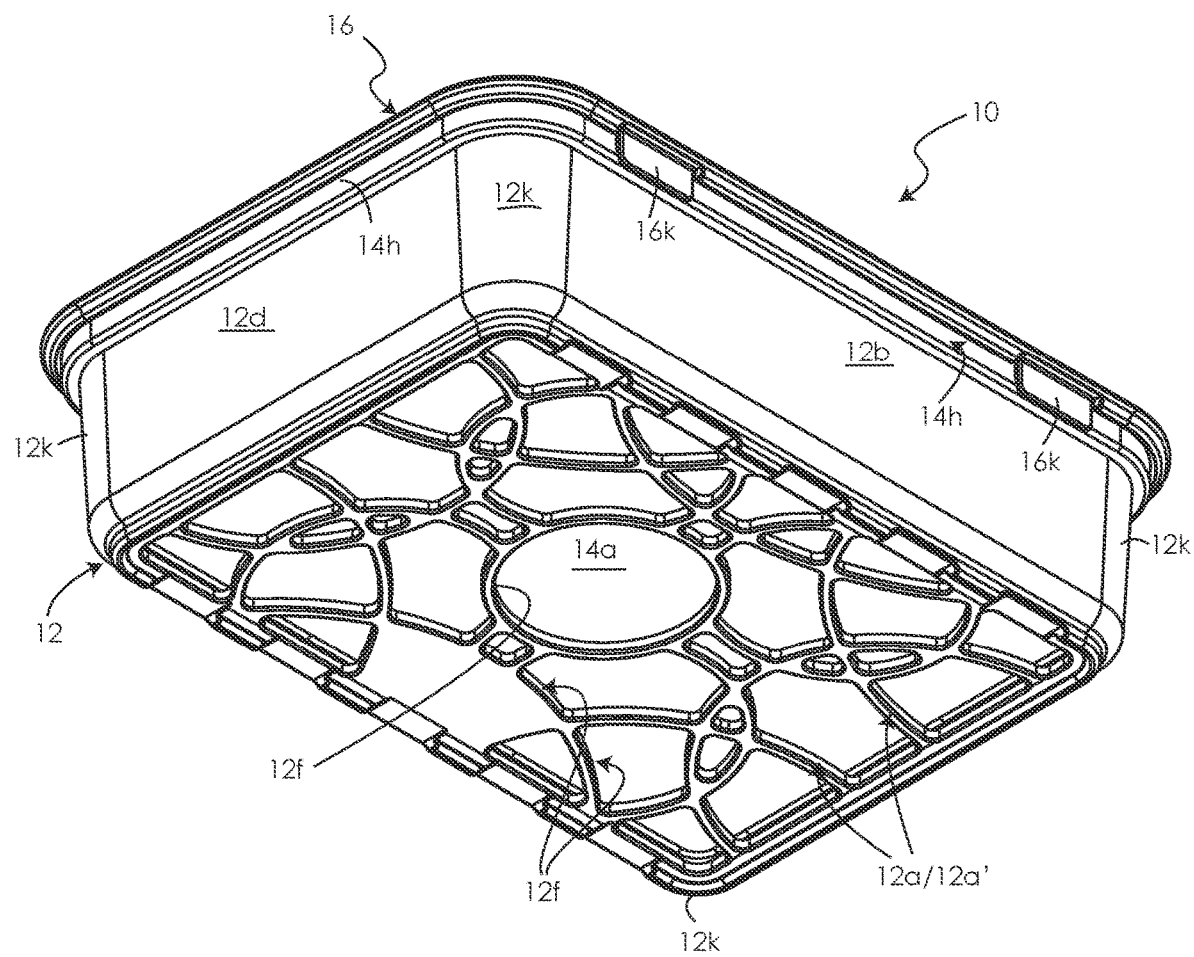
FIG. 3 is a bottom, front, left side perspective view of the storage container of FIG. 1.
Figure 4:
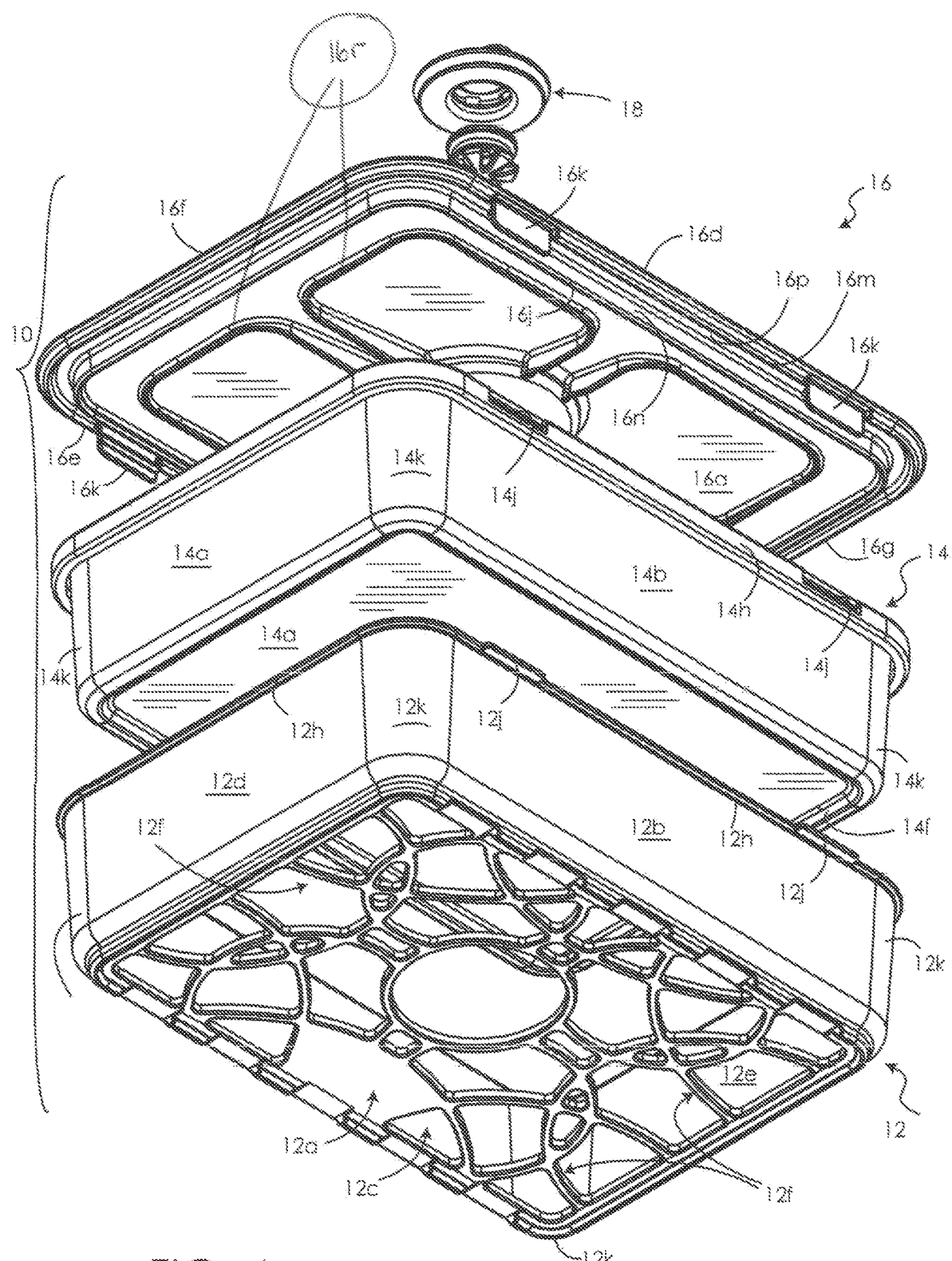
FIG. 4 is an exploded bottom, front, left side perspective view of the storage container shown in FIG. 3.
Figure 6:
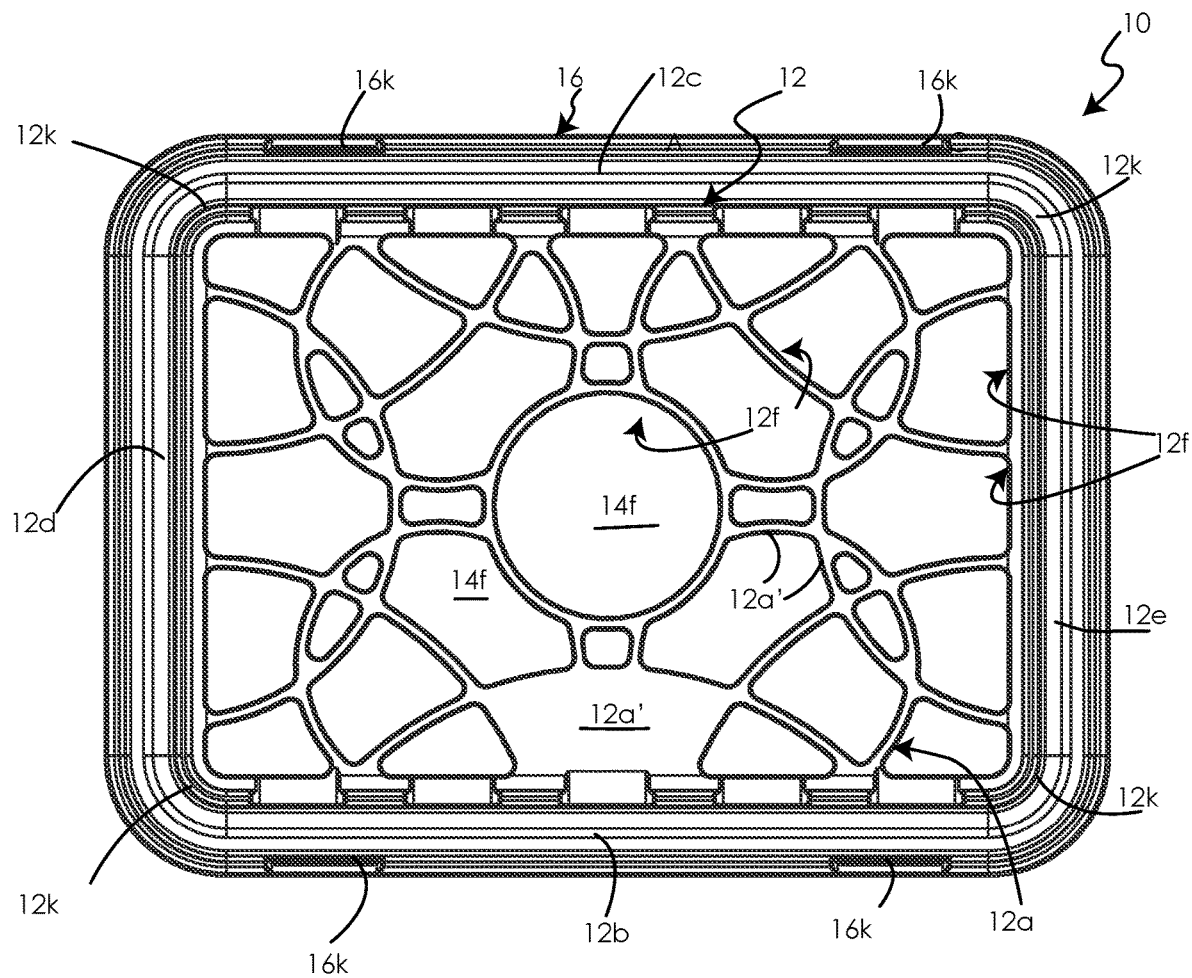
FIG. 6 is bottom plan view thereof.
Figure 7:
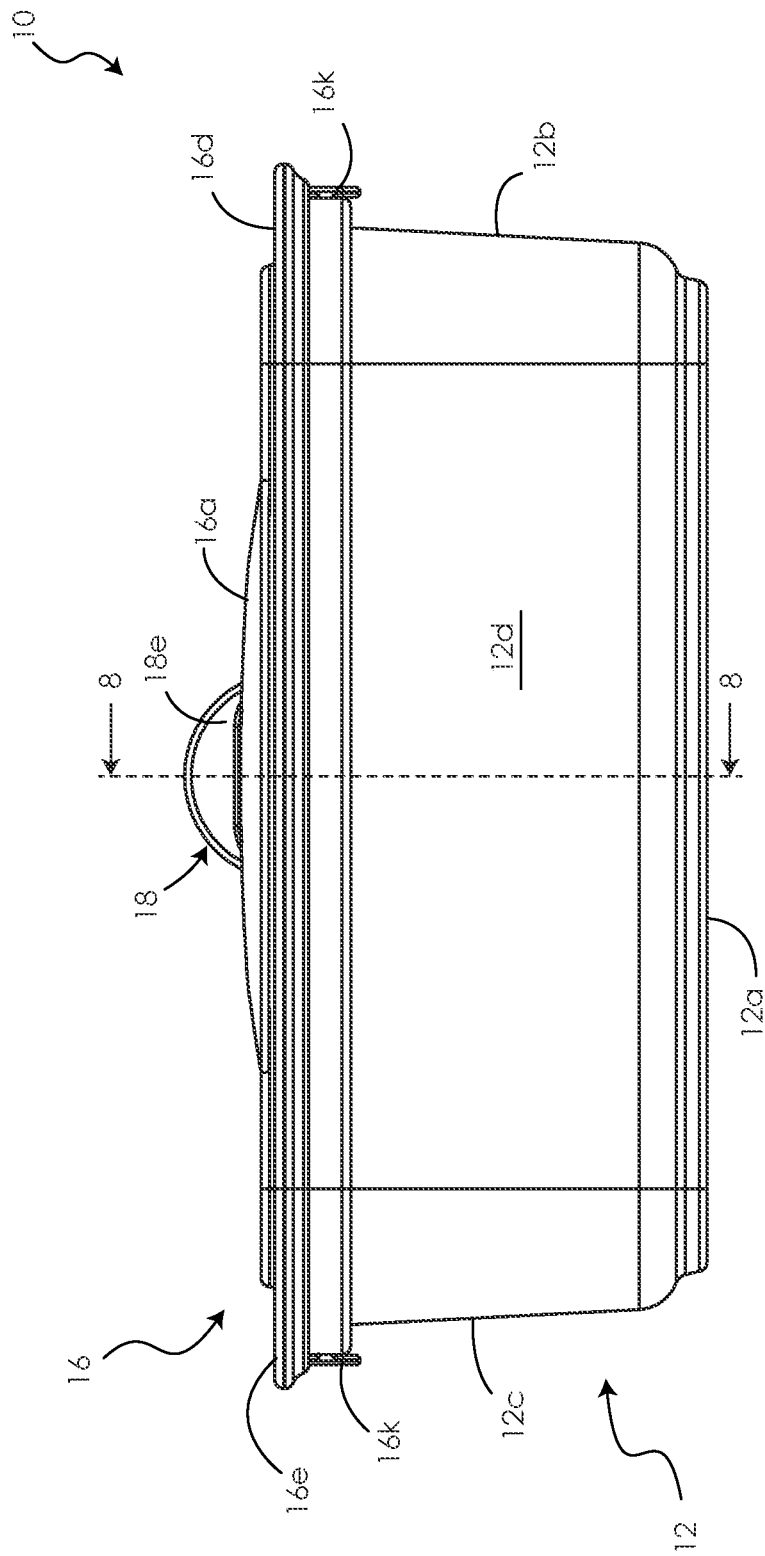
FIG. 7 is a left side elevation view thereof.

As shown in FIGS. 1-4, base 12 comprises a bottom wall 12a, a front wall 12b, a rear wall 12c, a left side wall 12d, and a right side wall 12e. Bottom wall 12a defines a plurality of apertures 12f therein that extend between an upper surface of bottom wall 12a and a lower surface thereof. The apertures 12f are of various shapes and sizes and adjacent apertures are separated from each other by differently shaped ridges 12a' of bottom wall 12a. The pattern of ridges 12a' and apertures 12f is best seen in FIG. 3, 4 or 6. Bottom wall 12a, front wall 12b, rear wall 12c, left side wall 12d, and right side wall 12e bound and define a compartment 12g (FIG. 2). Apertures 12f place compartment 12g (FIGS. 2 and 18) in fluid communication with the environment outside of the base 12.

While base 12 has been illustrated and described herein as defining one or more apertures 12f in the bottom wall 12a, it should be understood that in other embodiments, one or more apertures may be defined in one or more of the front wall 12b, rear wall 12c, left side wall 12d, and right side wall 12e. In these other embodiments, the bottom wall 12a may be substantially continuous and unbroken and free of apertures. In other embodiments, the bottom wall 12a and any of the one or more of the front wall 12b, rear wall 12c, left side wall 12d, and right side wall 12e may include one or more apertures therein. Each aperture extends from an interior surface of the base to an exterior surface thereof and places the compartment 12g of the base 12 in fluid communication with the air in the environment surrounding base 12.

As best seen in FIG. 2, an upper edge of each of the front wall 12b, rear wall 12c, left side wall 12d, and right side wall 12e defines a rim 12h that extends for a distance outwardly beyond the exterior surface of the associated wall 12b, 12c, 12d, 12e. A pair of longitudinally spaced apart projections 12j extend outwardly beyond the rim 12h on each of the front wall 12b and rear wall 12c of base 12.

Figure 8:
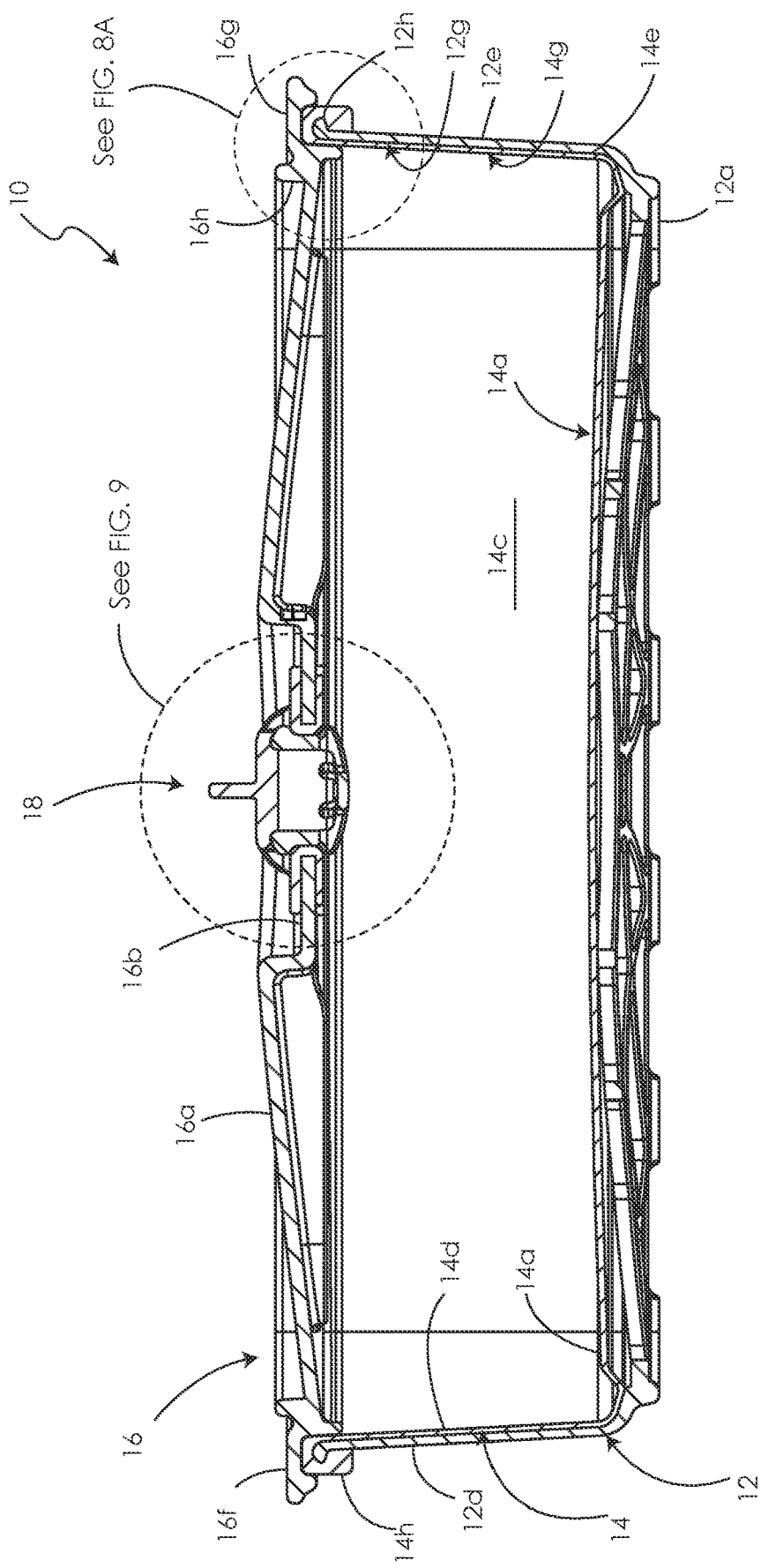
FIG. 8 is a longitudinal cross-section of the storage container taken along line 8-8 of FIG. 7.
Figure 18:
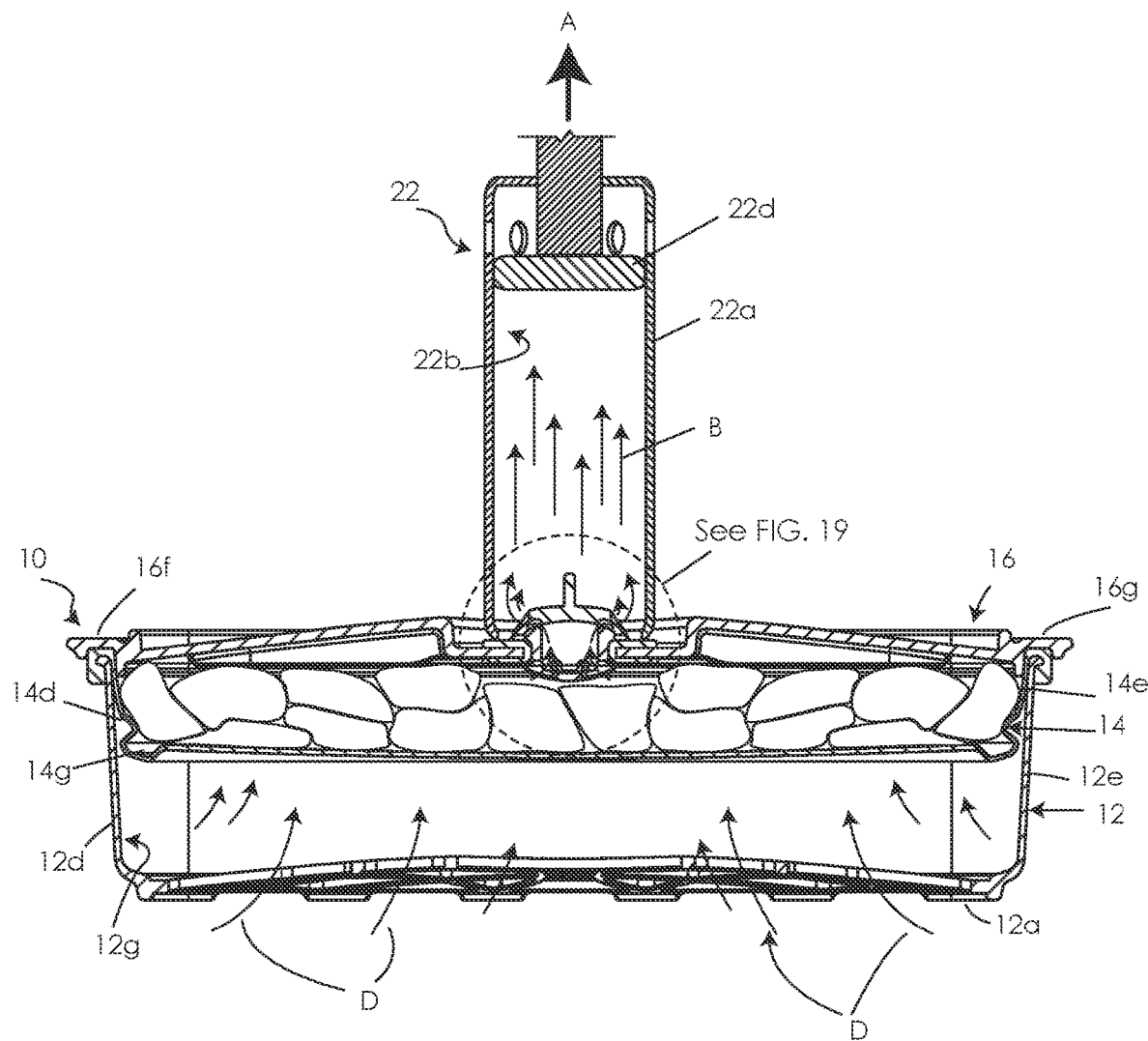
FIG. 18 is longitudinal cross-section of the storage container showing the hand pump evacuating air from the liner and showing the liner rising upwardly within the base and air being drawn from the environment through the apertures defined in the base and the liner collapses under vacuum pressure.

Bottom wall 12a may be fabricated to have a slight convex curvature as can be seen in FIGS. 8 and 18. In particular, a central region of bottom wall 12a may be slightly closer to rim 12h than are the portions of bottom wall 12a that join front wall 12b, rear wall 12c, left side wall 12d, and right side wall 12e. The purpose of the slight curvature of bottom wall 12a will be described later herein.

Figure 5:
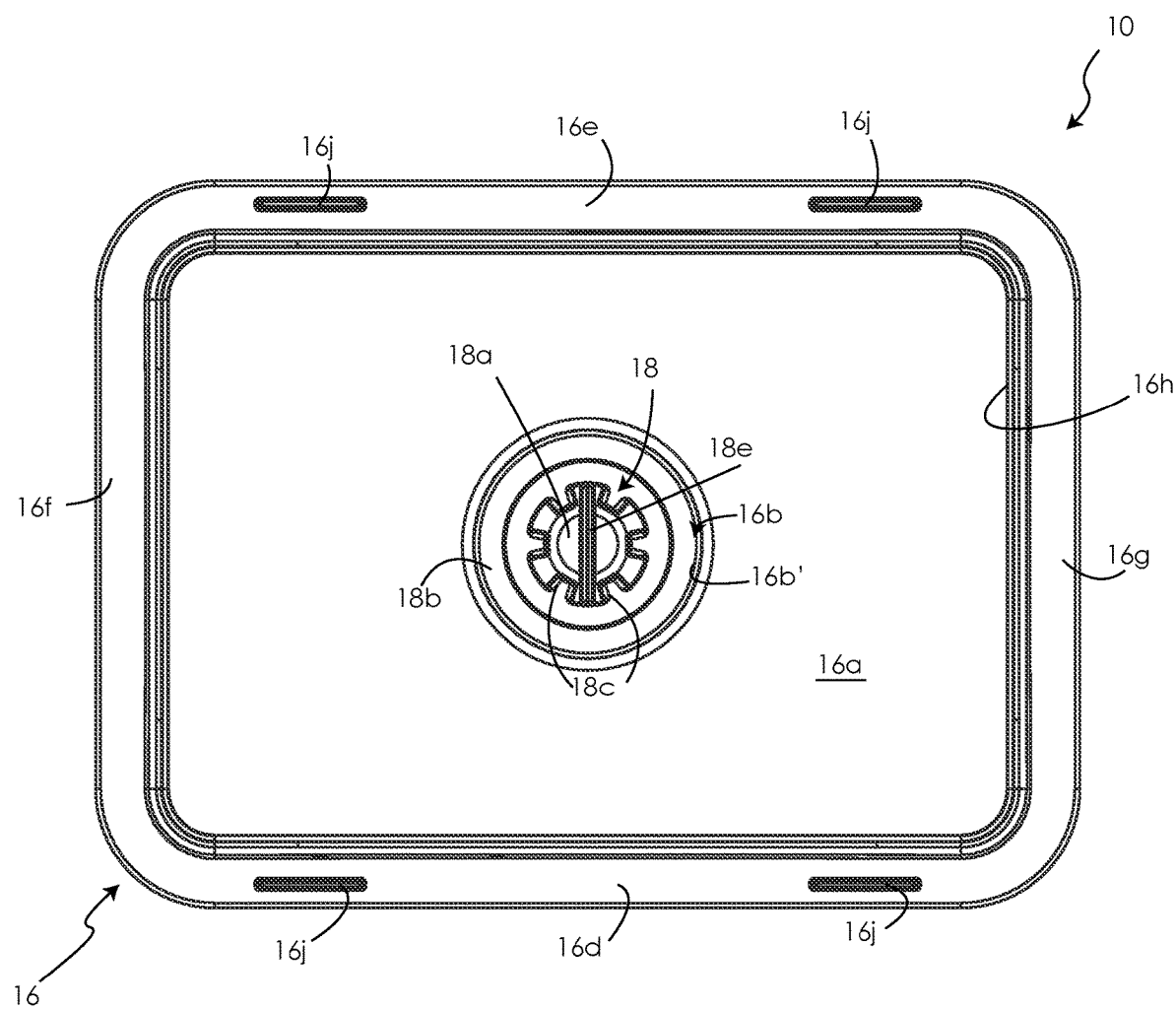
FIG. 5 is a top plan view of the storage container of FIG. 1.

FIG. 5 shows that storage container 10 is generally rectangular in shape and has a longitudinal axis "Y" and a lateral axis "X" that are oriented at right angles to each other. The longitudinal axis "Y" effectively extends from the left side wall 12d of base 12 to right side wall 12e thereof and the longitudinal axis "Y" is oriented at right angles to the walls 12d, 12e. Lateral axis "X" is oriented at right angles to longitudinal axis "Y" and effectively extends from front wall 12b of base 12 to rear wall 12c thereof. Lateral axis "X" is oriented at right angles to front and rear walls 12b, 12c.

Base 12 has a length "L" from left side wall 12d to right side wall 12e, a width "W" from front wall 12b to rear wall 12c, and a height "H" from bottom wall 12a to rim 12h. It will be understood that base 12 of storage container 10 may be fabricated to be of desired length "L", width "W", and height "H". The length "L" and width are slightly smaller proximate bottom wall 12a than proximate rim 12h. As a consequence base flare outwardly to a slight degree moving from bottom wall 12a to rim 12h.

Base 12 defines rounded corners 12k where front wall 12b meets left side wall 12d and right side wall 12e; and where rear wall 12c meets left side wall 12d and right side wall 12e. The corners 12k help to ensure that base 12 does not present any sharp edges that may accidentally hurt a user while handling storage container 10 or may damage other containers with which container 10 may come into contact.

It will be understood that in other embodiments, storage container 10 may be fabricated to be square, or circular, or triangular, or any other desired shape.

Referring to FIGS. 2 and 3, liner 14 is configured to be nestingly engaged within the compartment 12g defined by base 12. In particular, liner 14 is of a shape and size (length, width, and height) that is complementary to the shape and dimensions of the interior surface of the base 12 that bounds and defines the compartment 12g. The exception with respect to the dimensions of the liner 14 and base 12 is the height of the peripheral side walls of the liner 14 that extend upwardly from a bottom wall, as will be described below. The height of the peripheral side walls of the liner 14 are slightly longer than the height of the peripheral side walls of the base 12 (i.e., front wall 12b, rear wall 12c, left side wall 12d, and right side wall 12e). A portion of the peripheral side walls of the liner 14 overlap the rim 12h of the base 12 and effectively form a seal between the base 12 and lid 16. The portions of the peripheral walls that overlaps the rim 12h forms the rim 14h of the liner 14.

Liner 14 is fabricated from a pliable material. In other words, the material is flexible and supple and will readily bend and fold and is capable of collapsing in upon itself when air is evacuated from a compartment defined by the material. The suitable material is also resilient. In other words, the material will rebound and return to its original shape when air is re-introduced into the compartment thereof. If the storage container 10 is to be used to store foodstuffs, then liner 14 will be fabricated from a material that is food grade. One suitable material for fabricating liner 14 is silicone. The silicone liner 14 is fabricated to be of a wall thickness that makes the liner 14 pliable and resilient, and strong enough to stand vacuum conditions.

Liner 14 includes a bottom wall 14a, a front wall 14b, a rear wall 14c, a left side wall 14d, and a right side wall 14e. Bottom wall 14a is slightly recessed inwardly and upwardly relative to where bottom wall 14a meets front wall 14b, rear wall 14c, left side wall 14d, and right side wall 14e. A lip 14f (FIG. 4) circumscribes bottom wall 14a. Bottom wall 14a, front wall 14b, rear wall 14c, left side wall 14d, and right side wall 14e bound and define a compartment 14g.

An upper end of each of the front wall 14b, rear wall 14c, left side wall 14d, and right side wall 14e forms a rim 14h that extends laterally outwardly beyond the exterior surface of the associated one of the front wall 14b, rear wall 14c, left side wall 14d, and right side wall 14e. The rim 14h includes a first leg that extends outwardly from the associated wall 14b-14e and is oriented generally parallel to the rim 12h of base 12 when liner 14 is received within compartment 12g defined by base. Rim 14h includes a second leg that extends downwardly for a short distance from first leg and in a direction towards bottom wall 14a. The second leg is generally parallel to the associated one of the front, rear, left side and right side wall 14b, 14c, 14d, 14e.

The length and width of liner 14 are substantially complementary to the length "L" and width "W" of base 12. Liner 14 is configured to be received in the compartment 12g of base 12. When this occurs, bottom wall 14a of liner 14 is located proximate an upper surface of bottom wall 12a of base 12. Front wall 14b is located proximate an inner surface of front wall 12b, rear wall 14c is located proximate an inner surface of rear wall 12c; left side wall 14d is located proximate an inner surface of left side wall 12d; and right side wall 14e is located proximate an inner surface of right side wall 12e. When liner 14 nests within base 12, the rim 14h of liner 14 rests upon the rim 12h of base 12. At least part of the second leg of rim 14h extends for a distance downwardly below the rim 12h of base 12. This can be seen in FIG. 8. Because of this relationship, it will be understood that the height of liner 14 may be slightly greater than the height "H" of base 12.

As best seen in FIGS. 2 and 4, the rim 14h of liner 14 proximate front wall 14b defines a pair of longitudinally-spaced apart slots 14j therein. The slots 14j extend from an exterior surface of the second leg of rim 14h to an interior surface of the second leg. The slots 14j are positioned to align with the projections 12j provided on base 12 and are configured to interlockingly engage the same, as will be later described herein. A similar pair of longitudinally-spaced apart slots 14j is defined in the portion of rim 14h proximate rear wall 14c and is configured to interlockingly engage with the projections 12j on the rear wall 12c of base 12.

Liner 14 defines rounded corners 14k where front wall 14b meets left side wall 14d and right side wall 14e; and where rear wall 14c meets left side wall 14d and right side wall 14e. The curvature of corners 14k is complementary to the curvature of corners 12k on base 12.

Turning now to FIGS. 2, 4, and 8, lid 16 is shown in greater detail. Lid 16 is configured to be interlockingly engaged and locked to both liner 14 and base 12, as will be described hereafter. As discussed earlier herein, lid 16 is fabricated from a similar material to base 12. Lid 16 includes a wall 16a that has an upper surface and a lower surface. A recessed hub 16b is defined in wall 16a and a hole 16c is defined within the hub 16b. A shoulder wall 16b' extends generally vertically between hub 16b and wall 16a. Wall 16a is circumscribed by a flange that includes a front section 16d, a rear section 16e, a left side section 16f, and a right side section 16g. The front section 16d, rear section 16e, left side section 16f, and right side section 16g are elevated relative to wall 16a such that a substantially vertical shoulder 16h circumscribes wall 16a. The front section 16d, rear section 16e, left side section 16f, and right side section 16g are oriented generally at right angles to shoulder 16h. As is best seen in FIG. 8, wall 16a slopes radially outwardly and downwardly from a high point proximate the shoulder wall 16b' of hub 16b to shoulder 16h.

A pair of longitudinally-spaced slots 16j are defined in each of the front section 16d and rear section 16e of lid 16. This can be seen in FIG. 1. Additionally a pair of longitudinally-spaced tabs 16k extend downwardly from front section 16d. A similar pair of longitudinally-spaced tabs 16k extend downwardly from rear section 16d. Slots 16j and tabs 16k are located so that they will be aligned with the slots 14j and the projections 12j in the liner 14 and base 12, respectively. The tabs 16k, slots 14j, and projections 12j, together, form a locking mechanism for securing locking lid 16, liner 14, and base 12 together, as will be described later herein.

Figure 8A:
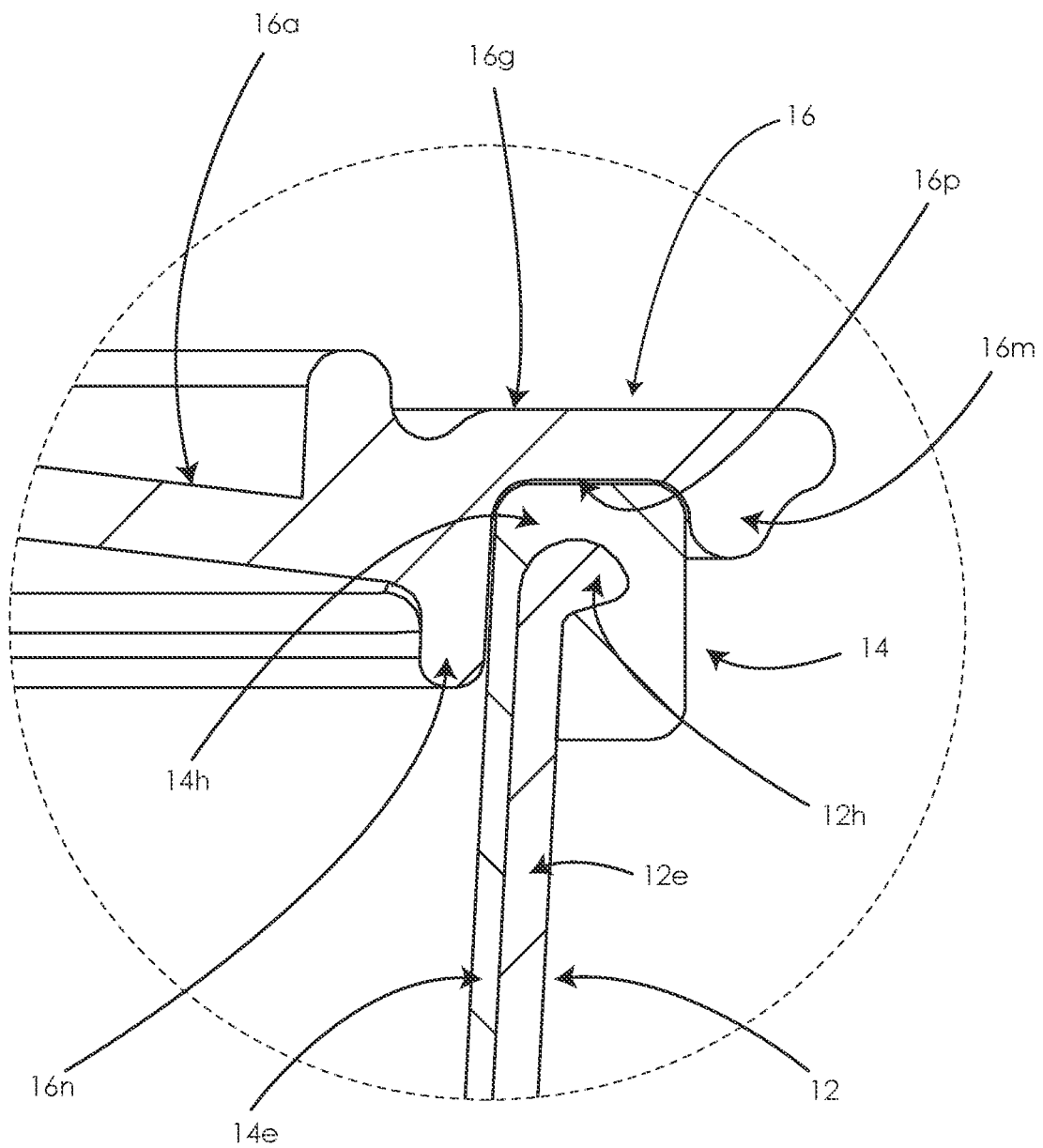
FIG. 8A is an enlargement of a first highlighted region of FIG. 8.

As best seen in FIG. 8A, lid 16 is configured such that a first annular flange 16m and a second annular flange 16n extend downwardly from a lower surface of the lid 16. In particular, the first and second flanges 16m, 16n extend generally vertically downwardly from front section 16d, rear section 16e, left side section 16f, and right side section 16g. The flange 16m is of a shorter length than is the flange 16n. A generally U-shaped channel 16p is defined between flanges 16m and 16n and the rims 12h, 14h of the base 14 and liner 14 are snap-fittingly received in the channel 16p.

FIG. 8A shows a groove 16q is defined in an upper surface of right side section 16g a distance inwardly from the outermost edge of right side section 16g. Similar grooves are provided in each of the front section 16d, rear section 16e, left side section 16f and right side section 16g. Groove 16q thins a portion of the lid 16 and creates a living hinge that makes it easier to remove lid 16 from base 12.

As best seen in FIG. 4, the lower surface of lid 16 includes a plurality of downwardly extending ridges 16r that will project for a distance downwardly into the compartment 14g of the liner 14 when lid 16 is engaged with liner 14 and base 12. As illustrated, ridges 16r are arranged to form four generally rectangular regions that terminate in the downwardly extending portion of the bottom wall that defines the perimeter of the hub 16b. The purpose of ridges 16r will be described later herein.

Figure 13:
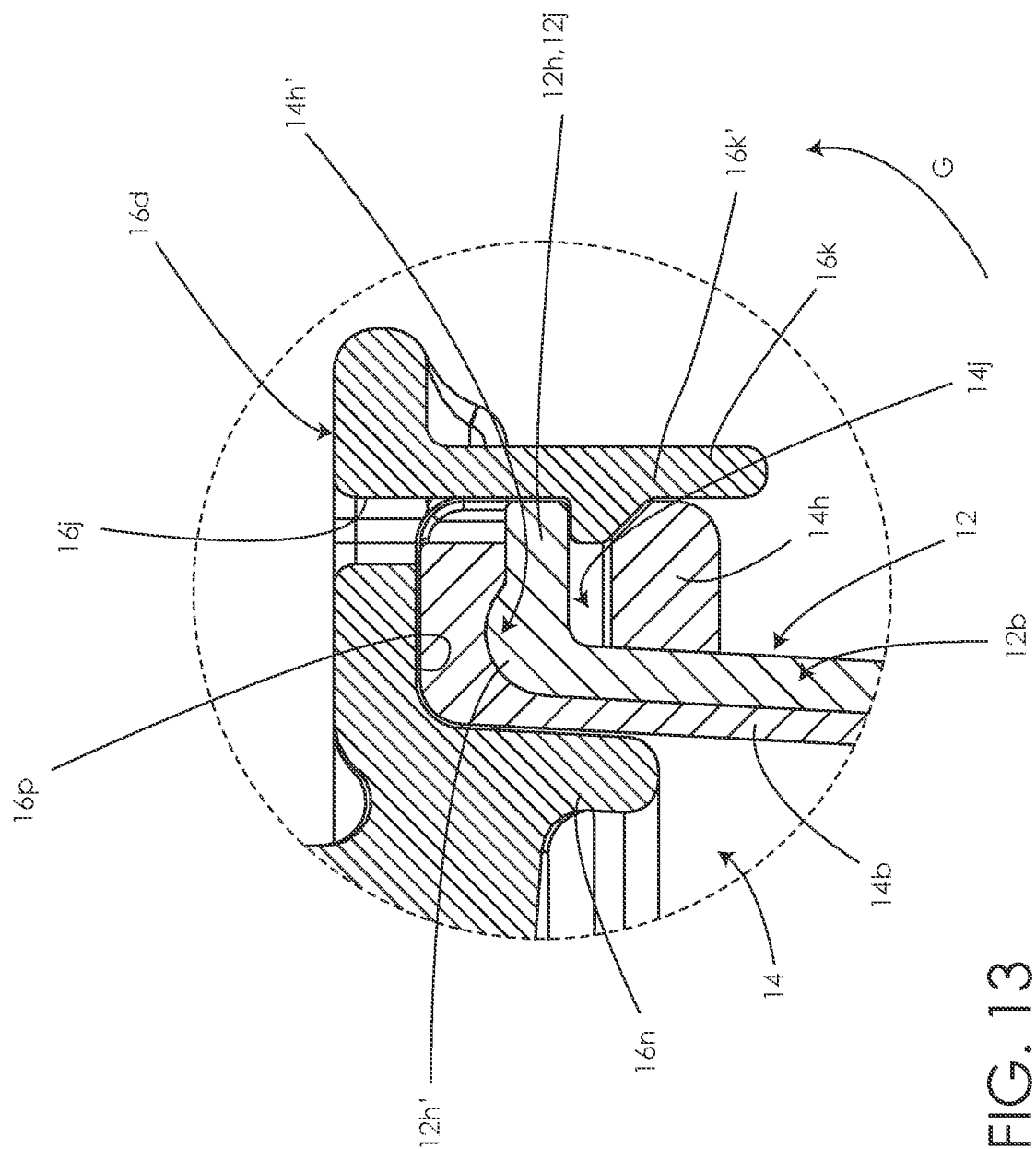
FIG. 13 is an enlargement of the highlighted region of FIG. 12.

FIG. 13 shows an enlarged cross-section through the lid 16, liner 14, and base 12 where the rear section 16e of the lid 16 engages with the rims 12h, 14h of the base 12, and liner 14. FIG. 13, together with FIG. 8A, shows that when base 12 and liner 14 are engaged with each other, the rim 14h of liner 14 rests on the rim 12h of base 12. In the vicinity of the projections 12j and slots 14j, the projection 12j is received through the slot 14j, as is illustrated in FIG. 13. Additionally, the rim 12h of base 12 forms a bead 12h' that is received in a complementary groove 14h' defined by rim 14h of liner 14. The interlocking bead 12h' and groove 14h' help the liner 14 and base 12 to interlockingly engage one another. Furthermore, when lid 16 is placed over liner 14, the interlocked rims 12h, 14h are received in the channel 16p defined by the lid 16. The downwardly extending tab 16k of lid 16 includes a protuberance 16k' that is received in a region of the slot 14j that is immediately beneath the projection 12j, thereby locking the lid 16, liner 14, and base 12 together. If it is later decided to disengage lid 16 from liner 14 and base 12, the tab 16k is pulled, with a fingertip, outwardly away from the exterior surface of the base 12. The slots 16j defined in lid 16 allow the tabs 16k to be rotated slightly relative to the local region of the lid 16 in order to enable disengagement of the tabs 16k from the slot 14j. Rotating the tab 16k will cause the protuberance 16k' to be removed from the region of the slot 14j beneath the projection 12j. The lid 16 is then free to be removed from the interlocked liner 14 and base 12 by lifting the lid 16 vertically. The liner 14 may then be lifted vertically upwardly to separate the liner 14 from the base 12.

Figure 9:
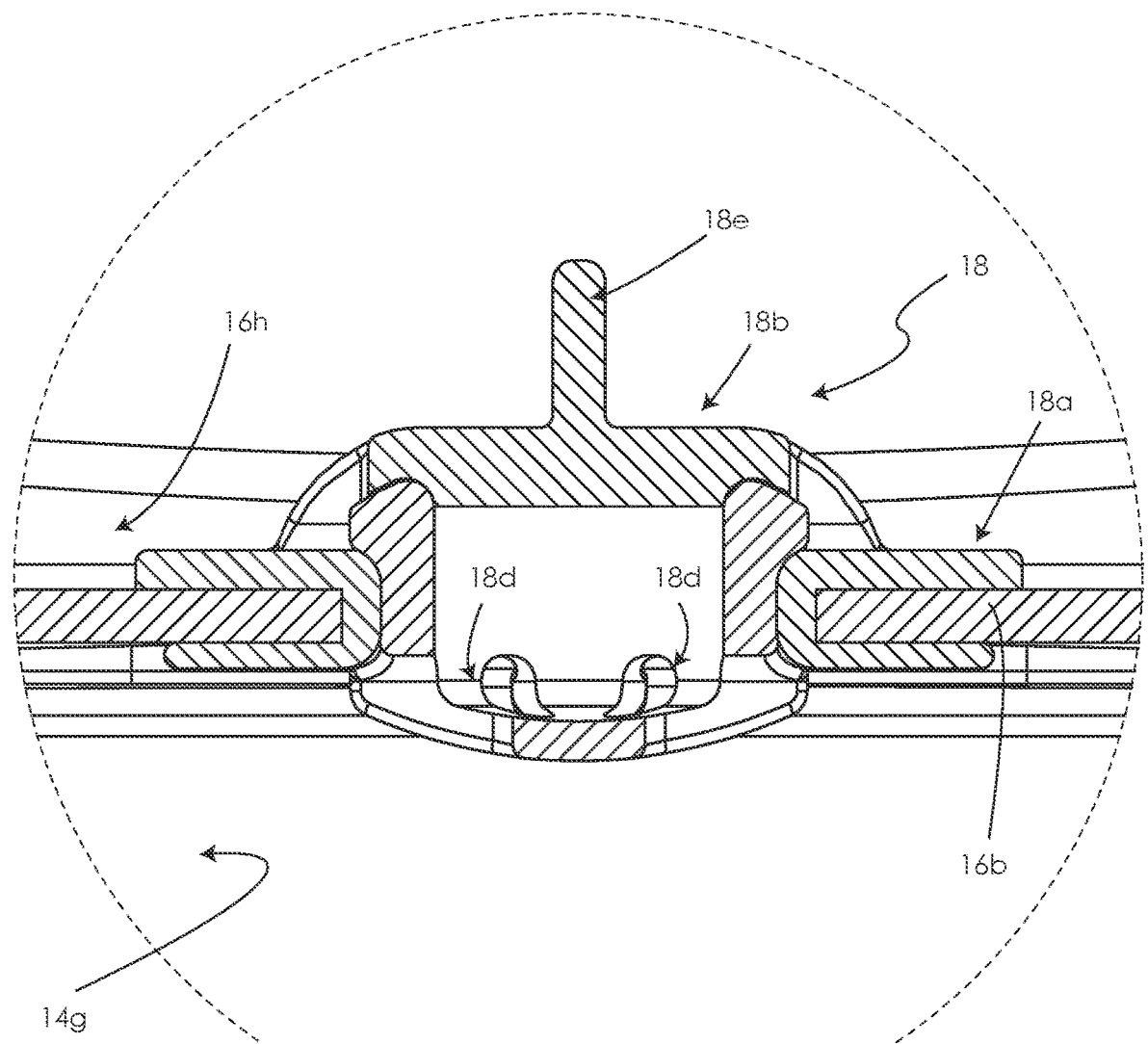
FIG. 9 is an enlargement of a second highlighted region of FIG. 8.
Figure 10:
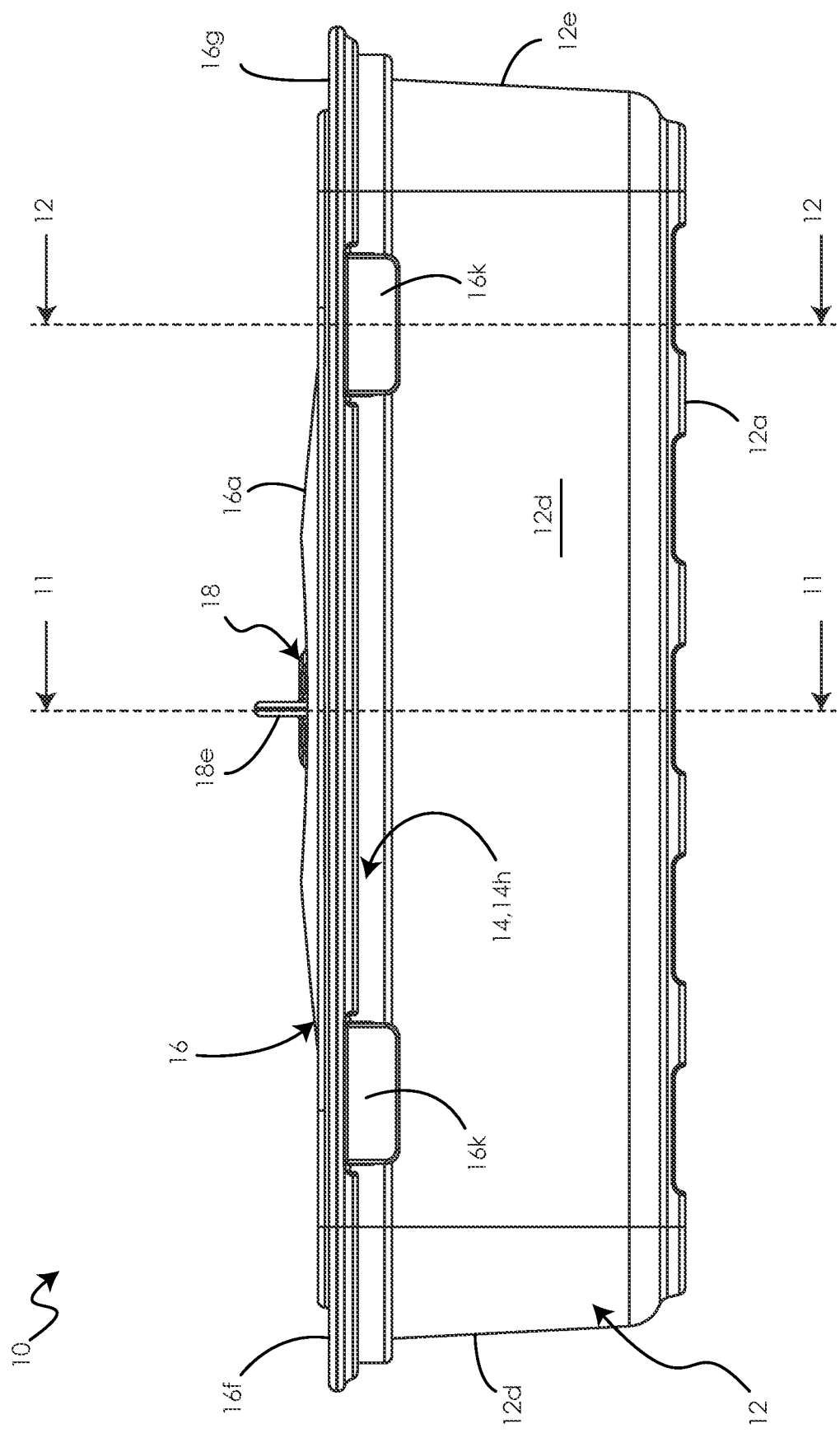
FIG. 10 is a front elevation view of the storage container; and the rear elevation view is substantially identical thereto.
Figure 11:
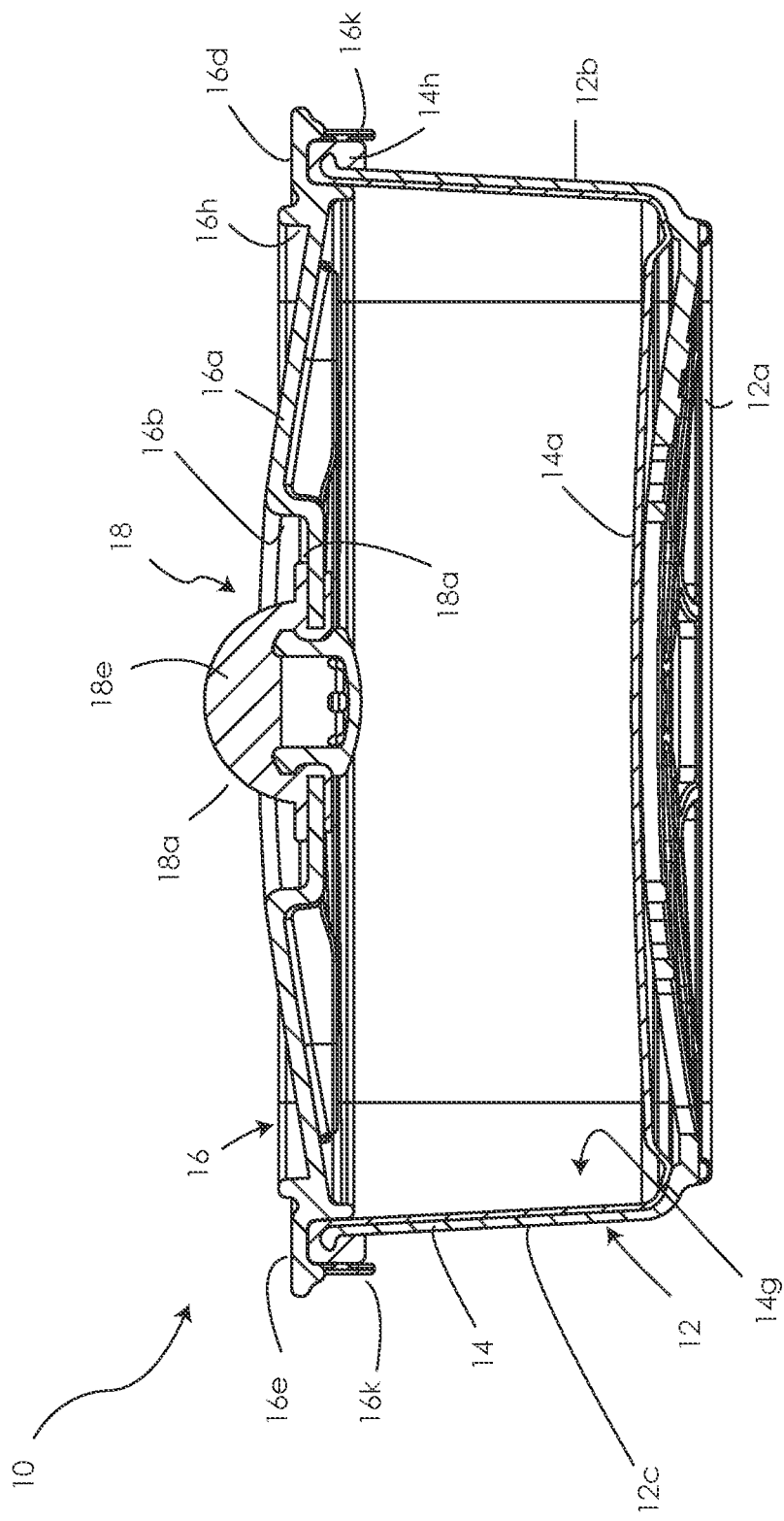
FIG. 11 is a transverse cross-section of the storage container taken along line 11-11 of FIG. 10.
Figure 12:
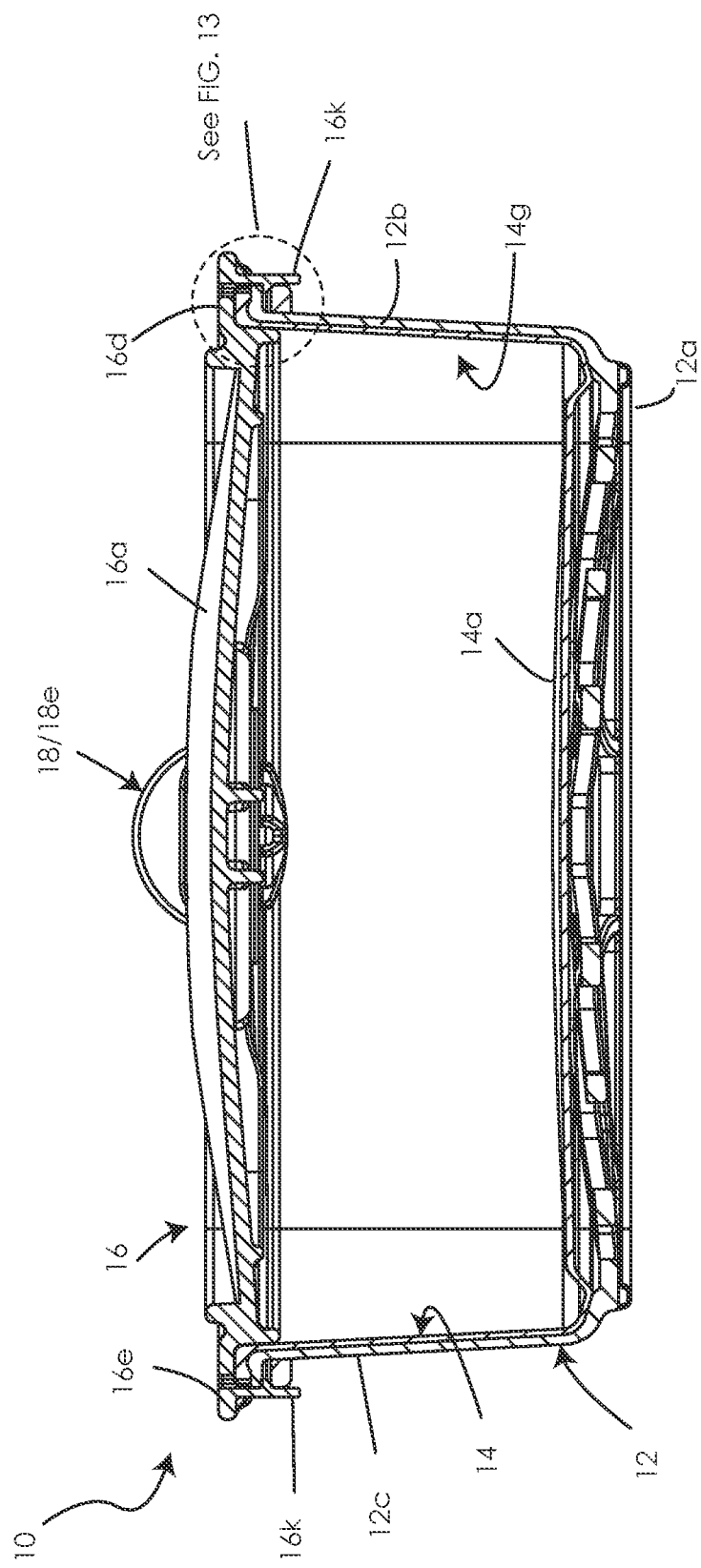
FIG. 12 is a transverse cross-section of the storage container taken along line 12-12 of FIG. 10.
Figure 19:
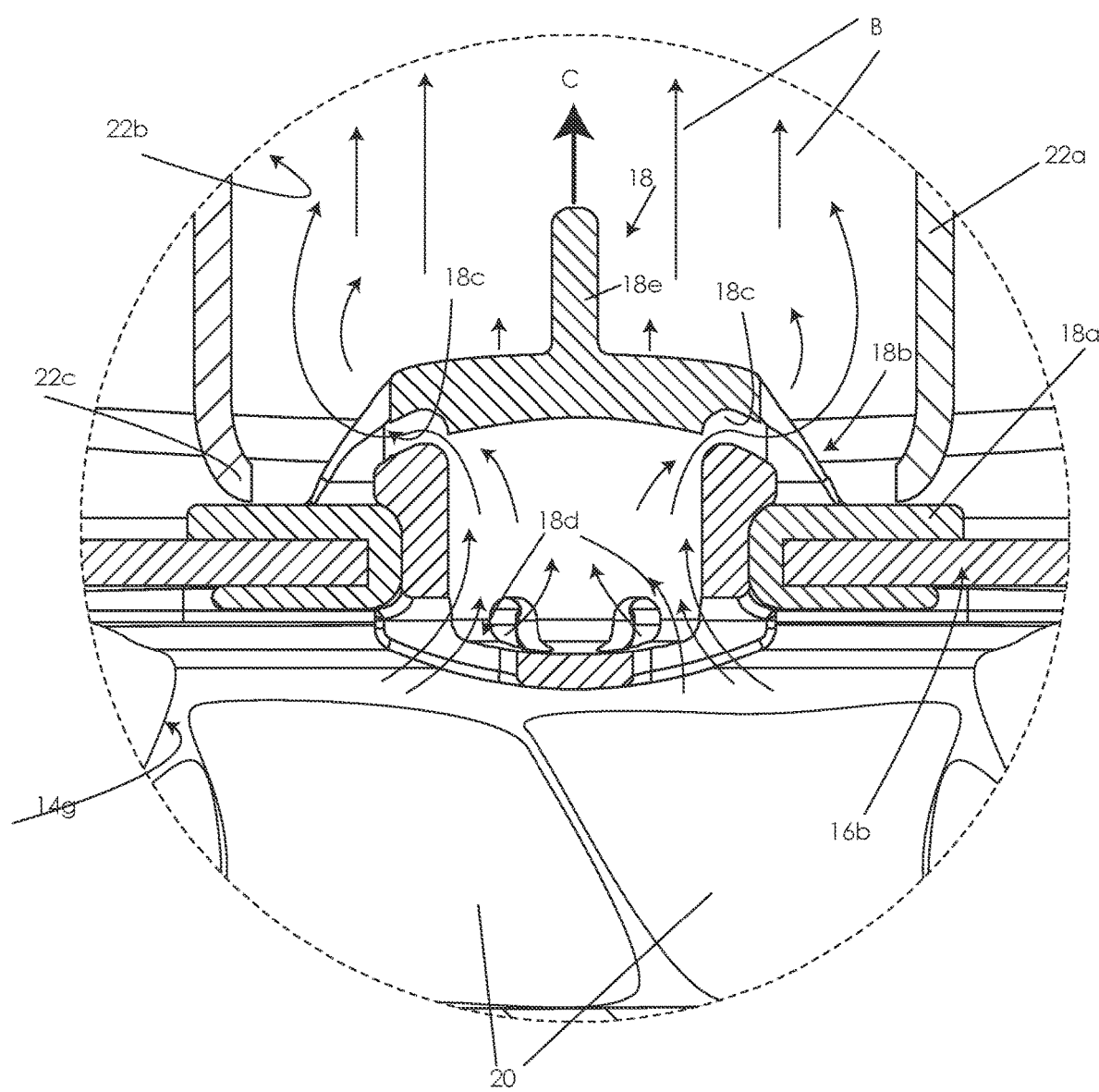
FIG. 19 is an enlargement of the highlighted region of FIG. 18.
Figure 23:
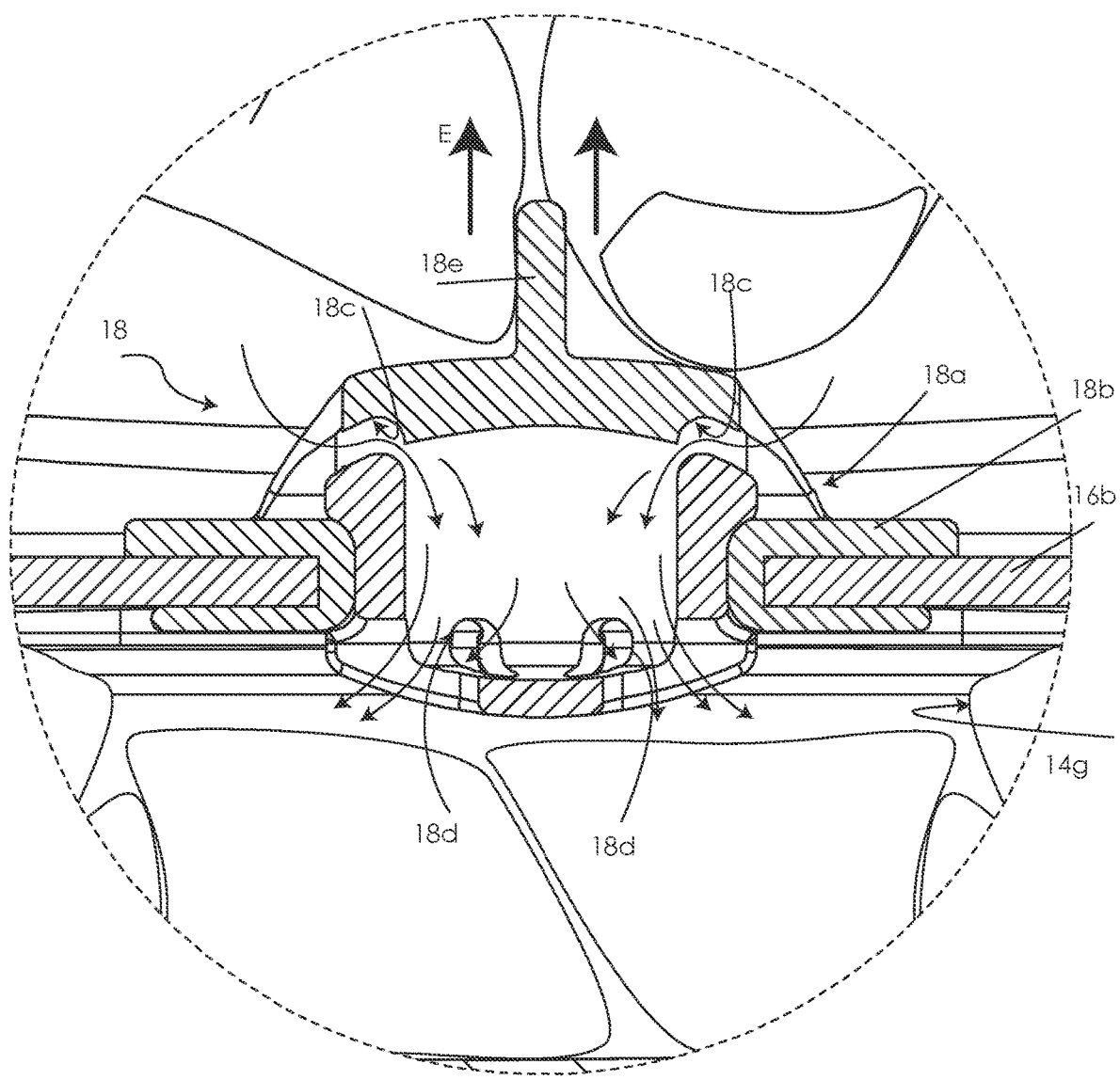
FIG. 23 is an enlargement of the highlighted region of FIG. 22.

Referring to FIGS. 2, 4, and 9, a valve assembly 18 is operatively engaged with lid 16. Valve assembly 18 may be any suitable valve that is able to be selectively activated to move between an open position and a closed position, as will be described later herein. Valve assembly 18 may be a one-way valve that is activated to allow airflow in a single direction when air is evacuated from the compartment 14*g* of liner 14, as will be described later herein. As illustrated, valve assembly 18 includes a bayonet mount seat 18*a* (FIG. 9) and a flapper valve 18*b* that is operatively engaged with seat 18*a*. When base 12, liner 14 and lid 16 are operatively engaged with each other and valve assembly 18 is in the closed position (FIG. 9), air cannot flow into or out of the compartment 14*g* defined by liner 14. Valve assembly 18 is selectively movable to the open position (FIG. 19) in order to evacuate air from compartment 14*g* or to allow air to flow back into compartment 14*g* (as shown in FIG. 23). The operation of valve assembly 18 will be described further later herein. Valve assembly 18 defines one or more passageways 18*c*, 18*d* (FIG. 19) which allow air to flow therethrough. Flapper valve 18*b* is provided with a finger grip 18*e* that is able to be used to selectively move the flapper valve 18*b* to the open position.

It will be understood, as an alternative, that the lid may be provided with a rotating bayonet engagement between the valve and lid. In this instance, the valve may simply be rotated to allow air to flow back into the compartment of the storage container.

Figure 14:
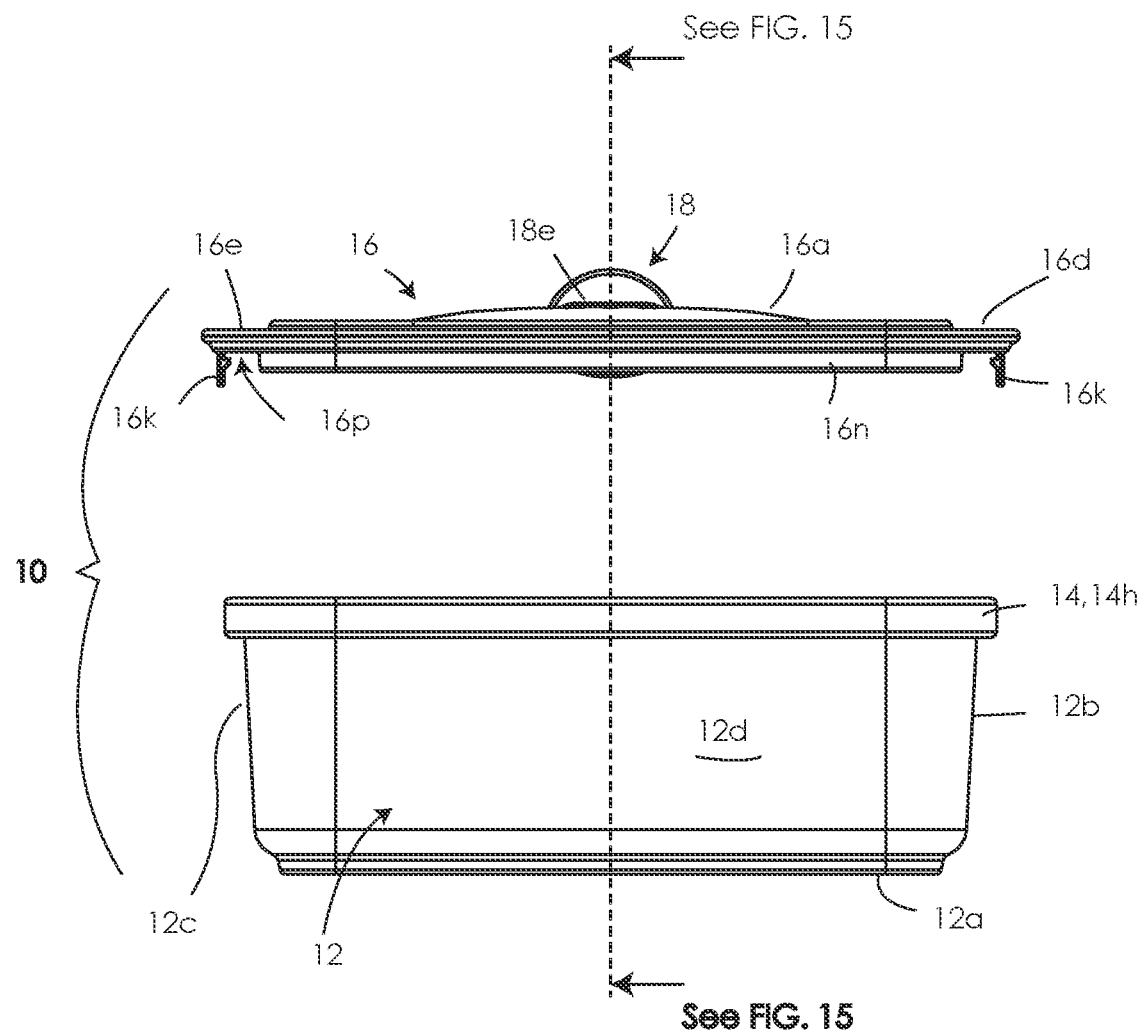
FIG. 14 is a left side elevation view of the storage container showing the lid removed from the rest of the storage container.
Figure 15:
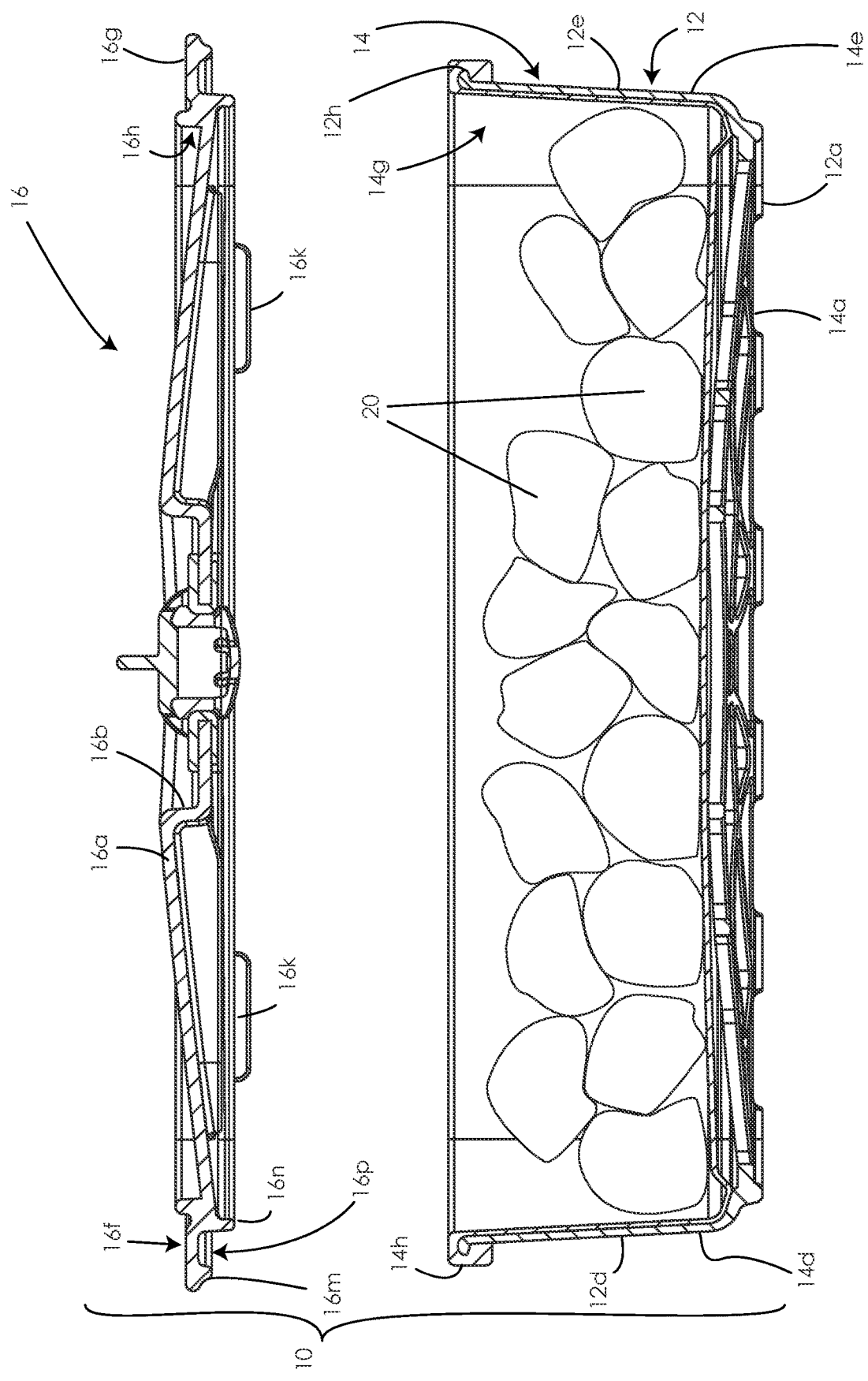
FIG. 15 is a longitudinal cross-section of the storage container shown in FIG. 14 and showing pieces of food placed into the compartment of the container's liner.

Having described the basic structure of storage container 10, the manner in which container 10 is used will now be described with reference to FIGS. 14 to 23. As shown in FIGS. 14 and 15, liner 14 may be operatively engaged with base 12 as has been previously described herein. Lid 16 is initially separate from the engaged liner and base in order to allow a user access to the compartment 14*g* of the liner 14. The user places a plurality of pieces of food 20 (FIG. 15) within the compartment 14*g*. Lid 16 is then placed over the engaged liner 14 and base 12 in such a way that the rim 14*h* of the liner is received within the channel 16*p* defined by lid 16. Tabs 16*k* are pushed inwardly toward the exterior surface of base 12 so that tabs 16*k* are moved into interlocking engagement with the slots 14*j* and projections 12*j* of the liner 14 and base 12 as previously described herein and illustrated in FIG. 13. The tabs 16*k* snap into locking engagement with slots 14*j* and projections 12*j* and thereby ensure a good vacuum seal between lid 16 and liner 14.

Figure 16:
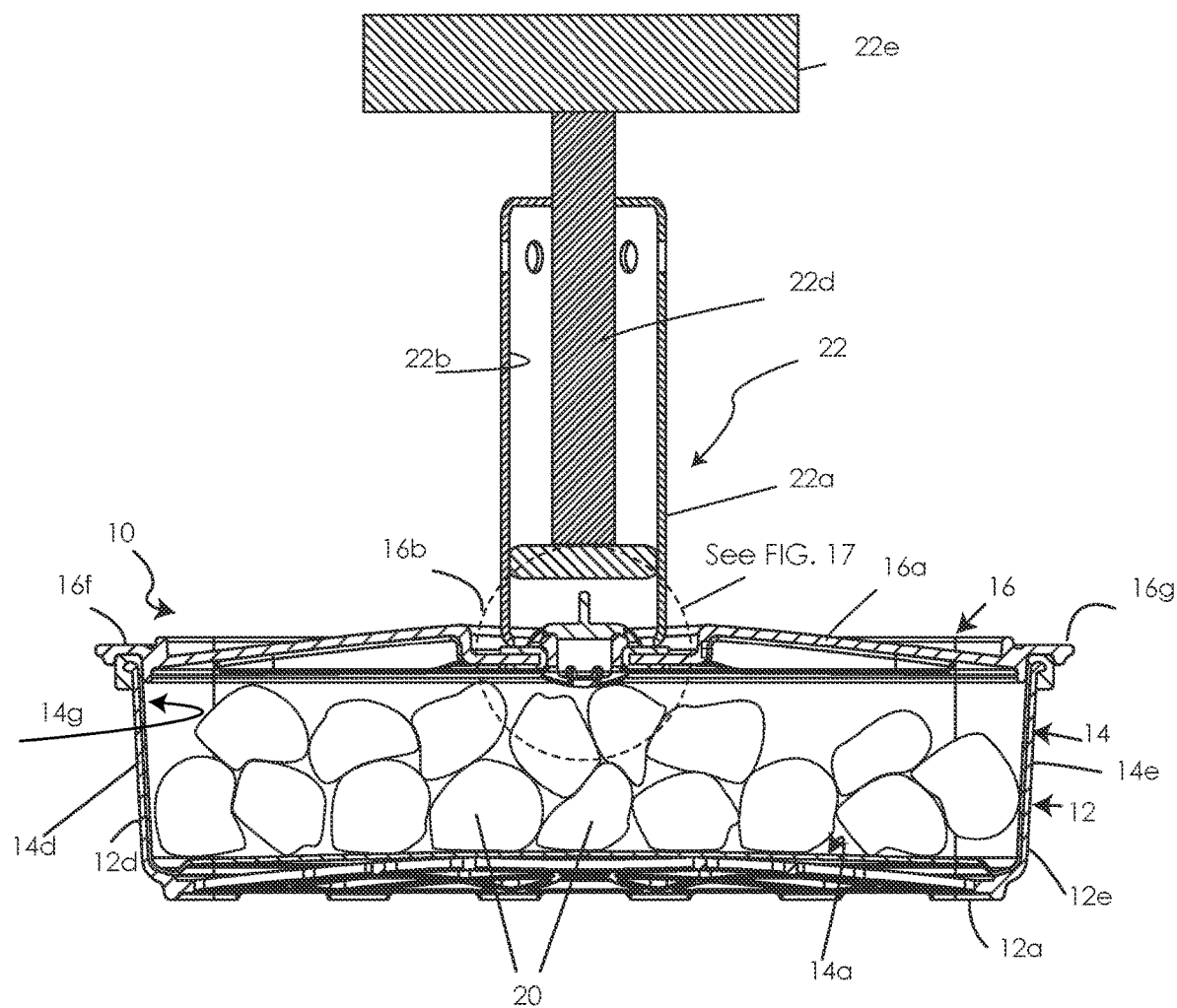
FIG. 16 is a longitudinal cross-section of the storage container with the lid operatively engaged and locked together with the liner and base, and showing a hand pump in a position ready for use in evacuating the air from the compartment of the liner.

FIG. 16 shows the lid 16, liner 14 and base 12 in the closed and locked position with the pieces of food 20 retained within the compartment 14*g* of the liner 14. A pump 22 is then utilized to evacuate air from the compartment 14*g* of liner 14. The attached figures illustrate a hand pump being utilized to evacuate air from compartment 14*g* but it will be understood that an electric pump may be used instead. Any method of removing air from compartment 14*g* may be utilized. The illustrated pump 22 includes a tubular shaft 22*a* having an interior bore 22*b* that is accessible through an opening defined by a free end 22*c* of shaft 22*a*. Pump 22 further includes a plunger 22*d* that is movable upwardly or downwardly within bore 22*b* by pulling on a handle 22*e* or pushing downwardly on the handle 22*e*.

Figure 17:
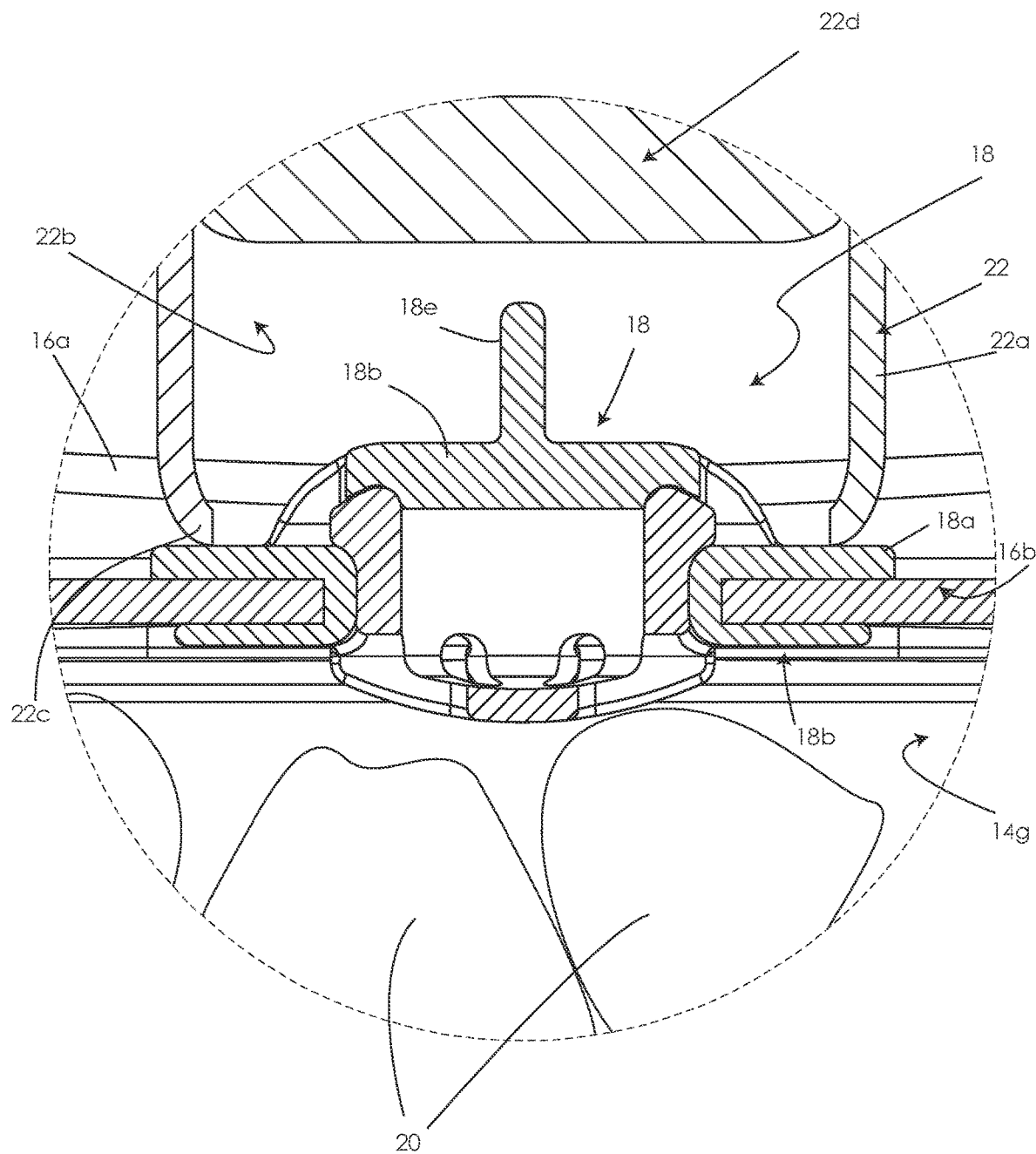
FIG. 17 is an enlargement of the highlighted region of FIG. 16.

When it is desired to evacuate air from compartment 14*g* of liner 14, free end 22*c* of shaft 22*a* is placed on seat 18*a* of valve assembly 18 as illustrated in FIG. 17. Handle 22*e* is drawn upwardly in the direction of arrow "A" (FIG. 18) and this motion draws plunger 22*d* upwardly in the direction "A" creating a suction force within bore 22*b*. This suction force is illustrated by the arrows "B" in FIGS. 18 and 19. The suction force causes flapper valve 18*b* to be lifted upwardly in the direction "C", moving the flapper valve 18*b* to an open position where air is able to flow through the opened passageways 18*c* in flapper valve 18*b*. Continued movement of the plunger in the direction "B" causes air from compartment 14*g* to be drawn through passageways 18*d*, through passageways 18*c* and into bore 22*b* of pump 22. The airflow from the compartment 14*g* through the passageways 18*d*, 18*c*, and into bore 22*b* is illustrated by the unnumbered arrows in FIG. 19. As can be seen from FIG. 18, as air is evacuated from the compartment 14*g* of liner 14, the bottom wall 14*a* of liner 14 is drawn upwardly toward lid 16 and the side walls 14*b* to 14*d* collapse inwardly. The upward movement of bottom wall 14*a* with compartment 12*g* of base 12 causes air to be drawn into the compartment 12*g* through the apertures 12*f* in bottom wall 12*a*, as indicated by the arrows "D" in FIG. 18. As the bottom wall 14*a* moves upwardly towards lid 16, the food 20 will tend to contact regions of the downwardly extending ridges 16*r*. The ridges 16*r* act as spacers that will ensure that passageways 18*d* will not become blocked by food 20 and therefore air can continue to be evacuated until vacuum conditions, or near vacuum conditions are established within liner 14.

Figure 20:
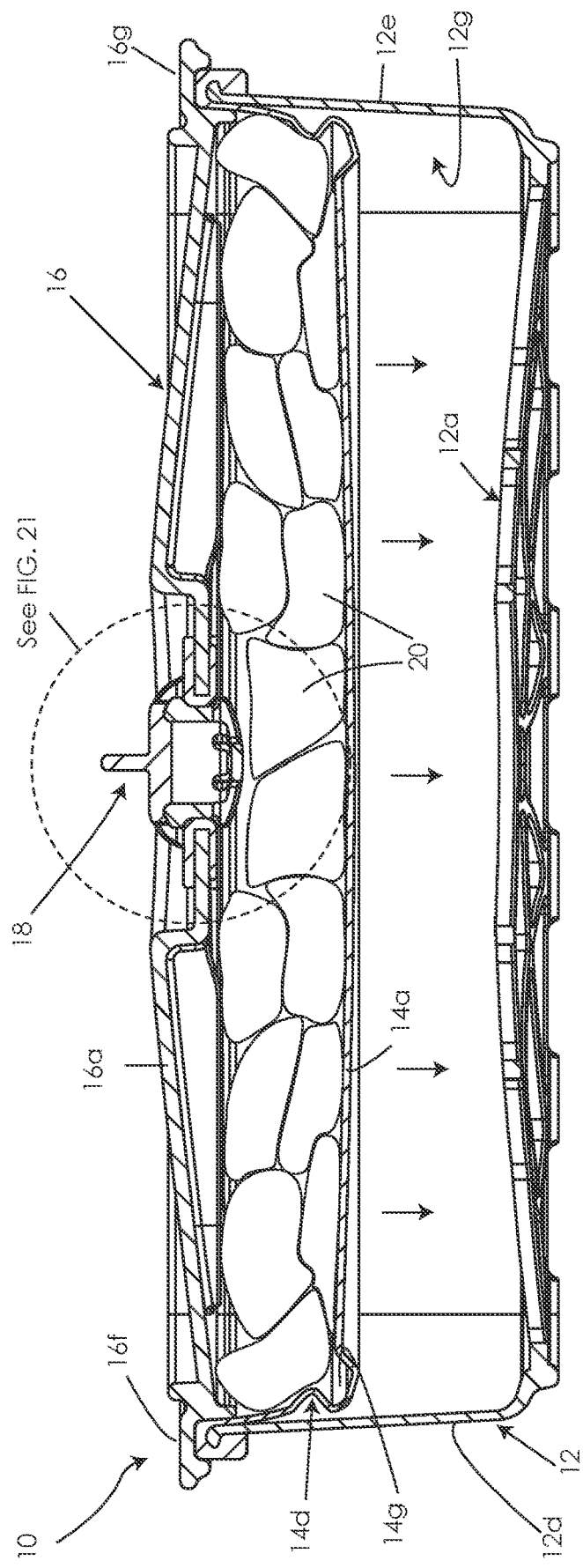
FIG. 20 is a longitudinal cross-section of the storage container showing the liner under vacuum pressure and retained a distance above the interior surface of the bottom wall of the base.
Figure 21:
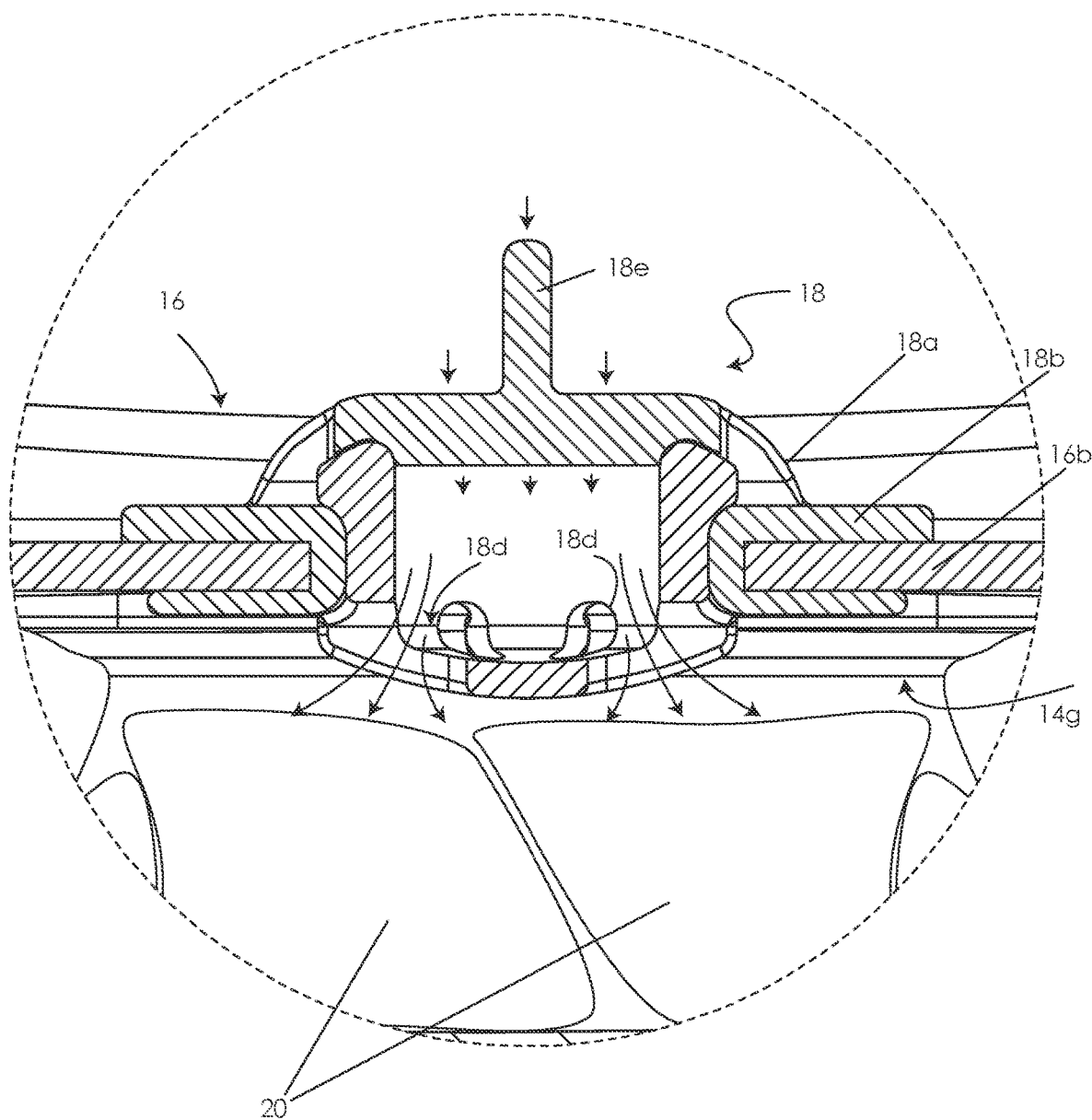
FIG. 21 is an enlargement of the highlighted region of FIG. 20 showing the flapper valve being sucked inwardly into a closed position by the vacuum conditions within the liner.

Once the air is evacuated from the compartment 14*g* of liner 14 to a sufficient degree, the pump 22 is removed from its engagement with lid 16. FIGS. 20 and 21 show that flapper valve 18 drops back into a closed position once pump 22 is removed and flapper valve 18 is kept seated in the closed position by a suction force provided by the collapsed liner 14. The downward forces provided by liner 14 are shown by the arrows in FIGS. 20 and 21. The user is then able to label the storage container 10 by either attaching a label to the lid 16 or to the base 12, or by using a marker to mark appropriate information anywhere on the exterior surface of lid 16 or base 12. In some embodiments, a specially designated labeling or marking area may be defined on the lid 16 or on the base 12. The label or marking may be useful to indicate what type of food 20 is retained within the container 10 and what date that food 20 was frozen. After labeling or marking, storage container 10 is placed in a freezer to freeze the food 20 therein. Because of the configuration of storage container 10, multiple storage containers 10 are able to be stacked one on top of another in the freezer when it is desired to freeze the food 20.

When the user later desires to eat food 20, he or she will remove storage container 10 from the freezer and will defrost the frozen food 20 therein. In order to defrost food 20, the storage container 10 may be placed in a fridge for a period of time, or on a counter, or in a microwave. Alternatively, storage container 10 may be placed in a body of water, such as in a sink, to allow for more rapid thawing of the food 20. In this latter instance, water is able to flow into the compartment 12*g* of storage container 12 by flowing from the sink and into the compartment 12*g* through the apertures 12*f* defined in bottom wall 12*a*. The water is then able to contact the exterior surface of the liner 14 and thereby more rapidly defrost the frozen food 20 held therein. The defrosting of food 20 is able to occur while the liner 14 is still vacuum sealed.

Figure 22:
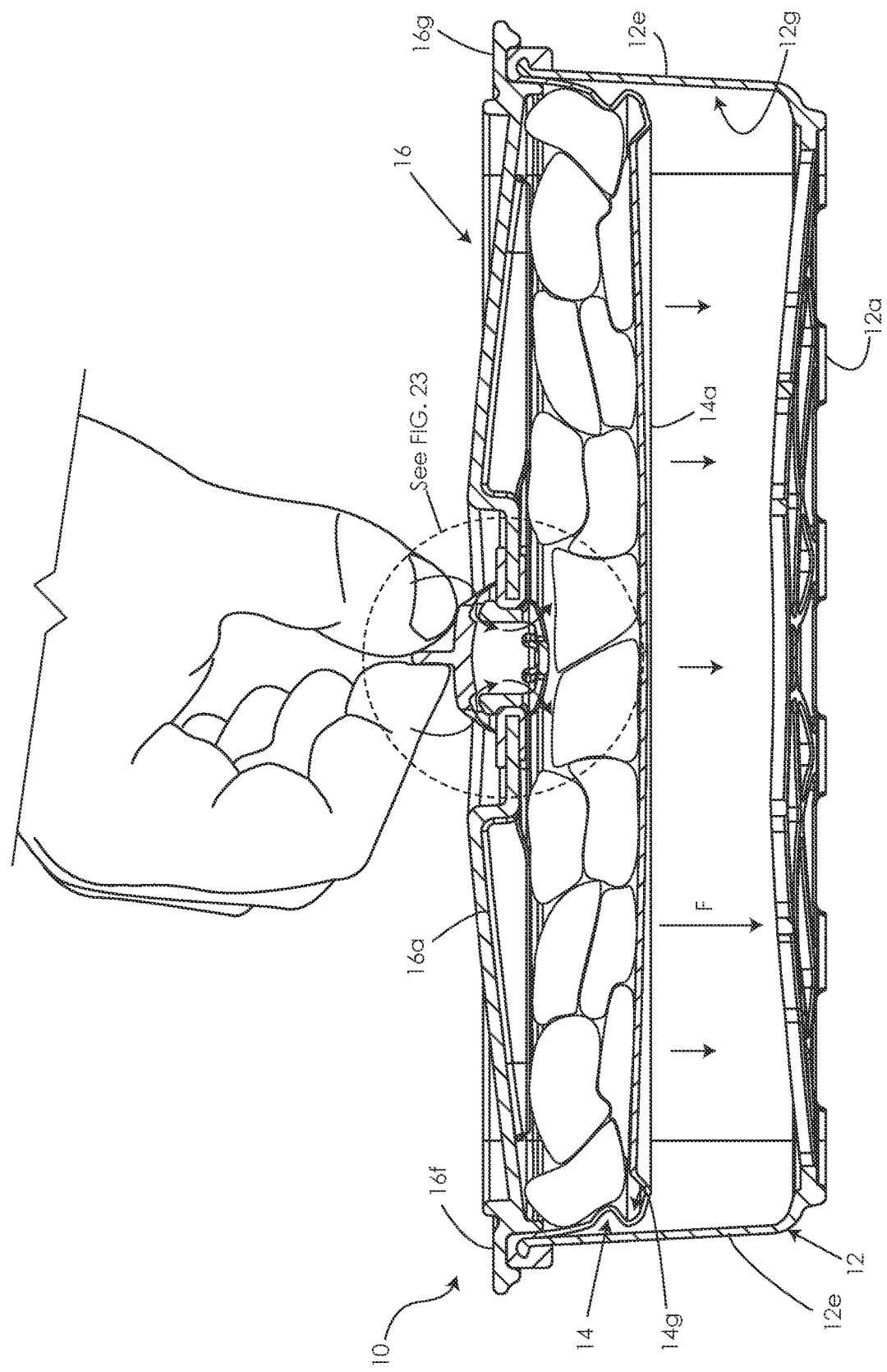
FIG. 22 is a longitudinal cross-section of the storage container showing the valve assembly in the lid being moved to the open position to allow air to flow back into the liner.

It should be noted that because liner 14 is still under vacuum conditions while the food 20 defrosts, the liner 14 remains in the compressed condition shown in FIG. 20 until the user lifts the flapper valve 18 as illustrated in FIGS. 22 and 23. The user will grasp the finger grip 18*e* of the flapper valve 18*b* between finger and thumb, and will pull the finger grip 18*e* upwardly in the direction indicated by arrows "E" (FIG. 23). This upward motion of finger grip 18*e* breaks the vacuum seal between flapper valve 18*b* and seat 18*a* and opens the passageways 18*c*. Air will flow from the environment outside flapper valve 18*b* and into the passageways 18*c*, through the passageways 18*d*, and into the compartment 14*g* of liner 14. The airflow is shown by the unnumbered arrows in FIGS. 22 and 23. As air flows into compartment 14g, the liner 14 begins to decompress and the bottom wall 14a thereof will start to move downwardly in the direction indicated by arrows "F" (FIG. 22) and towards bottom wall 12a of base 12.

After the vacuum seal has been broken by pulling finger grip 18e upwardly as shown in FIG. 23, lid 16 may be disengaged from liner 14 and base 12 by placing a fingertip under the bottom end of each tab 16k (FIG. 13) and moving the bottom end of each tab 16k away from the exterior surface of the base. This motion is indicated by the arrow "G" in FIG. 13. The interlocking engagement of lid 16, liner 14, and base 12 is broken and lid 16 may then be lifted off liner 14 and base 12. The food 20 may be removed from liner 14 and then the base 12, liner 14, and lid 16 may be washed for subsequent reuse. At least the base 12 and lid 16 may be placed in the dishwasher. In some instances, the liner 14 may also be placed in the dishwasher for cleaning. It will be understood, that multiple containers 10 may be stacked one on top of another in a freezer, or in a fridge for defrosting purposes, or in a drawer or on a shelf in a cupboard. When the storage containers are not in use, multiple containers are able to be nested one within another to take up less storage space.

As will be understood from reading the above, there is no need for a user to cut the liner in order to break the vacuum seal; instead, opening of the valve assembly 18 effectively breaks the vacuum seal, leaving the liner 14 undamaged and available for reuse.

It will be understood that storage container 10 may be sold with a plurality of liners 14. In other words, a single base 12 and a single lid 16 are sold as a kit with a one or more of each of umber of different liners 14. The liners 14 all function in exactly the same manner but may be color-coded to help the user identify the types of foodstuffs frozen and stored therein. For example, a first liner in the kit may be transparent (i.e., colorless) so that the food 20 frozen and stored therein is readily visible to the eye. A second liner may be provided in the kit where the liner has a greenish tint and is used for freezing and storing vegetables therein. The greenish tint will help the user readily identify that the food frozen in the storage container is vegetable in nature. A third liner may be provided in the kit where the liner has a reddish tint to indicate that beef is frozen and stored therein, for example. A fourth liner may be provided with a yellowish tint to indicate that chicken is frozen and stored therein, for example. A fifth liner may be provided with a bluish tint to indicate that fish is frozen and stored therein, for example. Other different colors or markings may be provided on plurality of liners to assist the user. For example, the liners may have words or images of vegetables, cows, pigs, sheep, chicken, fish, etc. printed thereon in various places so that the user is able to readily see the words or images through the side walls of the base 12 or through the apertures 12f in the bottom wall thereof.

Figure 24:
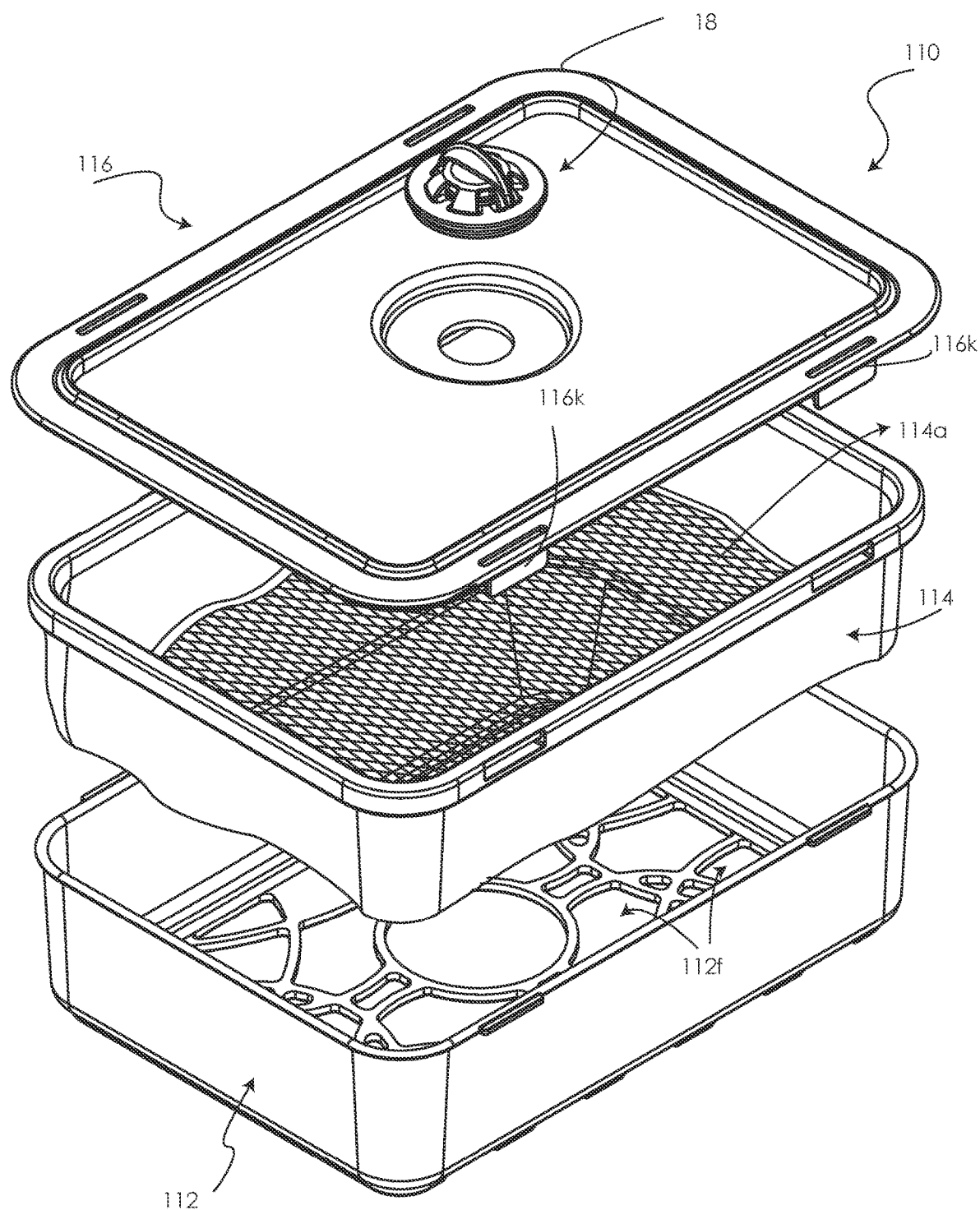
FIG. 24 is a top, front, left side perspective view of a second embodiment of a storage container in accordance with the present disclosure, showing an alternative embodiment the liner used therewith, where the liner includes a mesh bottom.

FIG. 24 shows a second embodiment of the storage container 10 illustrated in FIGS. 1-23. The storage container, generally indicated at 110, includes a base 112 and a lid 116 that are substantially identical to the base 12 and lid 16 of storage container 10 and therefore will not be further described herein. Storage container 110 includes an alternative embodiment of the flexible liner, generally indicated at 114. Liner 114 is substantially identical to the flexible liner 14 in all aspects except that instead of a substantially solid bottom wall like bottom wall 14a, liner 114 has a bottom wall 114a that is a mesh instead of being solid. Storage container 110 is used in a slightly different manner to storage container 10 in that vacuum conditions cannot be generated inside liner 114 but the storage container 110 is able to be used to rinse and store foodstuffs in one and the same box. An example of how storage container 110 is used is that food (not shown) may be placed inside of liner 114 and the liner 114 can be moved to under a faucet so that the food can be rinsed. The liner 114 is engaged with base 112 either before or after the rinsing and then water is allowed to drain through the mesh of bottom wall 114a and out of the apertures 112h in base 112. Lid 116 is engaged with liner 114 and the tabs 116k are snap-locked into place to secure lid 116, liner 114 and base 112 to one another. The base 112 gives the liner 114 a substantially rigid form so that the walls of the liner don't collapse inwardly. The locked storage container 110 may then be placed in a fridge, for example, for storage of the food. The lid 116 is unlocked removed when a user wishes to gain access to the food within liner 114.

Figure 25:
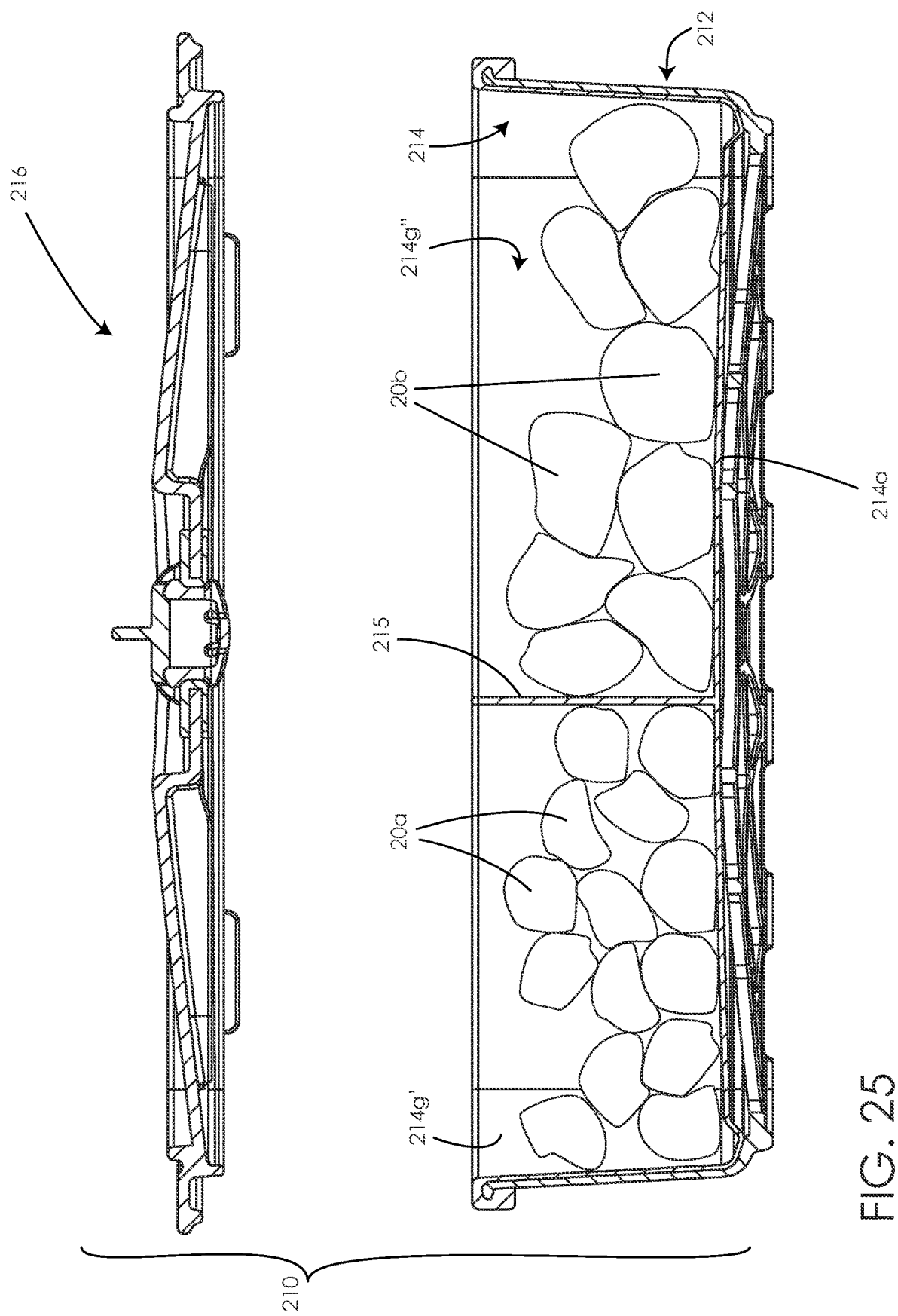
FIG. 25 is a longitudinal cross-section of a third embodiment of a storage container in accordance with the present disclosure similar to FIG. 15, showing an alternative embodiment of the liner used therewith, wherein the liner includes at least one partition.

FIG. 25 shows a third embodiment of the storage container 10 illustrated in FIGS. 1-23. The storage container, generally indicated at 210, includes a base 212 and a lid 216 that are substantially identical to the base 12 and lid 16 of storage container 10 and therefore will not be further described herein. Storage container 210 includes a further alternative embodiment of the flexible liner, generally indicated at 214. Liner 214 is substantially identical to the flexible liner 14 in all aspects except that it includes at least one vertical partition 215 that divides the compartment into more than one compartment. As illustrated, a single vertically-oriented partition 215 extends upwardly from the bottom wall 214a of liner 214 and this partition 215 divides the compartment into a first compartment 214g' and a second compartment 214g". This configuration makes it possible for a user to place a different foods into each of the first and second compartments. For example, a first food 20a is placed inside the first compartment 214g' and a second food 20b is placed inside the second compartment 214g". Storage container 210 is then used in exactly the same manner as storage container 10. It will be understood that more than one partition 215 may be provided in liner 214.

Figure 26:
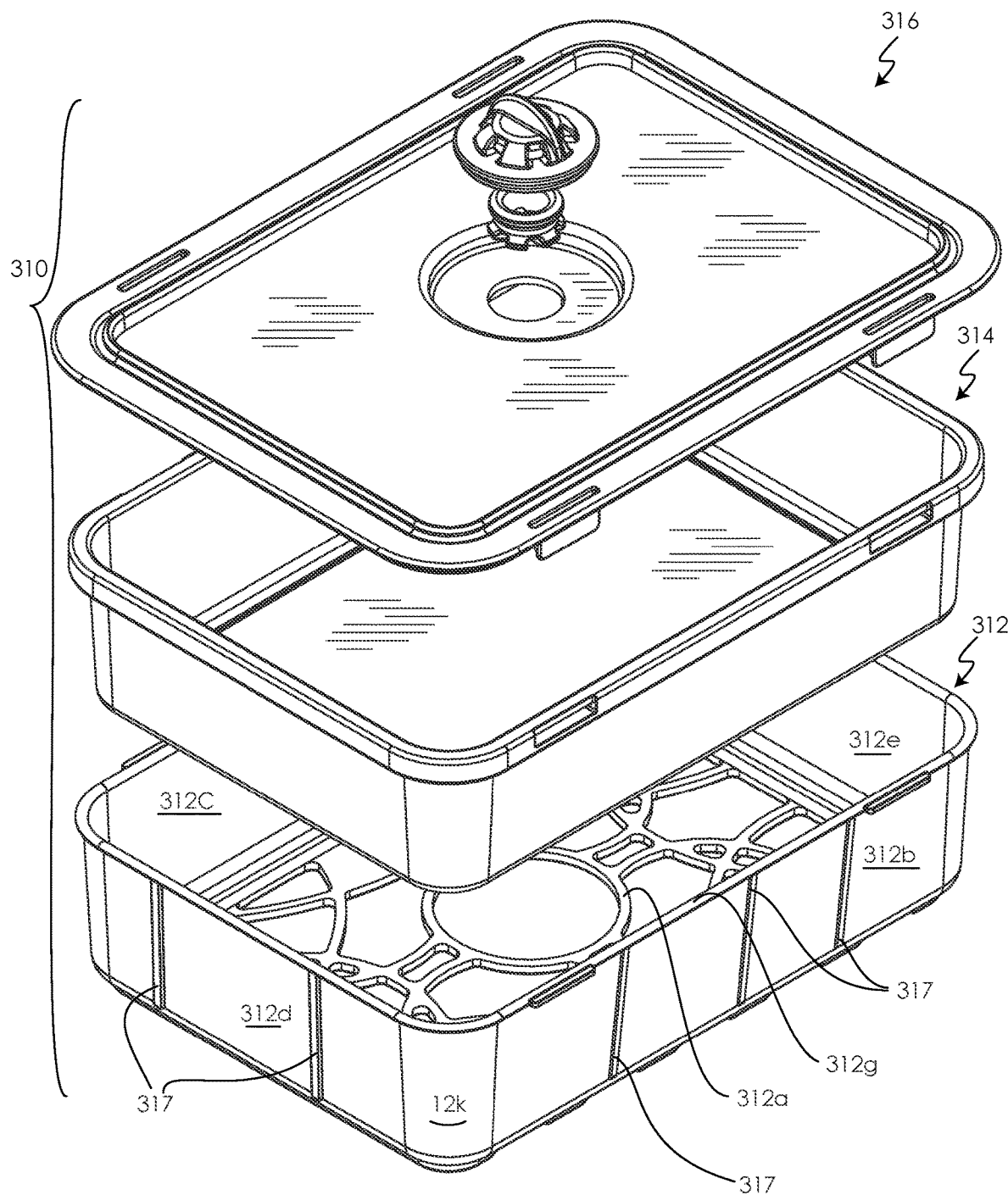
FIG. 26 is an exploded top, front, left side, perspective view of a fourth embodiment of a storage container in accordance with the present disclosure showing a further alternative base used therein, where the base includes a plurality of grooves that allow for improved airflow around the exterior surface thereof.

FIG. 26 shows a fourth embodiment of the storage container 10 illustrated in FIGS. 1-23. The storage container, generally indicated at 310, includes a liner 314 and a lid 316 that are substantially identical to the liner 14 and lid 16 of storage container 10 and therefore will not be further described herein. An alternative embodiment of the base is provided in storage container 310, generally indicated at 312. Base 312 has a bottom wall 312a, a front wall 312b, a rear wall 312c, a left side wall 312d, and a right side wall 312e that bound and define a compartment 312g into which liner 314 is received. Bottom wall 312a, front wall 312b, rear wall 312c, left side wall 312d and right side wall 312e are all substantially identical to the walls 12a through 12e of base 12 except that a plurality of grooves 317 is defined in an exterior surface of one or more of the front wall 312b, rear wall 312c, left side wall 312d and right side wall 312e. It may be desired to stack a plurality of bases 312 together when one or more storage containers 310 are not in use. Bases 312 are configured to nest one inside the other so as to occupy less storage space on a shelf. Grooves 317 allow for improved airflow between the exterior surface of base 312 and an interior surface of another base within which base 312 is nested. The improved airflow provided by grooves 317 helps to ensure that it is easy to remove base 312 from a stack of nested bases. Grooves 317 are illustrated as being spaced-apart from each other and vertically oriented. It will be understood, however, that any configuration of grooves 317 and any placement of grooves 317 may be utilized in base 312 that will provide this improved airflow. Storage container 310 is used in substantially the same manner as storage container 10.

It will be understood that instead of providing grooves 317 on the exterior surfaces of the walls of base 312, ridges may be provided on the exterior surface. The ridges will then contact the interior surface of the other base within which base 312 nests and allow for improved airflow between the two nested bases. If ridges are provided instead of grooves 317, those ridges may be provided in any shape, size, and placement that will improve airflow around the exterior of base 312.

It will be understood that instead of the grooves or ridges being provided on the exterior surface of base 312, grooves or ridges may be provided on the interior surfaces of the walls of base 312 for the same purpose.

Figure 27:
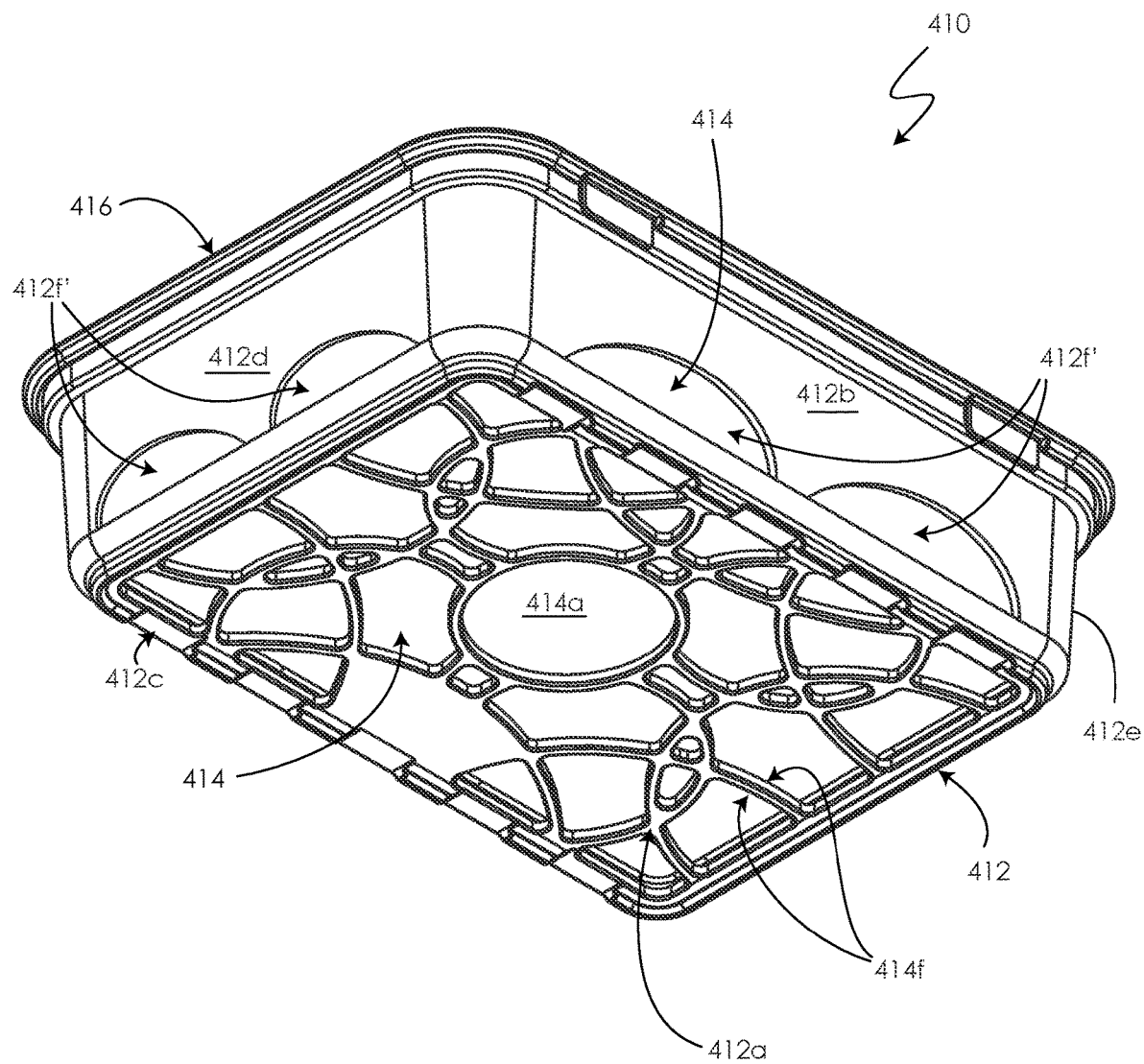
FIG. 27 is a bottom, front, left side perspective view of a fifth embodiment of a storage container in accordance with the present disclosure, showing another embodiment of a base used therein, where the side walls of the base are at least partially formed to have a pattern of apertures therein that is similar to the pattern of apertures in the bottom wall of the base.

FIG. 27 shows a fifth embodiment of the storage container 10 illustrated in FIGS. 1-23. The storage container, generally indicated at 410, includes a liner 414 and a lid 416 that are substantially identical to the liner 14 and lid 16 of storage container 10 and therefore will not be further described herein. A further alternative embodiment of the base is provided in storage container 410, generally indicated at 412. Base 412 has a bottom wall 412a, a front wall 412b, a rear wall 412c, a left side wall 412d, and a right side wall 412e that bound and define a compartment 412g into which liner 414 is received. (The bottom wall 414a of liner 414 is visible through the apertures defined in base 412.) Bottom wall 412a of base 410 is substantially identical to bottom wall 12a of base 12 and defines a pattern of openings 414f therein. The apertures 414f place the compartment defined by base 412 in communication with the environment surrounding storage container 410. Base 412 differs from base 12 in that one or more of front wall 412b, rear wall 412c, left side wall 412d and right side wall 412e also defines a pattern of openings therein, with those openings being indicated at 412f'. The openings 412f' may be provided on only part of the vertical height of the one or more walls 412b through 412e or may be provided for the entire height of the one or more walls 412b through 412e. Providing apertures 412f and 412f' provides for improved airflow and water flow from the environment outside of storage container 410 into the compartment defined by base 412. This improved airflow or water flow will tend to shorten any time for defrosting the frozen contents of liner 414.

Referring now to FIGS. 28 through 44, there is shown a sixth embodiment of a storage container in accordance with the present disclosure, generally indicated at 510. Storage container 510 comprises a base 512, a liner 514, and a lid 516. Lid 516 is configured to interlockingly engage with one or both of liner 514 and base 512 in such a way that a portion of liner 514 forms a seal between base 512 and lid 516 when lid 516 is engaged with the base 512.

As is the case with all previously disclosed embodiments, base 512, and lid 516 may be fabricated from any suitable semi-rigid material or rigid material. If storage container 510 is to be used to hold foodstuffs, then the suitable material may be any food grade material. In some embodiments, base 512 and lid 516 may be fabricated from material that is preferably dishwasher safe.

As is the case with all previously disclosed embodiments, liner 514 may fabricated from a pliable material, i.e., a material that is flexible and supple and will readily bend and fold. The material is furthermore capable of collapsing in upon itself when air is evacuated from a compartment defined by the liner 514. The suitable material is also preferably resilient, i.e., will rebound and return to its original shape when air is re-introduced into the compartment of liner 514. If the storage container 510 is to be used to store foodstuffs, then liner 514 will also be fabricated from a material that is food grade.

As shown in FIGS. 28-44, base 512 comprises a bottom wall 512a, a front wall 512b, a rear wall 512c, a left side wall 512d, and a right side wall 512e. Rounded corners (not numbered) are provided in the regions where front and rear walls 512b, 512c intersect with the left and right side walls 512d, 512e. Storage container 510 is illustrated as being generally rectangular in shape and having a longitudinal axis "Y" (FIG. 32) and a lateral axis "X" that are oriented at right angles to one another. The longitudinal axis "Y" extends from left side wall 512d of base 512 to right side wall 512e thereof and the longitudinal axis "Y" is oriented at right angles to the walls 512d, 512e. Lateral axis "X" is oriented at right angles to longitudinal axis "Y" and extends from front wall 512b of base 512 to rear wall 512c thereof. Lateral axis "X" is oriented at right angles to front and rear walls 512b, 512c.

Figure 30:
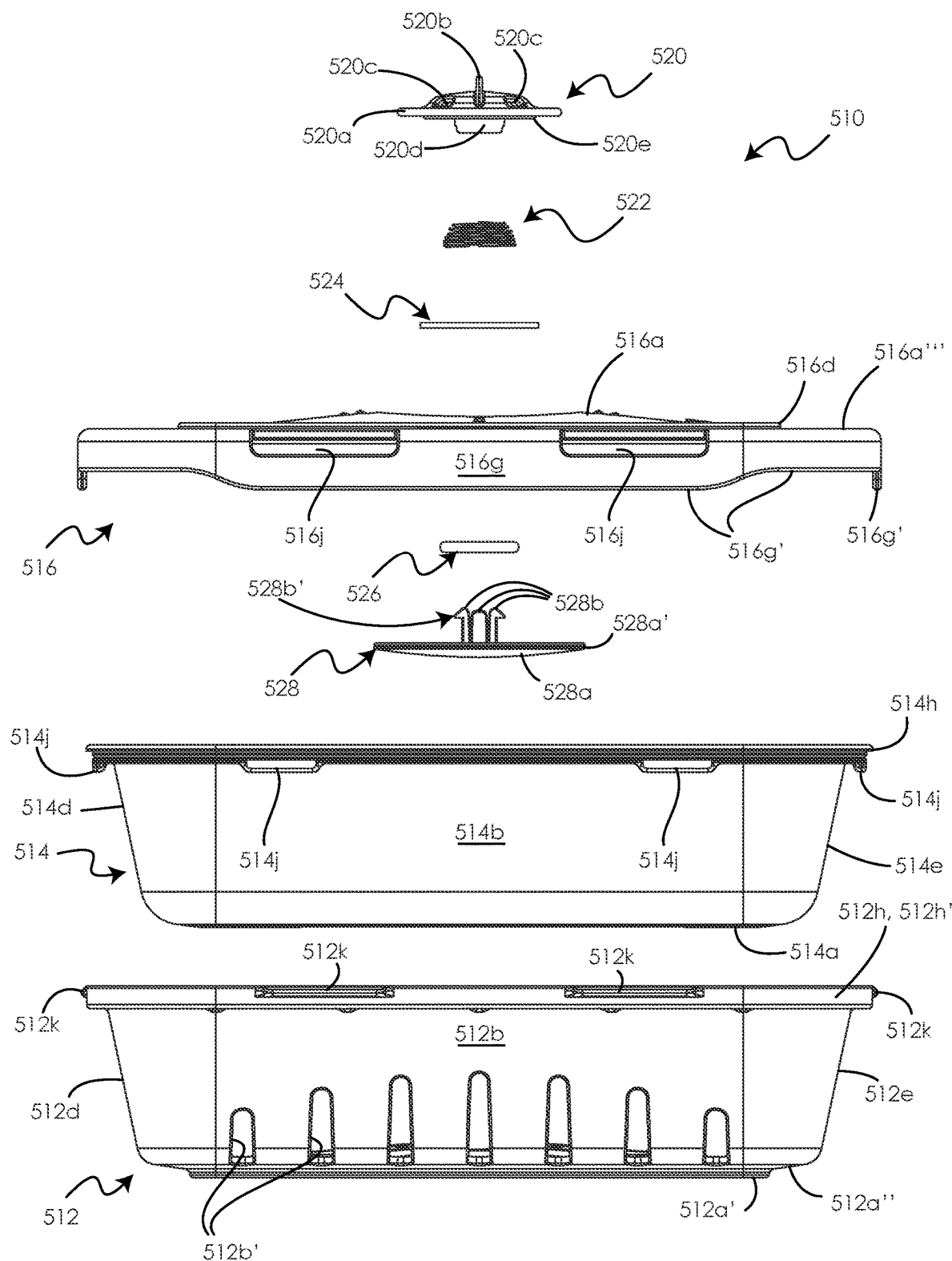
FIG. 30 is an exploded front elevation view of the storage container shown in FIG. 28.
Figure 34:
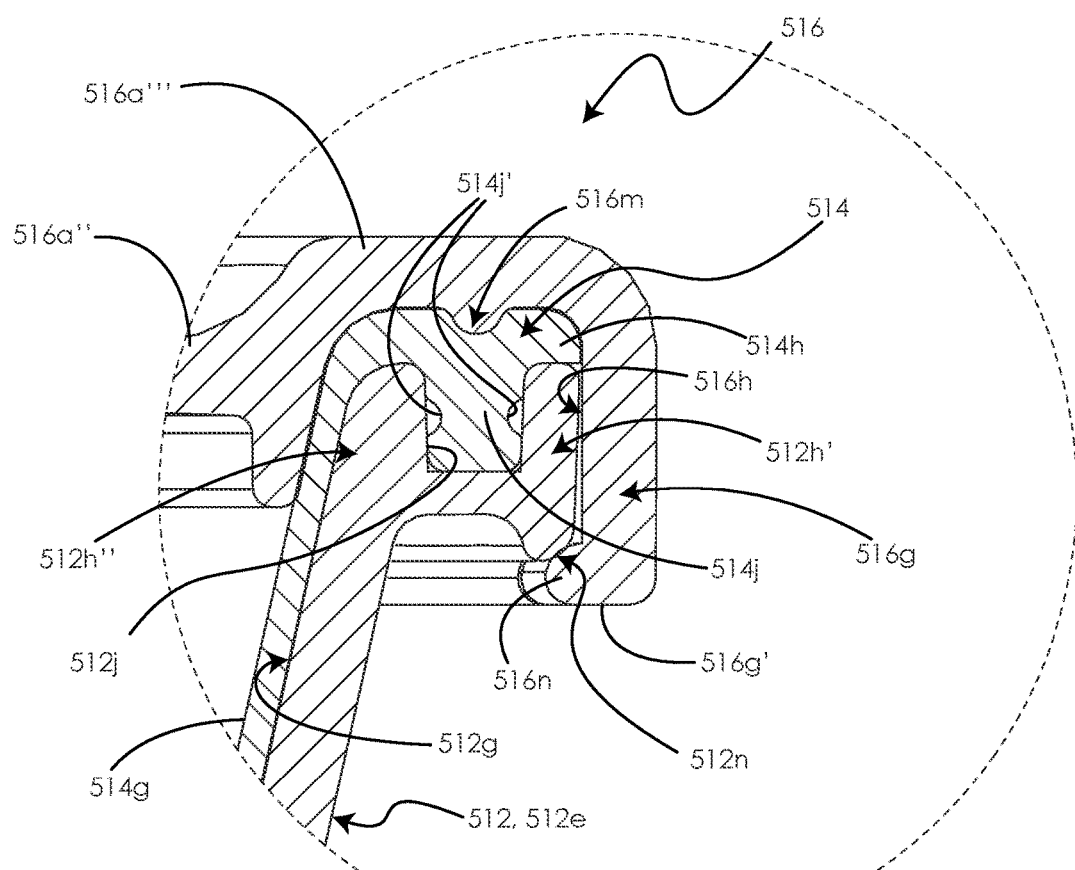
FIG. 34 is an enlargement of the highlighted region of FIG. 33.
Figure 35:
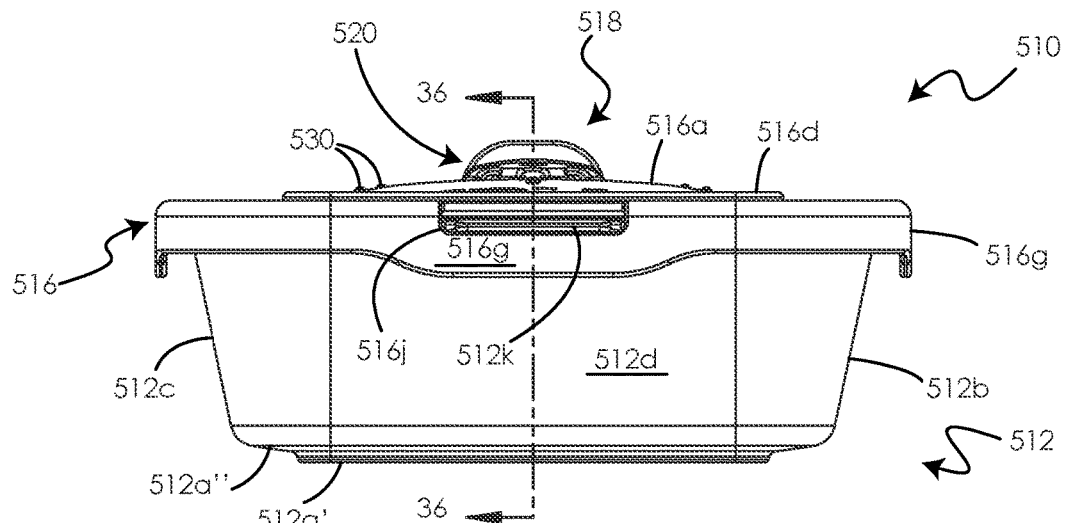
FIG. 35 is a left side elevation view of the assembled storage container of FIG. 32.
Figure 36:
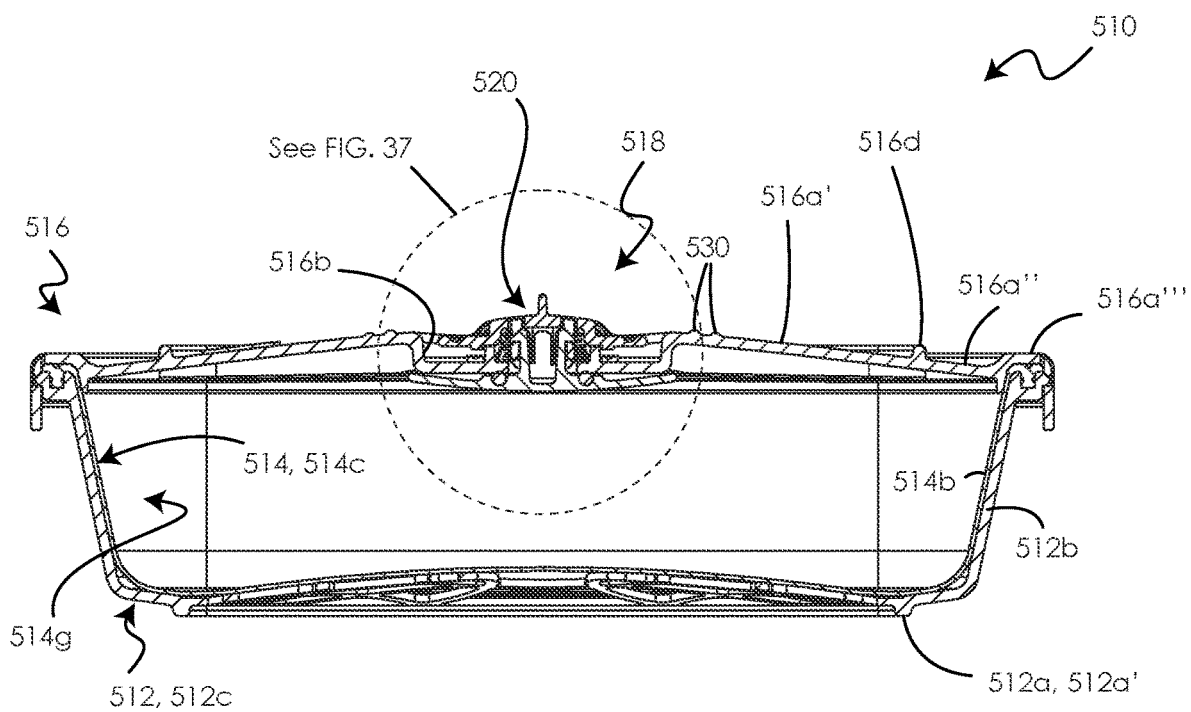
FIG. 36 is a cross-section of the storage container taken along line 36-36 of FIG. 35.

As best seen in FIGS. 30 and 34, the front, rear, left side, and right side walls 512b, 512c, 512d, and 512e angle outwardly from one another moving upwardly in a direction away from bottom wall 512a, terminating in a rim 512h. Bottom wall 512a is therefore of smaller width (measured from front wall 512b to rear wall 512c) and length (measured from left side wall 512c to right side wall 512d) than is rim 512h. It will be understood that in other embodiments, the front, rear, left side, and right side walls may not taper outwardly away from one another.

Figure 33:
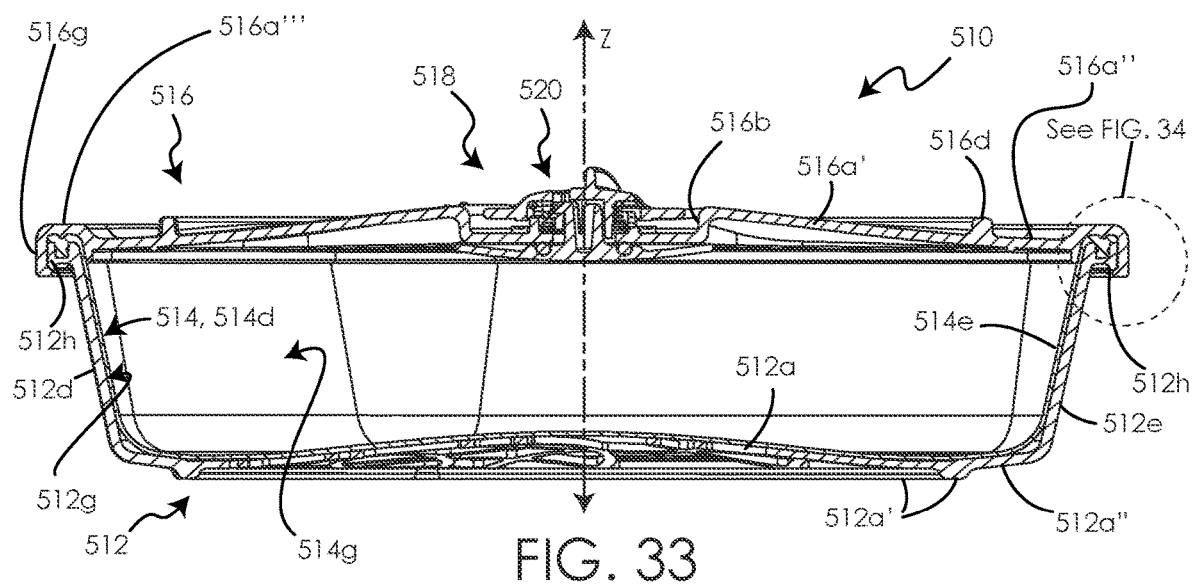
FIG. 33 is a cross-section of the assembled storage container taken along line 33-33 of FIG. 32.

Bottom wall 512a may be slightly convexly curved as shown in FIG. 33. Bottom wall 512a defines a plurality of passageways 512f therein that extend between an upper surface and a lower surface of bottom wall 512a. The regions of bottom wall 512a located between passageways 512f and the passageways 512f themselves may be of various shapes, sizes, and patterns. Referring to FIGS. 20 and 30, bottom wall 512a may be fabricated to include a downwardly extending ridge 512a' which circumscribes the region of bottom wall that defining the plurality of passageways 512f therein. Ridge 512a' is provided to enable better stacking of a plurality of storage containers 510 one above the other, as will be described later herein. A region 512a" of bottom wall circumscribes ridge 512a' and is continuous with and curves upwardly into the front wall 512b, rear wall 512c, left side wall 512d, and right side wall 512e. This can best be seen in FIG. 30.

Bottom wall 512a, front wall 512b, rear wall 512c, left side wall 512d, and right side wall 512e bound and define a compartment 512g that is accessible through an opening that is bounded and defined by the rim 512h of the various walls 512b through 512e. The opening bounded by rim 512h and passageways 512f place compartment 512g in fluid communication with the air in the environment outside of the base 512, i.e., with the ambient air.

Each of the front wall 512b and rear wall 512c define a plurality of through-holes 512b' and 512c', respectively, therein. The through-holes 512b' and 512c' extend between an exterior surface and an interior surface of front wall 512b or rear wall 512c, respectively, and place compartment 512g in fluid communication with the ambient air outside of base 512. In the illustrated embodiment, the through-holes 512b' and 512c' each originate proximate bottom wall 512a and extend upwardly for a distance towards rim 512h of the associated front wall 512b or rear wall 512c, but terminate a distance downwardly from rim 512h. The through-holes 512b', 512c' are spaced longitudinally apart from one another and are laterally aligned with one another in pairs (see FIGS. 28 and 29). In the illustrated embodiment, the through-holes 512b', 512c' are widest proximate bottom wall 512a and taper in width moving in a direction towards the rim 512h. In the illustrated embodiment, through-holes 512b', 512c' are arranged in a pattern with the shortest through-holes being located proximate the first side wall 512d and the second side wall 512e. The through-holes progressively increase in length towards a central region of the associated front wall 512b or rear wall 512c. It will be understood that the number of through-holes 512b', 512c', their specific location on the associated front wall 512 or rear wall 512c, the configuration of these through-holes, and their relationship and orientation relative to one another, may be other than illustrated in the attached figures. It will further be understood that first side wall 512d and second side wall 512e may additionally or alternatively be provided with through-holes which extend between the interior surface and exterior surface of the base 512.

Figure 28:
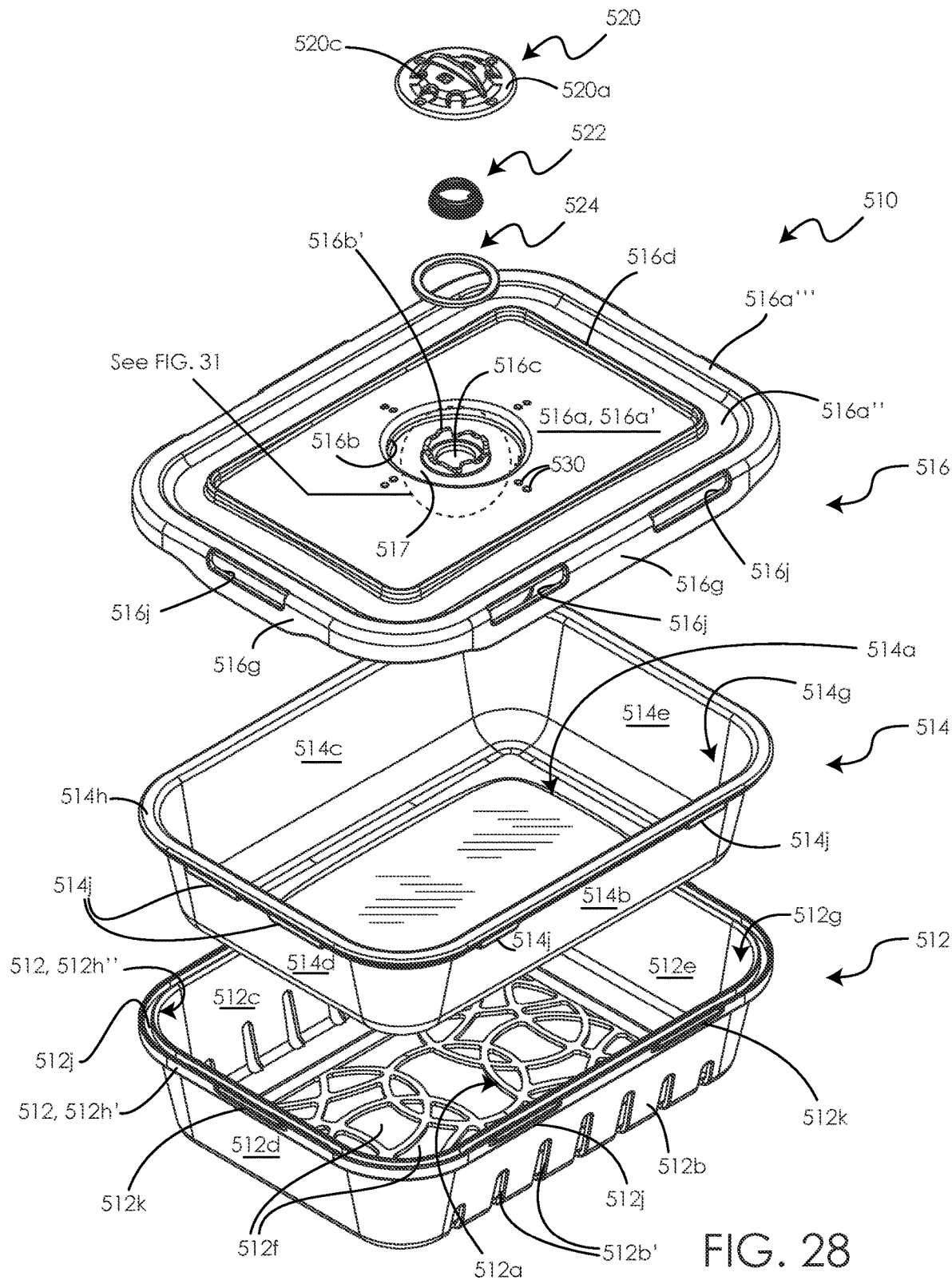
FIG. 28 is an exploded top, front, left side perspective view of a sixth embodiment of a storage container in accordance with the present disclosure, showing an alternative embodiment a base, liner, and lid, along with a different embodiment of a valve assembly relative to FIG. 1.
Figure 29:
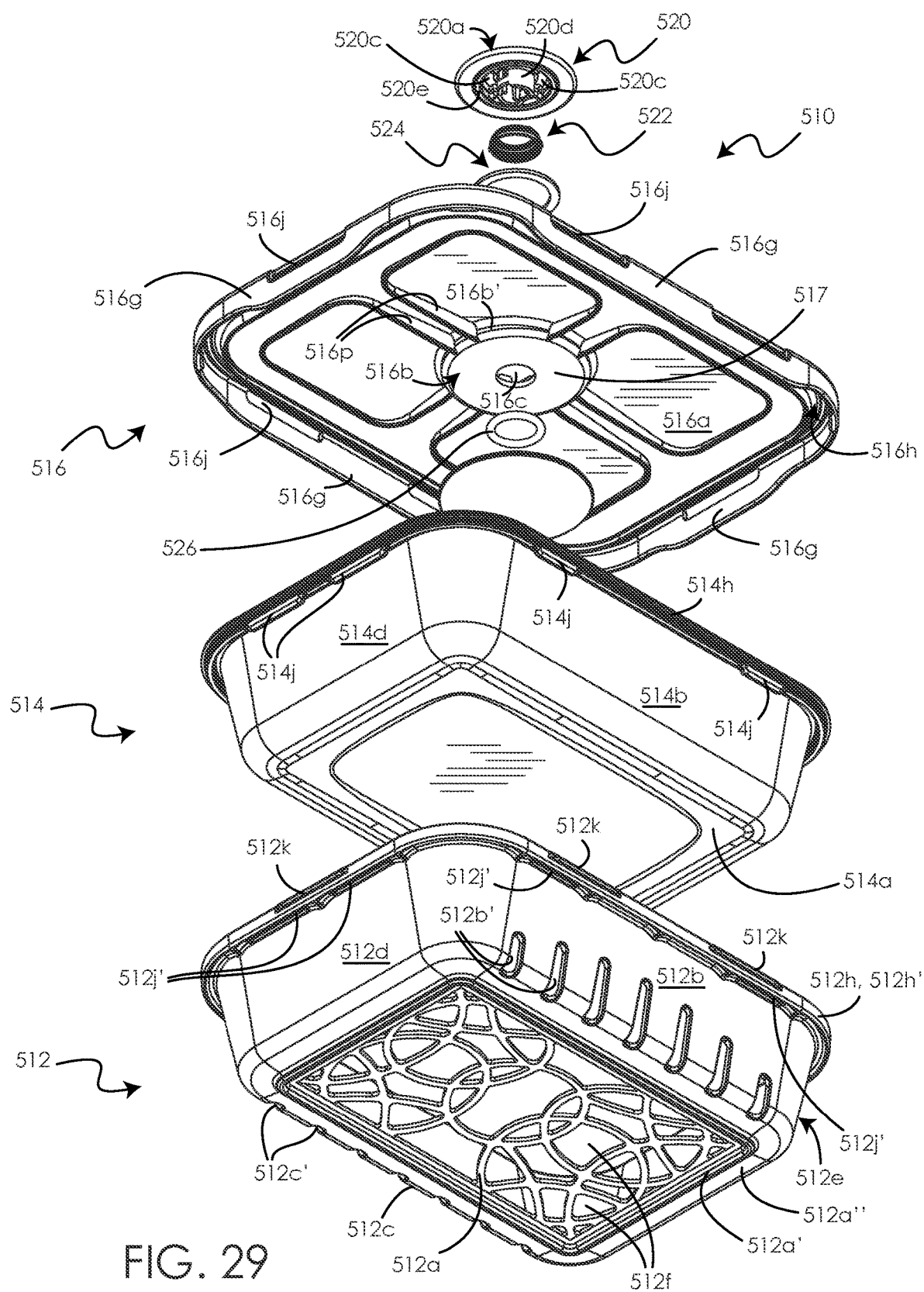
FIG. 29 is an exploded bottom, front, left side perspective view of the storage container shown in FIG. 28.

As best seen in FIGS. 29 and 34, the upper end of each of the front wall 512b, rear wall 512c, left side wall 512d, and right side wall 512e forms a rim 512h that extends for a distance outwardly beyond the exterior surface of the associated wall 512b, 512c, 512d, 512e. FIG. 28 shows that the rim 512h is comprised of two upstanding and spaced-apart parallel walls, 512h' and 512h'', which are separated from each other by a channel 512j.

An outermost vertical surface of wall 512h' provided on the upper end of each of front wall 512b and rear wall 512d includes a pair of elongate projections 512k (FIG. 28) that are longitudinally spaced-apart from one another and extend outwardly from the wall 512h'. Furthermore, an outermost vertical surface of 512h' on the upper end of each of the left side wall 51d and right side wall 512e includes one elongate projection 512k thereon. Slots 512j' (FIGS. 29 and 41) are defined at intervals in the portion of the upper end of the front, rear, left side, and right side walls 512b, 512c, 512d, and 512e which define channel 512j. It will be understood that the number and location of projections 512k and slots 512j' may be varied as desired.

Referring to FIGS. 28 to 30, liner 514 is configured to be nestingly received within the compartment 512g defined by base 512. Liner 514 includes a bottom wall 514a, a front wall 514b, a rear wall 514c, a left side wall 514d, and a right side wall 514e. Front and rear walls 514b, 514c intersect left and right side walls 514c, 514d at curved corners (not numbered). The contours of bottom wall 514a, front wall 514b, rear wall 514c, and left and right side walls 514d and 514e are generally complementary to the contours of bottom wall 512a, front wall 512b, rear wall 512c, and left and right side walls 512d and 512e of base 512. Bottom wall 514a, front wall 514b, rear wall 514c, left side wall 514d, and right side wall 514e bound and define a compartment 514g (FIG. 28).

Liner 514 is of a shape and size (length, width, and height) that is complementary to the shape and dimensions of the interior surface of base 512 which bounds and defines compartment 512g. An exception with respect to the relative dimensions of the liner 514 and base 512 is the height of liner 514, which may be slightly taller than the height of base 512. Liner 514 is configured to be nestingly received in the compartment 512g of base 512 an when this occurs, bottom wall 514a of liner 514 is located proximate an upper surface of bottom wall 512a of base 512. Front wall 514b of line 514 is located proximate an inner surface of front wall 512b of base 512, rear wall 514c of liner 514 is located proximate an inner surface of rear wall 512c of base 512; left side wall 514d of liner 514 is located proximate an inner surface of left side wall 512d of base 512; and right side wall 514e of liner 514 is located proximate an inner surface of right side wall 512e of base 512.

An upper end of each of the front wall 514b, rear wall 514c, left side wall 514d, and right side wall 514e forms a rim 514h that extends laterally outwardly beyond the exterior surface of the associated one of the front wall 514b, rear wall 514c, left side wall 514d, and right side wall 514e of liner 514. A plurality of discrete tabs 514j (FIGS. 29 and 30) extends downwardly from a lower surface of the rim 514h. Each tab 514j is configured to align with one of the slots 512j' defined in channel 512j of base 512. When liner 514 nests within compartment 512g of base 512, the rim 514h of liner 514 overlaps and rests upon the rim 512h of base 512 and rim 514h of liner 514 extends to an outermost edge of wall 512h' of base 512. A lower surface of rim 514h of liner 514 projects downwardly into the channel 512j defined in rim 512h of base 512. Tabs 514j of liner 514 are aligned with slots 512j' defined in base 512. Rim 514h of liner 514 is pressed into engagement with rim 512h of base 512 and when this happens, tabs 514j of liner 514 are received into slots 512j' of base 512, interlocking liner 514 and base 512 to one another. Tabs 514j may have one or two longitudinally-oriented grooves 514j' (FIG. 41) formed therein to enable tabs 514j to flex during insertion of tabs 514j into slots 512j or removal therefrom.

Figure 31:
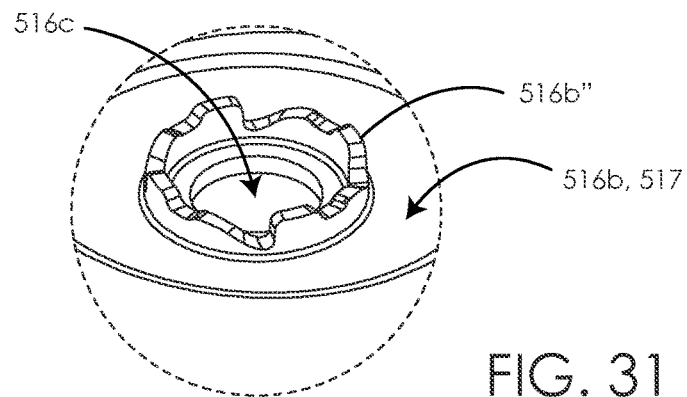
FIG. 31 is an enlargement of the highlighted region of FIG. 28.

Turning now to FIGS. 28 through 44, lid 516 is shown in greater detail. Lid 516 is configured to be interlockingly engaged with and secured to both liner 514 and base 512. Lid 516 includes a wall 516a having an upper surface and a lower surface. Wall 516a may be slightly domed (i.e., convex in shape) as shown in FIGS. 30 and 33. A hub 516b is defined generally centrally in wall 516a. Hub 516b includes a bottom wall 517 and a shoulder wall 516b' which extends between bottom wall 517 and wall 516a. A hole 516c is defined generally centrally within bottom wall 517 and extends between upper and lower surfaces of bottom wall 517. An annular wall 516b''' (FIG. 31) circumscribes hole 516c and is spaced a short distance radially outwardly from hole 516c and inwardly of shoulder wall 516b'. As best seen in FIG. 31, an uppermost edge of the annular wall 516b'' undulates and forms a series of ridges and valleys of varying height relative to bottom wall 517.

Referring again to FIG. 28, a first region 516a' of wall 516a of lid is circumscribed by a ridge 516d that projects upwardly for a distance beyond the upper surface of wall 516a. Ridge 516d is circumscribed by a second region 516a'' of wall 516a and a third region 516a''' circumscribes the second region 516a''. As a result, ridge 516d, second region 516a'' and third region 516''' of lid 516 together bound and define a channel (not numbered) in an upper surface of lid 516 which is shaped and sized to be generally complementary to the exterior surface of the region 512a'' (FIG. 29) of base 512. When two similar or identical storage containers 510 are stacked one on top of the other, the region 512a'' on the base 512 of an upper storage container 510 is seated within the channel defined in the upper surface of the lid 516 of a lower storage container 510.

Third region 516a''' of lid 516 angles downwardly and forms a skirt 516g which extends for a distance downwardly below the lower surface of wall 516a. This can best be seen in FIG. 34. The configuration of this edge region of lid 516 is such that a groove 516h is defined in an underside of lid 516. The groove 516h is configured to receive the interlocked rims 514h, 512h of the liner 514 and base 512 therein and to seal base 512, liner 514, and lid 516 to one another.

The lowermost edge 516g' of skirt 516g may be configured so that not all sections of the edge 516g' lie in the same plane. This can be seen in FIG. 30.

Slots 516j (FIGS. 28 and 41) are defined in sections of skirt 516g that will extend over the interlocked rims 514h, 512h of liner 512 and base 514 when lid 516 is engaged therewith. Each slot 516j extends between an outer surface of the skirt 516g and an inner surface thereof. A pair of slots 516j is defined in skirt 516g in order to align with the projections 512k extending outwardly from front and rear walls 512b, 512c of base 512. Projections 512k are received through these slots 516j. Similarly, slots 516j are provided in skirt 516g to align with the projections 512k on side walls 512d, 512e of base 512, and to receive those projections 512k therethrough. When projections 512k are received through slots 516j, lid 516 is secured to base 512.

Figure 41:
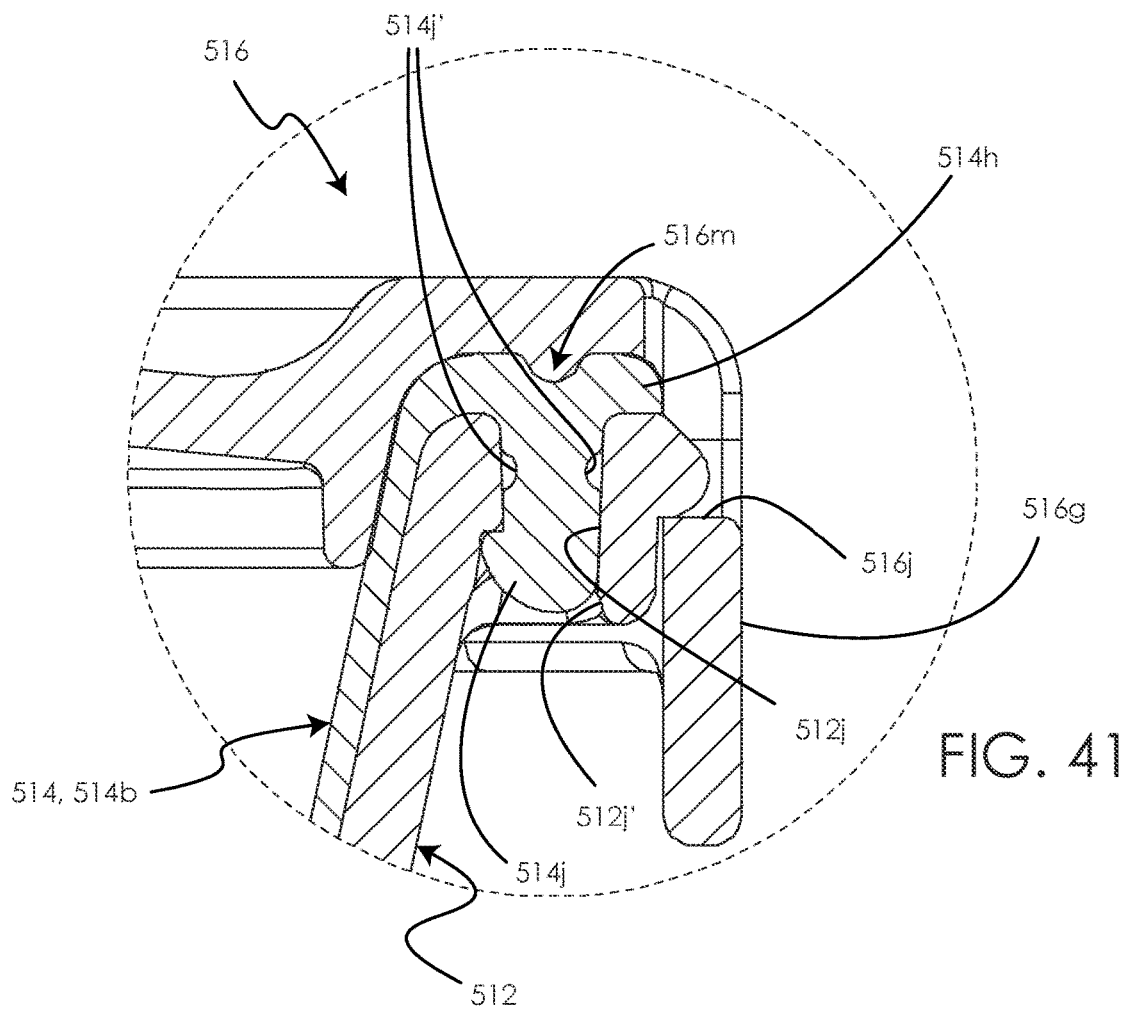
FIG. 41 is an enlargement of the highlighted region of FIG. 40.
Figure 42:
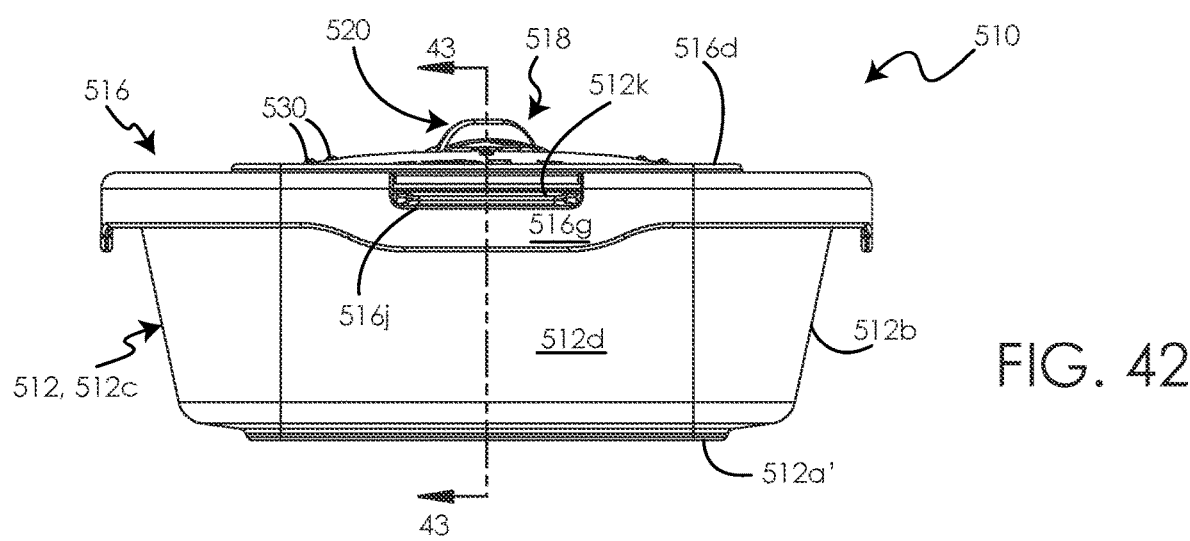
FIG. 42 is a left side elevation view of the storage container shown in FIG. 38.
Figure 43:
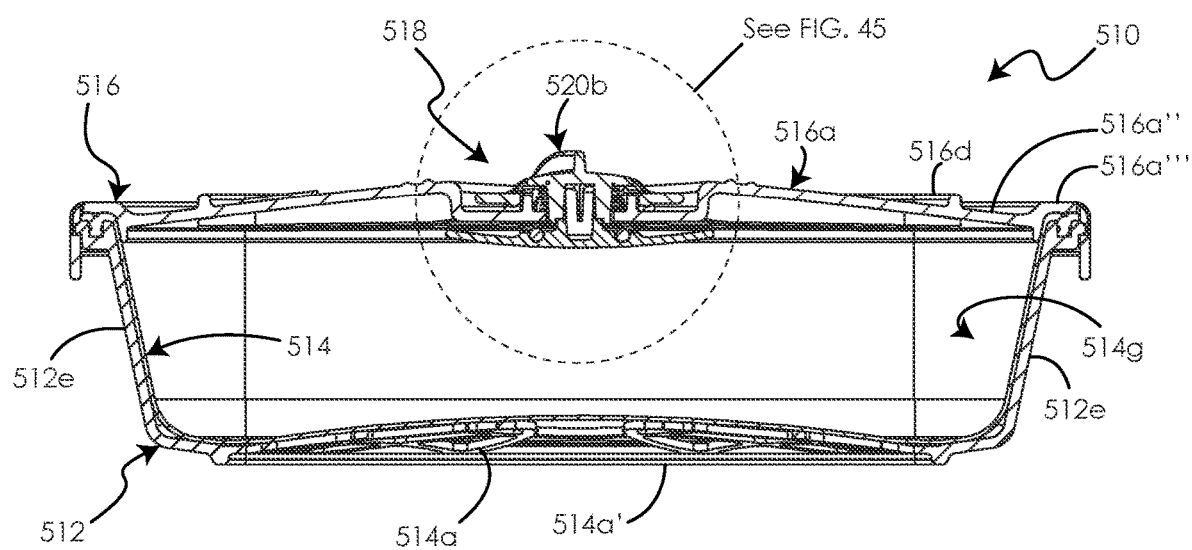
FIG. 43 is a cross-section of the storage container taken along line 43-43 of FIG. 42.

Referring to FIGS. 34 and 41, an underside of the wall 516a of lid 516 proximate skirt 516g includes a bead 516m that extends around substantially the entire circumference of lid 516 and projects downwardly from the underside of wall 516a. When lid 516 is pushed downwardly into engagement with the interlocked liner 514 and base 512, bead 516m on wall 516a of lid 516 impinges on the pliable silicone of the liner's rim 514h, depressing a region thereof such that the silicone deforms around bead 516m. This arrangement enables a tighter seal between wall 516a of lid 516 and rim 514h of liner 514, cutting down on possible airflow therebetween. An inner surface of skirt 516g on lid 516 proximate bottom edge 516g' may include an inwardly projecting annular ridge 516n that extends inwardly under the lowermost edge 512n of rim 512h of base. The annular ridge 516n interlocks with the lowermost edge 512n of base 512, and thereby secures lid 516 to base 512. In other embodiments ridge 516h may be omitted.

As best seen in FIG. 29, the lower surface of wall 516a of lid 516 includes a plurality of downwardly extending ridges 516p that will project for a distance downwardly into the compartment 514g of the liner 514 when lid 516 is engaged with liner 514 and base 512. As illustrated, ridges 516p are arranged to form four generally rectangular regions that terminate in shoulder wall 516b' which defines a perimeter of hub 516b. Ridges 516p are provided to contact foodstuffs received within liner 514 and to keep the same a distance away from the rest of the underside of lid 516. The ridges 516p help to ensure that foodstuffs do not block off valve assembly 518 and thereby interfere with air being able to flow out of storage container 510 or back into storage container 510.

Referring to FIGS. 28 through 44, a valve assembly 518 is operatively engaged with lid 516. Valve assembly 518 may be any suitable valve that is able to be selectively moved between an open position and a closed position, as will be described later herein. Valve assembly 518 may be is a one-way valve that is actuated to allow airflow in a single direction when air is evacuated from the compartment 514g of liner 514, as will be described later herein.

Figure 44:
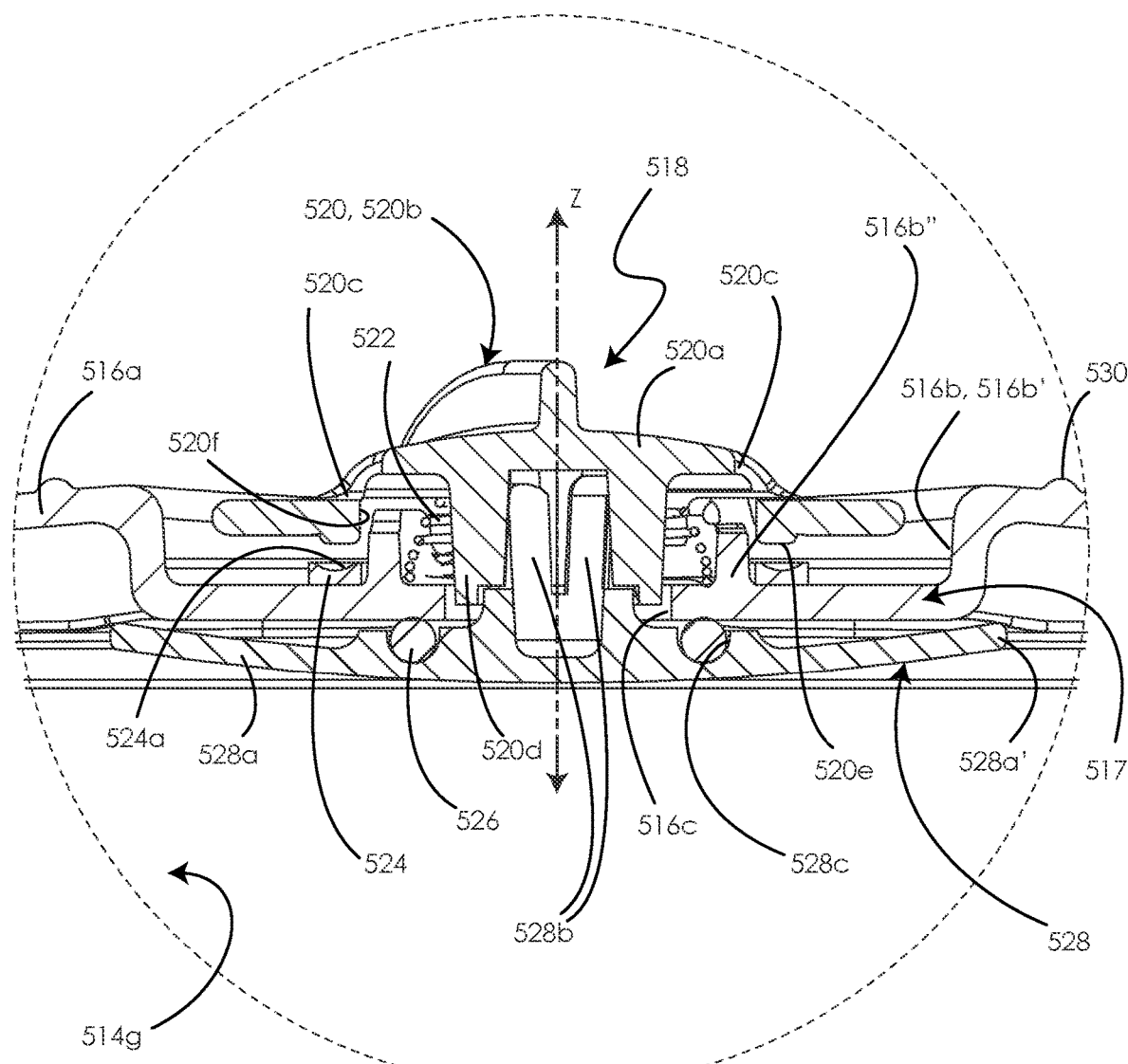
FIG. 44 is an enlargement similar to the highlighted region of FIG. 43 showing the valve assembly in the open position but prior to the storage container being engaged by a vacuum pump.
Figure 45:
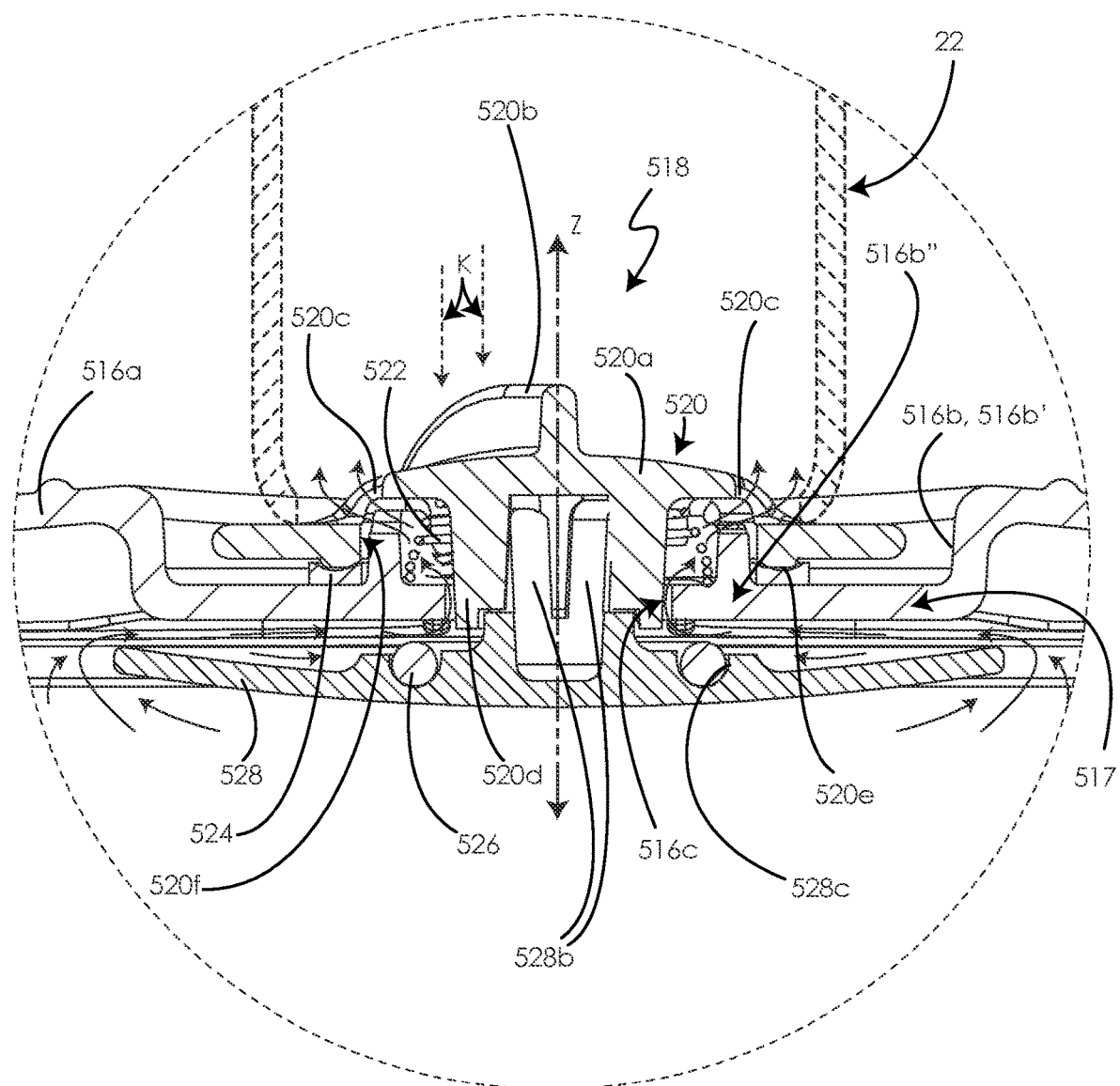
FIG. 45 is an enlargement of the highlighted region of FIG. 43 showing the valve assembly in the open position but after a vacuum pump is engaged with the storage container and showing air being evacuated from the liner.
Figure 46:
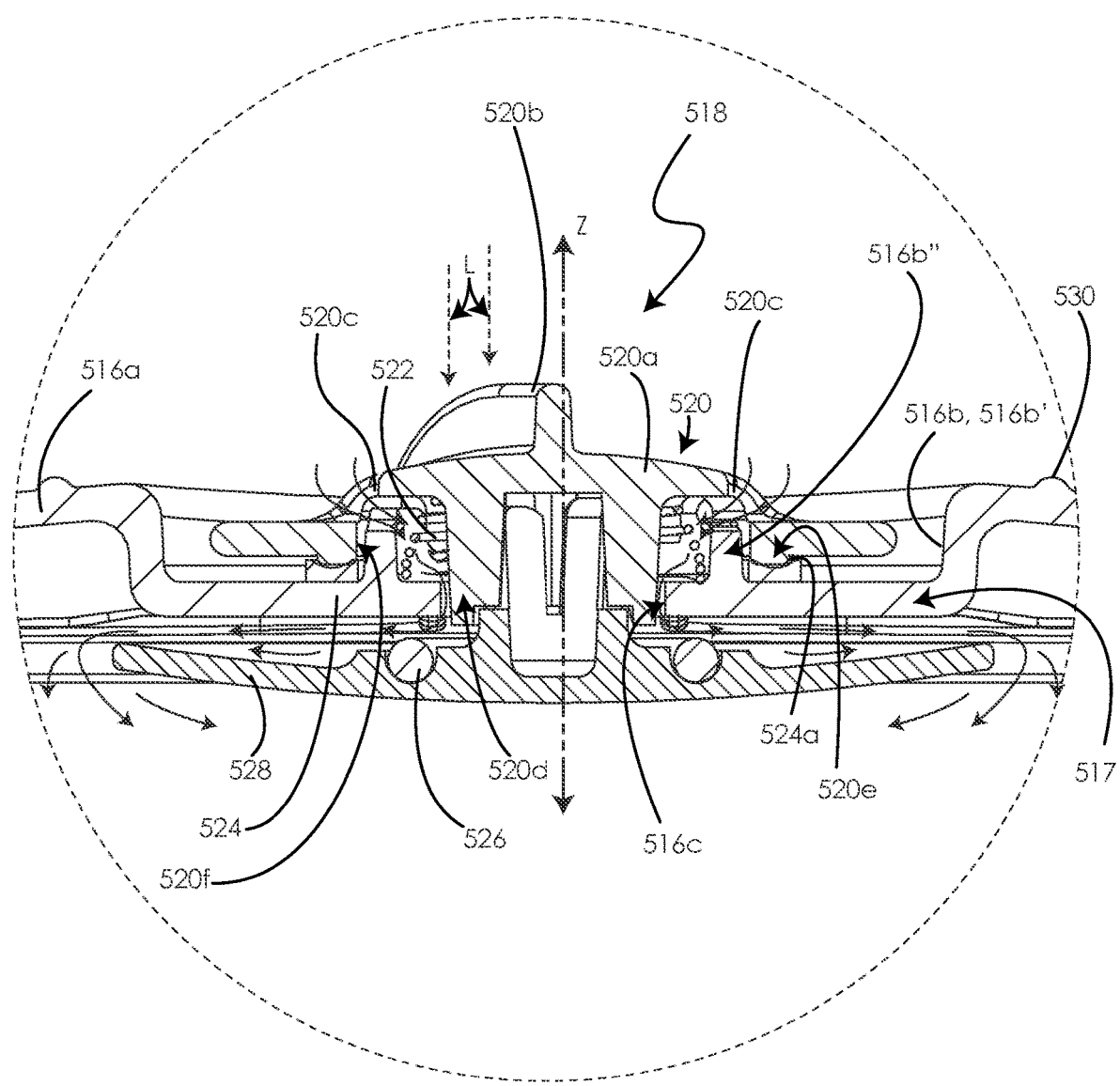
FIG. 46 is an enlargement of the highlighted region of FIG. 43 showing the valve assembly in the open position and with the actuator thereof being depressed to allow air to flow back into the compartment of the liner.

Valve assembly 518, as illustrated, includes an actuator 520, a spring 522, a gasket 524, an O-ring 526, and a flapper 528. As best seen in FIG. 44, actuator 520 comprises a housing 520a having a finger grip 520b which extends upwardly away from an exterior surface of the housing 520a. A plurality of passageways 520c, 520c' extend between the exterior surface of the housing 520a and an interior surface thereof. An annular boss 520d extends downwardly from the interior surface of the housing 520a in an opposite direction to the finger grip 520b. Annular boss 520d defines a central compartment 520d' (FIG. 44) therein, the purpose of which will be described later herein. Actuator 520 further includes an annular projection 520e (FIG. 44) which is spaced radially outwardly from boss 520d. The purpose of the annular projection 520e will be described later herein. As shown in FIGS. 44 through 46, an annular channel 520f is defined in the interior surface of actuator 520 and channel 520f circumscribes boss 520d. Channel 520f is in communication with passageways 520c and 520c'.

Finger grip 520b provides a way for a user to grasp actuator 520 and rotate the same about a vertical axis. "Z" in order to allow air to be evacuated from compartment 514g or allow air to flow into a previously-evacuated compartment 514g, or maintain the compartment 514g in a vacuum condition. As will be described in greater detail later herein, when actuator 520 is rotated in a first direction about the vertical axis "Z", the passageways 520c, 520c' place compartment 514g of liner 514 in fluid communication with the ambient air. When actuator 520 is rotated in an opposite second direction about vertical axis "Z", passageways 520c are arranged so that they no longer place compartment 514g of liner 514 in fluid communication the ambient air surrounding storage container 510.

Spring 522 is configured to be seated on bottom wall 517 and circumscribe the annular wall 516b" which extends upwardly and outwardly from bottom wall 517. Boss 520d of actuator 520 is concentric with annular wall 516b" and is located a distance inwardly therefrom as best see in FIG. 44. Spring 522 is received in channel 520f defined by actuator 520 and will be located between annular wall 516b" and boss 520d. As best seen in FIG. 30, Spring 522 may be configured so that it is of a smaller diameter proximate an upper end that will contact actuator 520 and of a great diameter proximate a lower end that will contact flapper 528.

Flapper 528 includes a concave body 528a having a circumferential outer edge 528a'. A plurality of bayonets 528b extends upwardly from a central region (not numbered) of an upper surface of the body 528a. Each bayonet 528b terminates in a hook 528b' at its outermost end as can be seen in FIG. 30. FIG. 44 shows that the central region of the upper surface of the body 528a is configured to be interlockingly engaged within a recess (not numbered) defined by annular boss 520d of actuator 520 where the recess extends radially outwardly from a lower end of compartment 520d' defined by boss 520d. When central region of body 528a is engaged within the lower recess of boss 520d, bayonets 528b are received into the compartment 520d' defined by annular boss 520d. When bayonets 528b are so received, the hook 528b' of each bayonet 528b is received into an associated individual through-hole (not numbered) defined in annular boss 520d. The engagement of bayonet hooks 528b' in the through-holes keeps flapper 528 interlockingly engaged with actuator 520.

Body 528a of flapper 528 also defines an annular groove 528c (FIG. 44) in an upper surface thereof. Annular groove 528c is spaced radially inwardly from circumferential edge 528a' of the body 528a and is generally vertically aligned with a portion of the channel 520f defined in actuator 520. Annular groove 528c is configured to receive O-ring 526 therein. O-ring 526 will selectively contact the underside of bottom wall 517 of hub 516b of lid 516 in certain circumstances, as will be described later herein.

Storage container 510 is used in a substantially similar manner to storage container 10 except for the manner in which the base 512, liner 514, and lid 516 interlockingly engage one another. The manner of securing base 512, liner 514, and lid 516 to one another has been described earlier herein. Another difference between storage container 510 and storage container 10 is the manner of operation of valve assembly 18.

Figure 32:
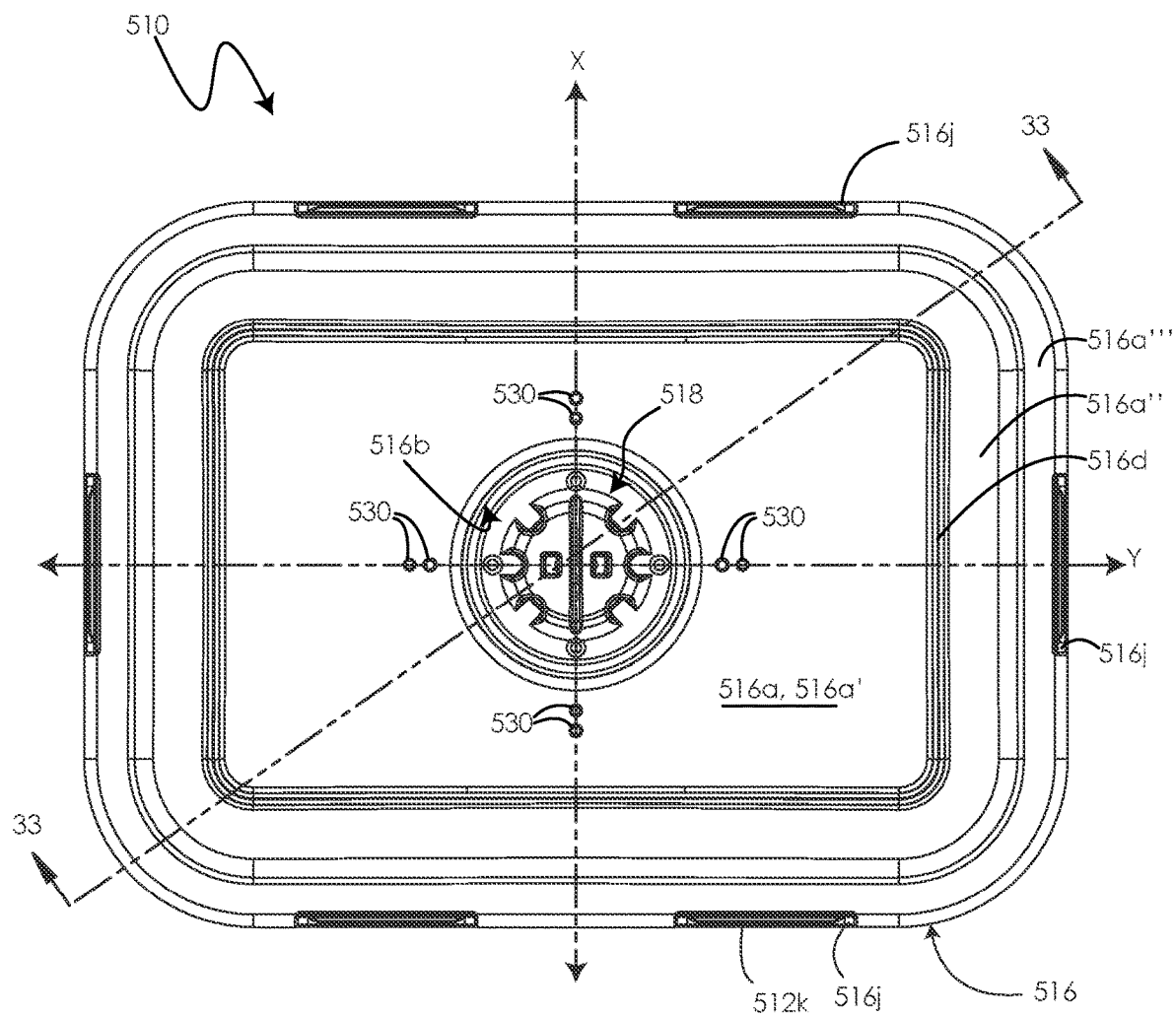
FIG. 32 is a top plan view of the storage container of FIG. 28 in an assembled condition and showing the valve assembly in a closed position.
Figure 37:
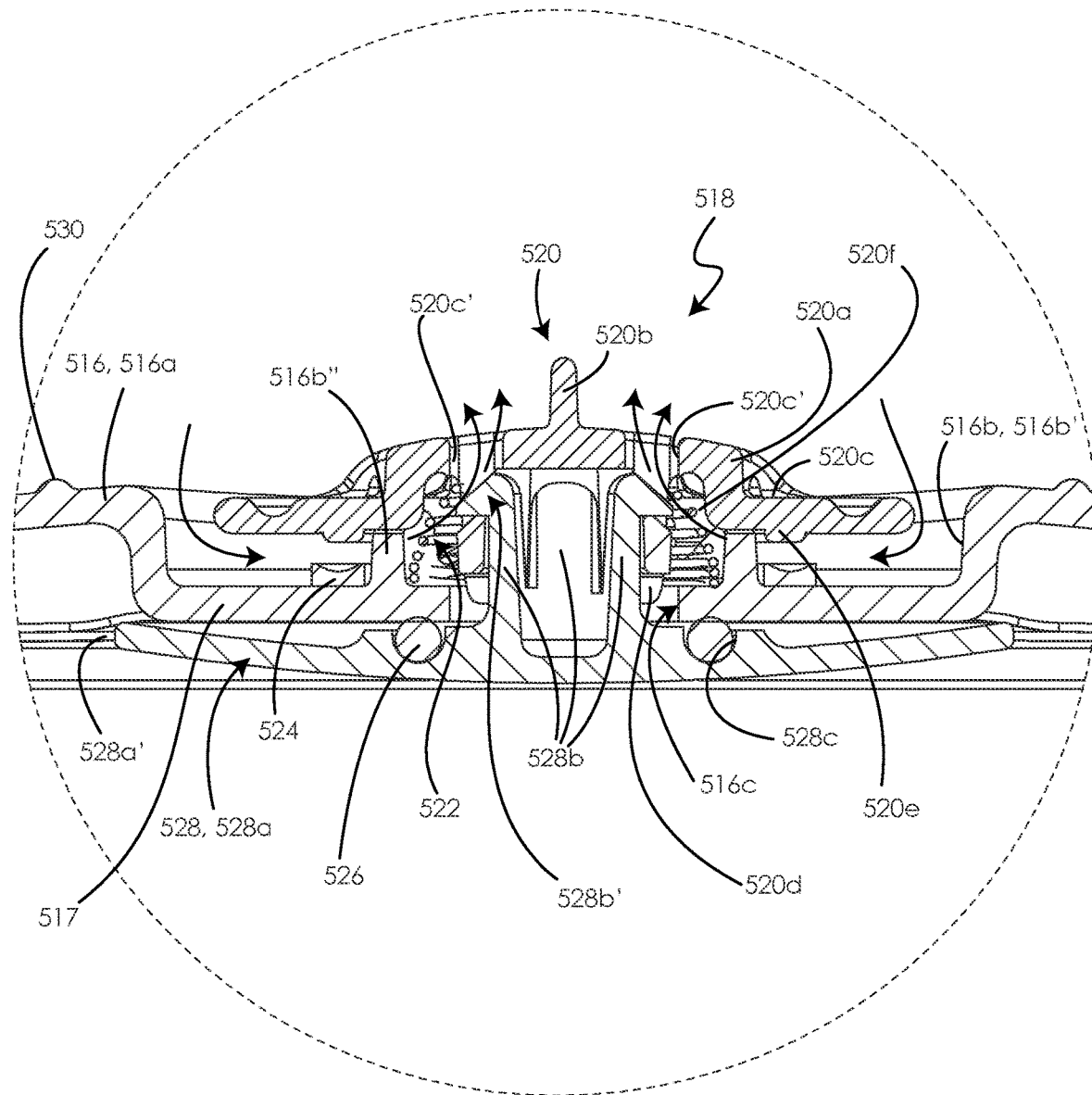
FIG. 37 is an enlargement of the highlighted region of FIG. 36 showing the valve assembly in the closed position.
Figure 38:
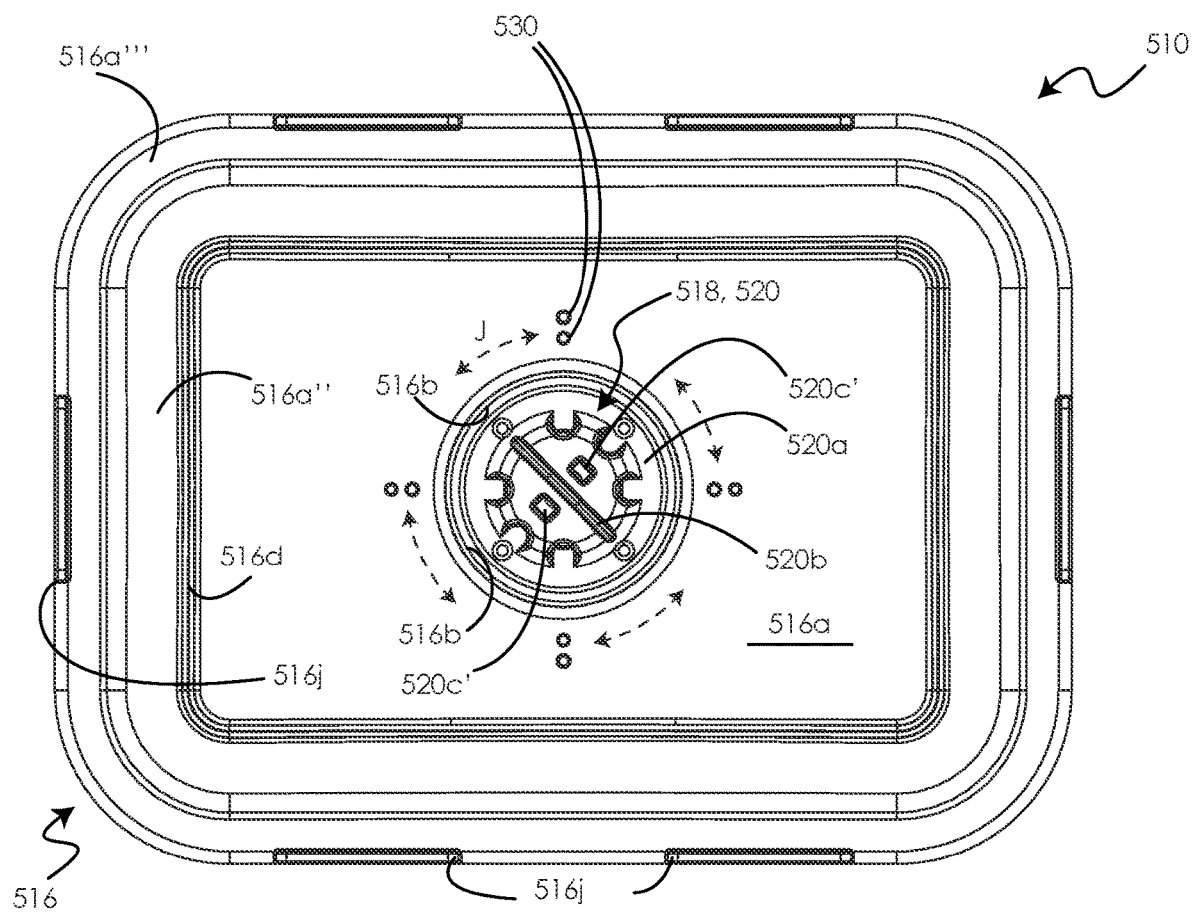
FIG. 38 is a top plan view of the storage container in an assembled condition and showing the valve assembly in an open position.
Figure 39:
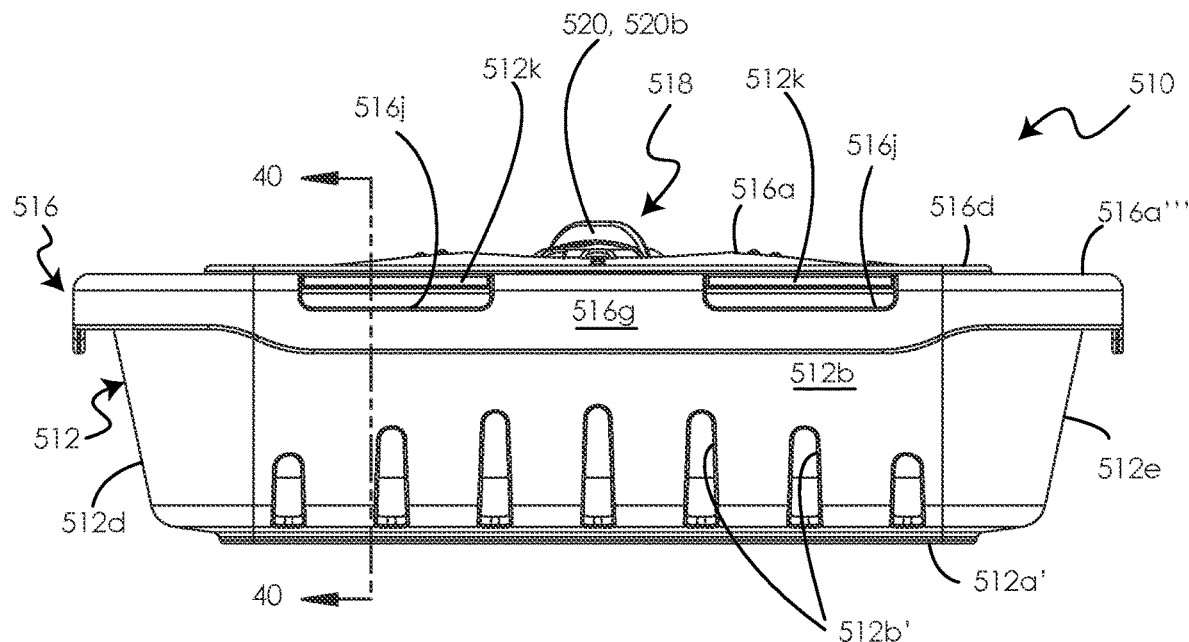
FIG. 39 is a front elevation view of the storage container shown in FIG. 38 showing the valve assembly moved to the open position.
Figure 40:
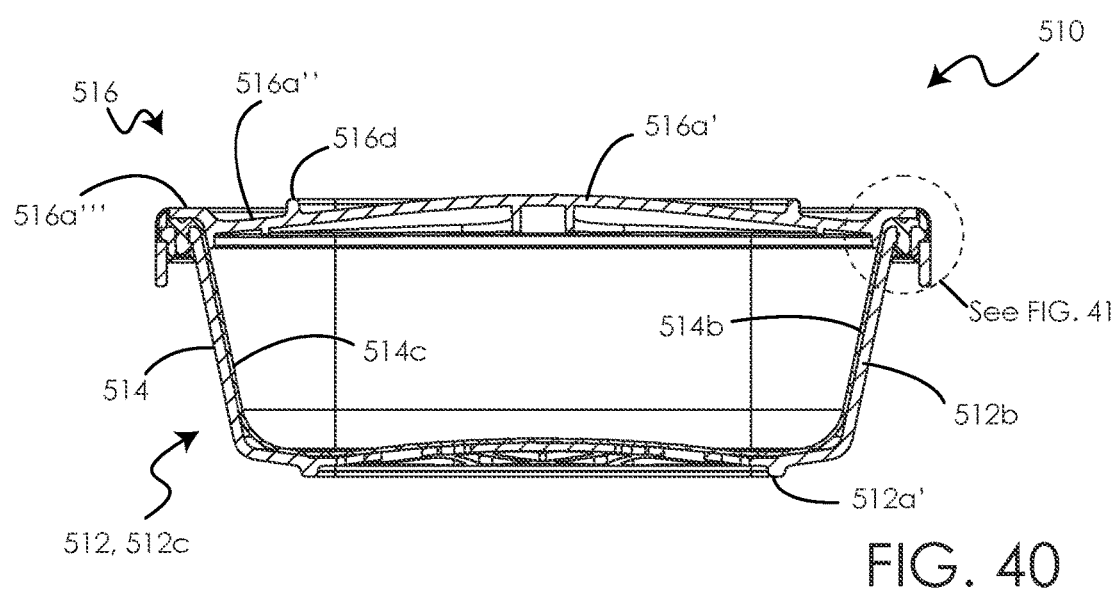
FIG. 40 is a cross-section of the storage container taken along line 40-40 of FIG. 39.

When it is desired to evacuate air from compartment 514g of liner 514, actuator 520 is rotated from an "Off" position (FIGS. 32 and 37) to an "On" position (FIGS. 38 and 44) as described hereafter. FIGS. 32 and 38 show that the upper surface of wall 516a of lid 516 is provided with indicia 530 to allow a user to determine if the actuator 520 is in the "Off" position or the "On" position. When the actuator 520 is in the "Off" position, finger grip 520b is aligned with an aligned pair of indicia 530. FIG. 32 shows a pair of indicia 530 is aligned and oriented parallel to the transverse axis "X" and FIG. 37 shows the actuator 520 in the "Off" position. Another pair of indicia is aligned and oriented parallel to the longitudinal axis "Y". FIG. 32 shows finger grip 520b aligned the pair of indicia 530 oriented parallel to transverse axis "X". The user will grasp the finger grip 520b and rotate actuator 520 from the "Off" position shown in FIG. 32 to the "On" position shown in FIG. 38. When actuator 520 is in the "On" position, the finger grip 520b will no longer be aligned with an aligned pair of indicia 530 but will, instead, be located generally equidistant between two adjacent pairs of indicia 520, as illustrated in FIG. 38. FIG. 44 shows actuator 520 in the "On" position. The dashed arrows "J" in FIG. 38 show the possible "Off"/"On" rotation of actuator 520.

As indicated above, FIG. 44 shows actuator 520 moved to the "On" position but valve assembly 518 is illustrated prior to engagement of a vacuum pump with storage container 510. It can be seen that O-ring 526 of valve assembly 518 is in contact with the underside of bottom wall 517 of hub 516b in lid 516. As a consequence, air cannot flow into or out of compartment 514g of liner 514.

FIG. 45 shows actuator 520 in the "On" position and with a lower end of a vacuum pump 22 contacting the upper surface of actuator 520. The vacuum pump 22, its construction, purpose, and use has been described earlier herein with respect to storage container 10. FIG. 45 shows a downward force "K" being applied to actuator 520. The downward force 520 pushes flapper 528 away from bottom wall 517 of lid 516 and, as a result, a gap (not numbered) opens up between O-ring 526 and bottom wall 517. The downward movement of actuator 520 also causes annular projection 520e of actuator 520 to become seated in a groove 524a (FIG. 44) defined in gasket 524 of valve assembly 518, thereby closing off a space (not numbered) defined between projection 520e and gasket 524. The space between projection 520e and gasket 524 is readily seen in FIG. 44 but disappears when actuator 520 moves downwardly as in FIG. 45

When valve assembly 518 is in the condition shown in FIG. 45, The user will activate vacuum pump 22 and begin to evacuate air from compartment 514g of liner 514. Air will flow out of the compartment 514g around the circumferential edge 528a' of body 528a of flapper 528, between the upper surface of flapper 518 and the underside of bottom wall 517, through a gap (not numbered) defined between the tapered flange 520d and bottom wall 517 of hub 516b, into channel 520f and ultimately out of passageways 520c and into the environment surrounding storage container 510. The evacuating airflow is illustrated by various unnumbered arrows in FIG. 45. The flexible liner 514 will be drawn upwardly towards the bottom of lid 516, in a similar fashion to liner 14 shown in FIG. 18.

Once all possible air has been evacuated from liner 514 by pump 22, pump is lifted off actuator 520 and this causes the downward force "K" on actuator 520 to cease. Flapper 528 returns to its original position in contact with bottom wall 517 shown in FIG. 44 and, as a consequence, O-ring 526 again closes off fluid communication between passageways 520c and compartment 514g. The user may then rotate actuator 520 back into the "Off" position shown in FIG. 32. In the "Off" position, it is not possible for ambient air to flow back from the environment surrounding storage container 510 and into compartment 514g. The vacuum condition or near vacuum condition within liner 514 keeps base 512, liner 514, and lid 516 secured to one other in a sealed fashion. The user is then able to put storage container 510 in a fridge, freezer, cupboard etc. until he or she wishes to access the articles or foodstuffs retained within liner 514.

FIG. 37 shows that air is able to flow through the passageways of actuator 520 via the valleys of the undulating annular wall 516b' of lid 516, whether the actuator 520 is in the "Off" position or the "On" position. However, it is only possible for air to flow into compartment 514g or out of compartment 514g when actuator 520 is depressed downwardly towards bottom wall 517 of lid 516.

FIG. 46 shows a situation where the user now wishes to access the contents of liner 514. The actuator 520 will first be rotated to the "On" position as described above and then the user will apply a downward force, indicated by arrow "L", to actuator 520. The user does not need to use pump 22 for this purpose but can simply apply finger-pressure to actuator 520. Downward movement of actuator 520 will cause the flapper 528 to be forced downwardly in the direction indicated by arrow "L", breaking the contact between O-ring 526 and bottom wall 517 of hub 516b. As described earlier herein, downward movement of actuator 520 will cause projection 520e to become seated in groove 524a of gasket 524. Air will then readily flow through passageways 520c, through channel 520f, between flange 520d and bottom wall 517 of hub 516b, between the underside of bottom wall 517 of lid 516 and the upper surface of flapper 528, around the circumferential edge 528a' of body 528a, and into the compartment 514g of liner 514. Liner 514 will therefore return to its original expanded condition. Lid 516 can be disengaged from base 512 because the suction on lid from liner 520 is broken. The user is then able to access the contents of liner 514.

Figure 47:
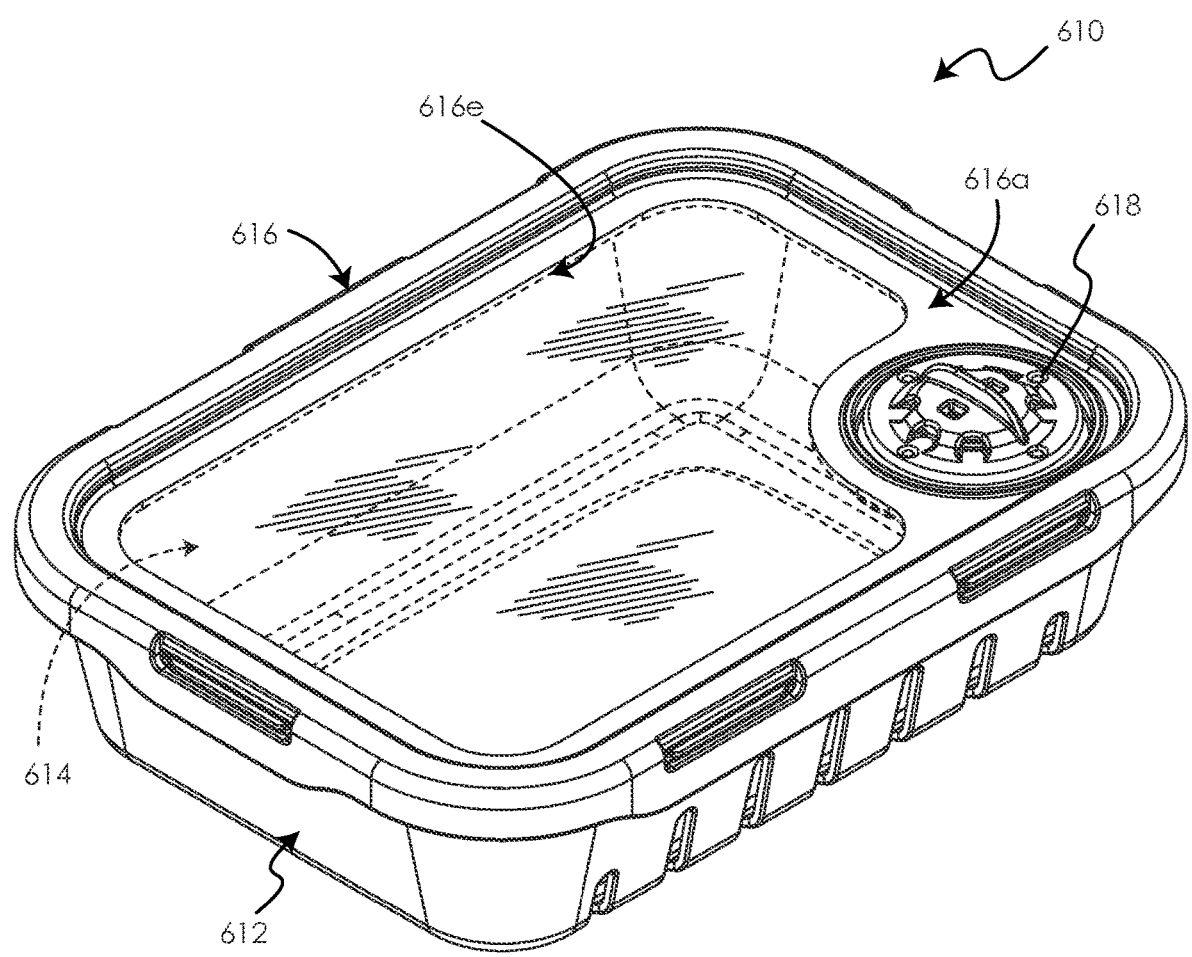
FIG. 47 is a top, front, left side perspective view of a seventh embodiment of a storage container in accordance with the present disclosure, shown in an assembled condition with the valve assembly in a location proximate a corner of the lid.

Referring now to FIG. 47, there is shown a seventh embodiment of a storage container in accordance with an aspect of the present disclosure, generally indicated at 610. Storage container comprises a base 612, a liner 614, and a lid 616. Base 612 is substantially identical in structure and function to base 512 and liner 614 is substantially identical in structure and function to liner 614. Lid 616 is substantially identical in structure and function to lid 516 except that the wall 616a of lid 616 includes a section 616e which is transparent. The transparent section 616e enables a user to view the contents of liner 614 (not shown in this figure) therethrough. In one embodiment, lid 616 includes a silicone transparent section 616e that is bordered by a plastic, non-transparent section. Lid 616 also differs from lid 516 in the location of valve assembly 618. Instead of being generally centrally located in wall 616a, valve assembly 618 is located proximate one corner of wall 616a. Valve assembly 618 is substantially identical in structure and function to valve assembly 518. When air is evacuated from storage container 610, in a similar manner to what has been described above with reference to storage container 510, the silicon of the transparent section 616e and the pliable resilient liner 614 will both be drawn inwardly towards one another. All other features of storage container 616 are substantially identical in structure and function to storage container 516 and therefore will not be discussed in any further detail herein.

Figure 48:
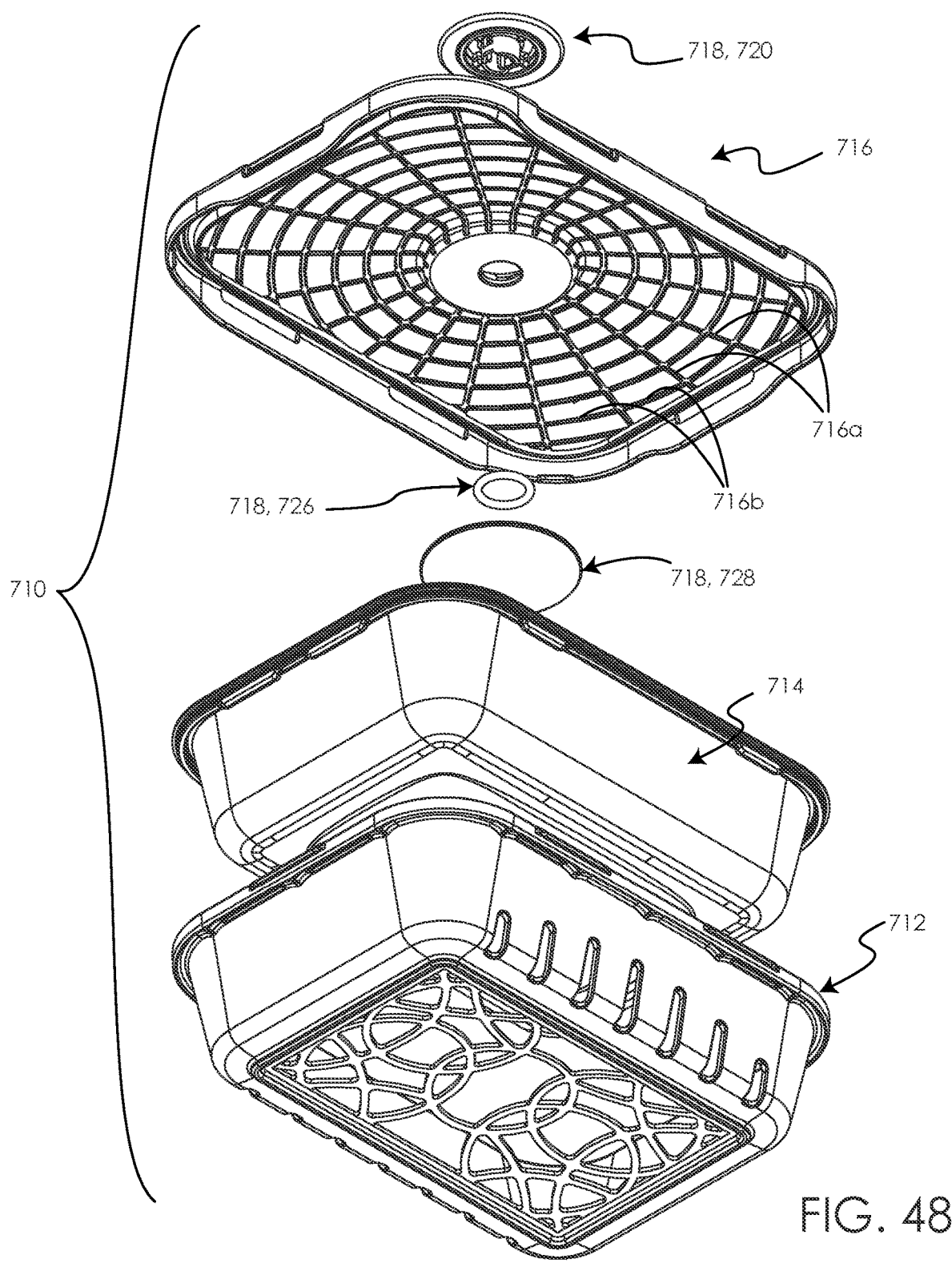
FIG. 48 is an exploded bottom, front, left side perspective view of an eighth embodiment of a storage container in accordance with the present disclosure, showing a differently configured bottom surface of the lid.

FIG. 48 illustrates an eighth embodiment of a storage container in accordance with an aspect of the present disclosure, generally indicated at 710. Storage container 710 comprises a base 712, a liner 714, a lid 716, and a valve assembly 718. Base 712 is substantially identical in structure and function to base 512. Liner 714 is substantially identical in structure and function to liner 514. Valve assembly 718 is substantially identical in structure and function to valve assembly 518. Lid 716 is substantially identical in structure and function to lid 516 except the lower surface of the lid 716 is provided with a series of radial grooves 716a and a series of circumferential grooves 716b that intersect radial grooves 716a. Radial grooves 716a radiate outwardly away from the shoulder wall of the hub 716b that is equivalent to hub 516b. The grooves 716a and 716b direct air inwardly towards hub 716b when air is being evacuated from storage container 710 and direct air outwardly away from hub 716b when air is permitted to flow back into the compartment defined by liner 714.

Referring now to FIGS. 49 through 52, there is shown an eighth embodiment of a storage container in accordance with the present disclosure, generally indicated at 810. As with the previous embodiment disclosed herein, storage container comprises a base 812, a liner 814, a lid 816, and a valve assembly 818. In these figures, only the projections 814j (FIGS. 51 and 52) of the liner 814 are shown but it will be understood that the liner 814 may be identical to any of the liners 14 through 714 described herein.

Storage container 810 is substantially identical to storage container 510 except for the features indicated hereafter. In particular, base 812 is substantially identical to base 512 and comprises a bottom wall 812a, a front wall 812b, a rear wall 812c, a left side wall 812d, and a right side wall 812d. Front and rear walls 812b and 812c do not define a plurality of apertures therein similar to apertures 512b' and 512c'/

Figure 49:
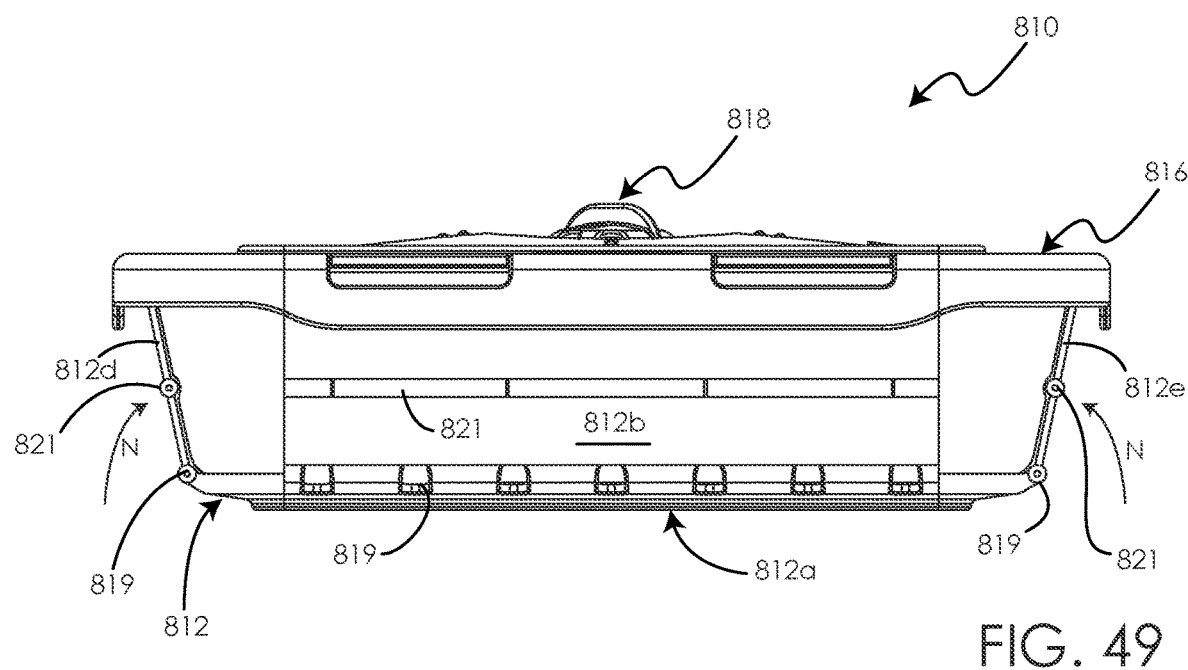
FIG. 49 is a front elevation view of an eighth embodiment of a storage container in accordance with the present disclosure, show in an assembled closed position, wherein the base of the storage container includes collapsible walls.
Figure 50:
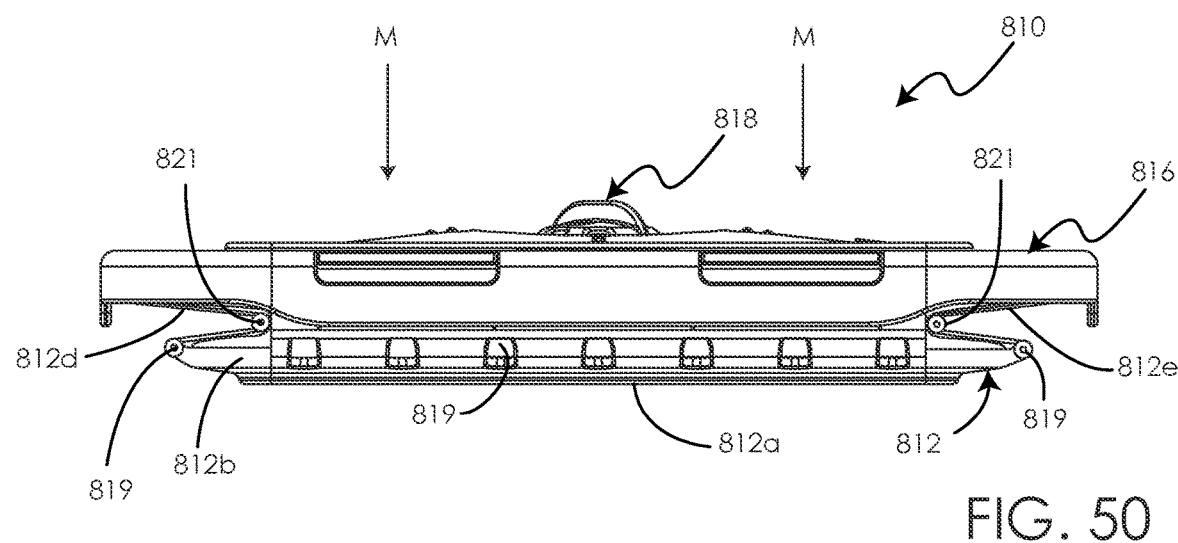
FIG. 50 is a front elevation view of the storage container of FIG. 49, showing the base in a collapsed condition.
Figure 51:
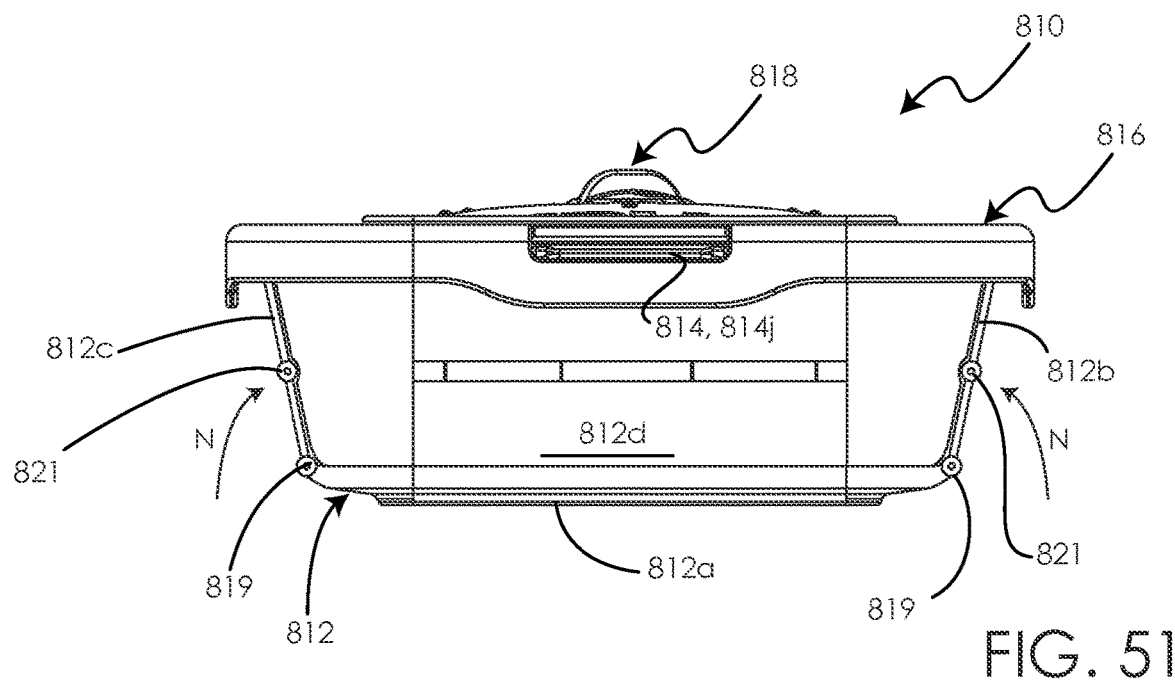
FIG. 51 is a left side elevation view of the storage container of FIG. 49 in an expanded condition.
Figure 52:
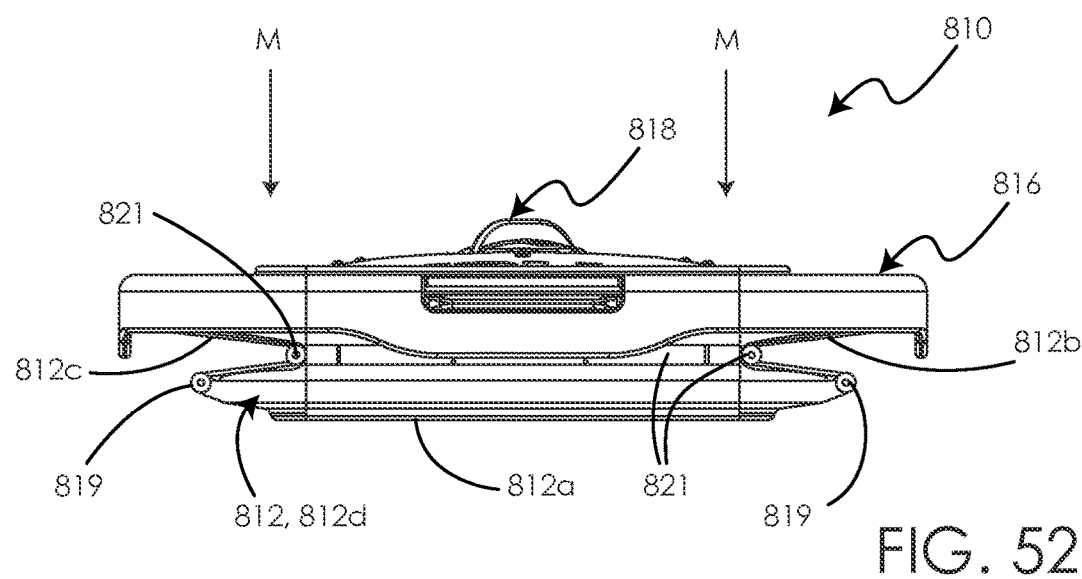
FIG. 52 is a left side elevation view of the storage container of FIG. 49 in the collapsed condition.

Additionally, unlike base 512, base 812 includes a first hinge 819 and a second hinge 821 in each of the front wall 812b, rear wall 812c, left side wall 812d, and right side wall 812e. The hinges 819 and 821 make it possible for the storage container 810 to be moved between an expanded condition (FIGS. 49 and 51) and a collapsed condition (FIGS. 50 and 52). The provision of hinges 819, 821 makes it easy for a user to reduce the overall height of the storage container 810 when not in use for storing food or other objects or articles. The user will take the storage container 812 and push gently downwardly on the lid 816 as indicated by arrows "M" in FIGS. 50 and 52. The pushing force will cause the sections of the walls 812b through 812e to fold about the hinges 819, 821 as illustrated in FIGS. 50 and 52. The overall height of storage container 810 is thereby reduced while the width and length thereof remains the same. The collapsed storage container 810 may then be stored away for use at a later time.

When it is later desired to put storage container 810 to use storing food or other articles, the user will grasp the lid 816 and gently pull upwardly as indicated by arrows "N" in FIGS. 49 and 51. The sections of the walls 812b through 812e will move about the hinges 819 and 821 and return to the original expanded condition. In the original expanded condition, the overall height (measured from bottom wall 812a to the upper rim (not shown) of base 812 will increase relative to when the storage container is in the collapsed condition. The user will then be able to use storage container 810 in a similar manner to what is described above with respect to the other embodiments of the disclosure.

In some embodiments, the front, rear, left side and right side walls 812b through 812e of base 812 may be fabricated from a flexible material to aid in more easily collapsing storage container 810 as discussed above.

It will be understood that all embodiments of the storage container disclosed herein may be fabricated in any of a variety of different dimensions, being of various desired lengths, widths, and heights so as to be useable for holding different quantities and types of food or other objects. Furthermore, any of the disclosed embodiments of the storage container may be fabricated in any desired different shape, such as rectangular, square, triangular, circular, irregular, etc. A kit may be fabricated and sold that includes a plurality of storage containers of various shapes and sizes.

It will be understood that a storage container kit may be sold that includes one or more of any of the different of bases, liners, and lids disclosed herein. Liners such as liners 14, 214, 314, 414, 514, 614, and 714 may be used with any of the disclosed bases or lids when it is desired to vacuum-seal food or other articles or objects within the storage container. Liner 114 may be used with any of the disclosed bases or lids when there is no need to vacuum seal food or other articles or objects within the storage container. Of course liners 14, 214, 314, 414, 514, 614, and 714 may be used in circumstances when there is not need to vacuum seal food or other articles or objects within the storage container but in these circumstances the user simply will not use a vacuum to evacuate air from the liner. The kit may also include the pump 22 shown in FIG. 16 or any other suitable pump.

In summary, an exemplary method of using storage container 10 (or any of the other embodiments of storage container in accordance with the present disclosure) in a method of freezing food comprises placing a pliable liner 14 inside a compartment 12g defined by a base 12 of storage container 10; placing a foodstuff 20 inside a compartment 14g of the pliable liner 14; engaging a lid 16 with the base 12 to form a closed storage container and thereby closing off access to the compartment 14g of the pliable liner 14; positioning a pump 22 adjacent a valve assembly 18 defined in the lid 16; evacuating air from the compartment 14g of the pliable liner 14; removing the pump 22; and placing the closed storage container 10 in a freezer; and freezing the food 20 inside the closed storage container 10.

The method further comprises clampingly retaining a rim 14h of the liner 14 between a rim 12h of the base 12 and the lid 16. The clamped rim 14h of the liner 14 acts as a flexible seal between the base 12 and lid 16. The method further comprises shrinking the pliable liner 14 about the food 20 as air is removed from the compartment 14g by the pump 22. This can be seen in FIG. 18. The method further comprises drawing air from outside the base 12 through apertures 12f defined between an interior surface and an exterior surface of the base 12 as the pliable liner 14 shrinks when air is evacuated therefrom. The method includes creating a vacuum condition or a near-vacuum condition within the compartment 14g of the pliable liner 14 as the air is removed from the compartment 14g by the pump 22. The method further comprises placing the base 12 of the closed food storage container 10 with frozen foodstuffs 20 therein into a volume of water (in a kitchen sink, for example); allowing some of the water in the sink to flow into the compartment 12g of the base 12 through apertures 12f defined between an interior surface and an exterior surface of the base 12; directly contacting the liner 14 with the some of the water within the compartment 12g of the base 12; and defrosting the frozen foodstuffs 20. The method further comprises opening the valve assembly 18 and allowing air to flow back into the compartment 14g of the pliable liner 14 either before the defrosting of the frozen food 20 or after the defrosting of the frozen food.

While the storage container in accordance with the present disclosure has been described and illustrated as including a locking mechanism comprising a plurality of interacting tabs 16k, slots 14j, and projections 12j, it will be understood that any other type of locking mechanism may be provided on storage container 10, 110 to securely retain the lid 16, liner 14, and base 12 together.

While the pump described and illustrated herein is a hand-operable pump 22 it will be understood that in other embodiments, the pump may be a powered or mechanized pump that evacuates air from the liner and creates a vacuum condition or a near vacuum condition in the compartment of the liner.

It should be understood that while the storage container of the present disclosure has been illustrated and described herein as being useful for storing and preserving foodstuffs, and particularly for freezing foodstuffs, it will be understood that the storage container may be useful for retaining and storing dried foodstuffs therein. Alternatively, a variety of other objects may be received and retained within storage container and this disclosure should not be considered as being limited the storage container to only being usable with foodstuffs. Any use to which previously known storage containers may be employed apply equally to the storage container in accordance with the present disclosure.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A storage container for objects, said storage container comprising:
    a base defining a compartment;
    a liner received within the compartment of the base; wherein the liner is resilient;
    a compartment defined by the liner and adapted to receive one or more objects therein;
    a lid configured to interlockingly engage with one or both of the liner and the base;
    wherein lid includes:
        a first region fabricated from a flexible material; and
        a second region fabricated from a rigid or semi-rigid material;
        wherein the second region circumscribes the first region;
    a valve assembly provided in the second region of the lid, said valve assembly being configured to be activated to evacuate air from the compartment of the liner; and
    wherein when air is evacuated from the compartment of the liner, the liner and the first region of the lid are drawn inwardly towards one another.

2. The storage container according to claim 1, wherein the liner is complementary in shape and dimensions to the interior surface of the base which defines the compartment and wherein the liner is nestingly received within the compartment of the base.

3. The storage container according to claim 2, wherein at least a portion of the liner overlaps a rim of the base, and the overlapping portion of the liner forms a seal between the base and the lid when the lid is engaged with the base.

4. The storage container according to claim 1, wherein the base defines one or more apertures that extend from an interior surface of the base to an exterior surface thereof, and wherein the one or more apertures place the compartment of the base in fluid communication with air surrounding the exterior surface of the base.

5. The storage container according to claim 1, wherein the base is fabricated from a rigid material or a semi-rigid material.

6. The storage container according to claim 1, wherein the liner is fabricated from a resilient material.

7. The storage container according to claim 1, further comprising a locking mechanism for securing lid to the base and liner.

8. The storage container according to claim 1, wherein the first region of the lid is fabricated from a transparent silicone material.

9. The storage container according to claim 1, wherein the base includes a front wall, a rear wall, a left side wall, and a right side wall which together form a perimeter wall which extends upwardly from a bottom wall; and wherein the perimeter wall is movable between a collapsed condition and an expanded condition.

10. The storage container as defined in claim 1, wherein the liner further comprises at least one vertical partition which divides the compartment of the liner into more than one compartment.

11. A storage system for extending a life of foodstuffs, the storage system comprising:
a storage container comprising:
a base defining a compartment;
a separate detached liner nestingly received within the compartment of the base; wherein the liner is flexible and resilient, and is selectively removable from within the compartment of the base;
a compartment defined by the liner, wherein an opening provides access to the compartment and the compartment is adapted to receive foodstuffs therein through the opening;
a lid configured to removably interlockingly engage with the liner and the base and seal off access to the compartment opening;
a valve assembly provided in the lid;
one or more ridges extending downwardly from the lid and towards the opening to the compartment defined by the liner;
a pump operably engageable with the valve assembly to evacuate air from the compartment of the liner; and
wherein the one or more ridges are located radially outwardly from the valve assembly and are positioned so that when contacted by foodstuffs in the compartment of the liner, the one or more ridges will prevent the foodstuffs from blocking the valve assembly.

12. The storage system according to claim 11, wherein the pump is operable to create a vacuum condition in the liner.

13. The storage system according to claim 11, wherein the pump is a hand pump.

14. The storage system according to claim 11, further comprising one or more apertures that extend from an interior surface of the base to an exterior surface thereof, and wherein the one or more apertures place the compartment of the base in fluid communication with air surrounding the exterior surface of the base.

15. The storage container according to claim 11, wherein the base includes a front wall, a rear wall, a left side wall, and a right side wall which together form a perimeter wall which extends upwardly from a bottom wall; and wherein the perimeter wall is movable between a collapsed condition and an expanded condition.

16. The storage container as defined in claim 11, wherein the liner further comprises at least one vertical partition which divides the compartment of the liner into more than one compartment.

17. A storage system for extending a life of foodstuffs, the storage system comprising:
a storage container comprising:
a base defining a compartment;
a liner nestingly receivable within the compartment of the base; wherein the liner is flexible and resilient;
a compartment defined by the liner and adapted to receive foodstuffs therein;
a lid configured to interlockingly engage with the liner and the base and seal off access to the compartment;
a valve assembly provided in the lid;
a pump operably engageable with the valve assembly to evacuate air from the compartment of the liner; and
one or more additional liners that are each selectively engageable with the base and lid instead of the liner, and wherein each of the one or more additional liners is made from a differently colored material, and wherein a color of each differently colored material is selected to indicate a different foodstuff to be received within the one or more additional liners.

18. The storage container according to claim 17, wherein the base includes a front wall, a rear wall, a left side wall, and a right side wall which together form a perimeter wall which extends upwardly from a bottom wall; and wherein the perimeter wall is movable between a collapsed condition and an expanded condition.

19. The storage container as defined in claim 17, wherein the liner further comprises at least one vertical partition which divides the compartment of the liner into more than one compartment.

20. A method of freezing food comprising:
placing a pliable liner inside a compartment defined by a base of a storage container;
placing the food inside a compartment of the pliable liner;
engaging a lid with the base to form a closed storage container and thereby closing off access to the compartment of the pliable liner;
positioning a pump adjacent a valve assembly provided in the lid;
extending one or more ridges downwardly from a lower surface of the lid and toward an opening to the compartment of the pliable liner;
arranging the one or more ridges radially outwardly from the valve assembly;
preventing the food in the compartment from obstructing the valve assembly with the one or more ridges;
allowing air to flow unobstructed to the valve assembly;
evacuating the air from the compartment of the pliable liner;
removing the pump; and
placing the closed storage container in a freezer; and
freezing the food inside the closed storage container.

* * * * *